Sept. 7, 1943.  R. K. SMITH ET AL  2,328,750
TEST DEVICE
Filed April 29, 1942  66 Sheets-Sheet 1
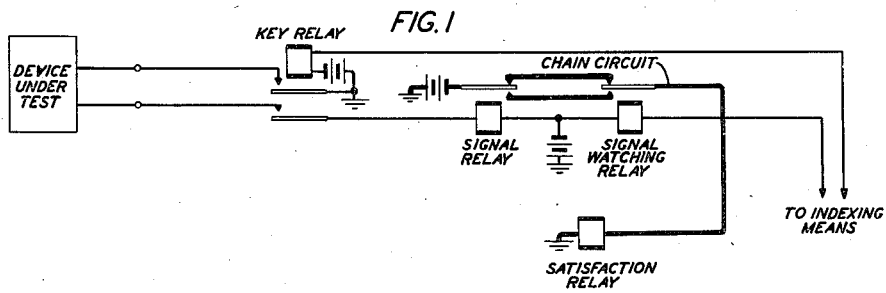
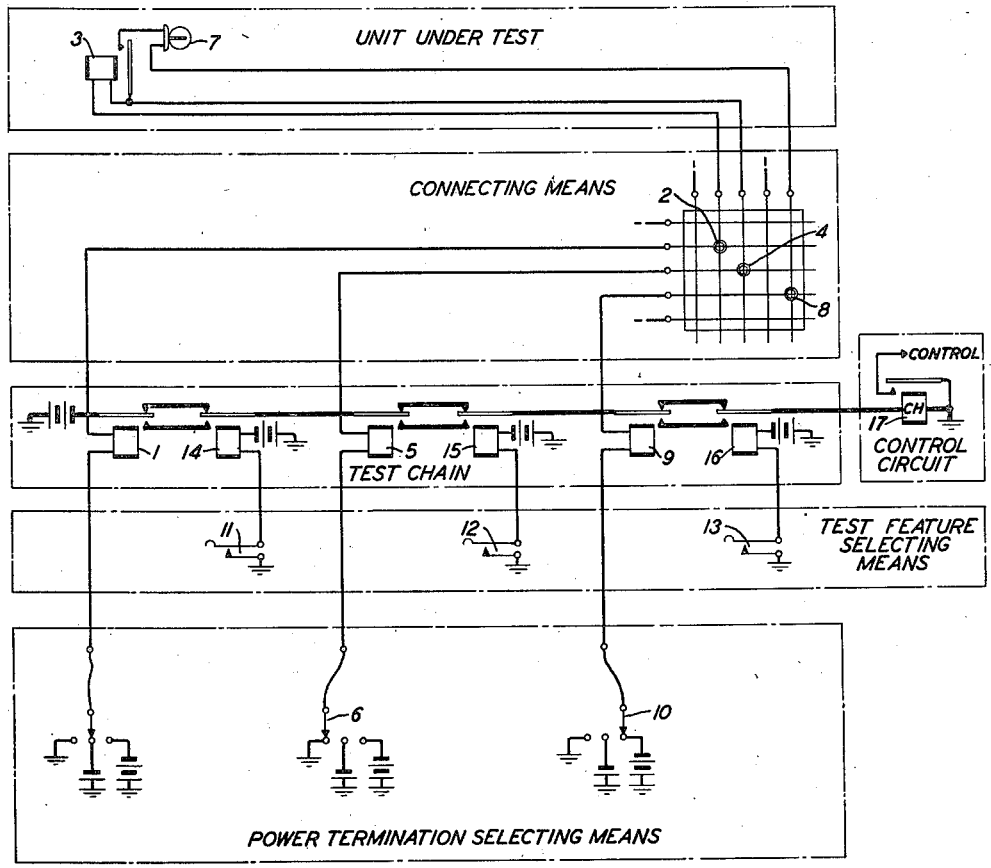
INVENTORS R. K. SMITH
J. H. SULZER
BY
ATTORNEY

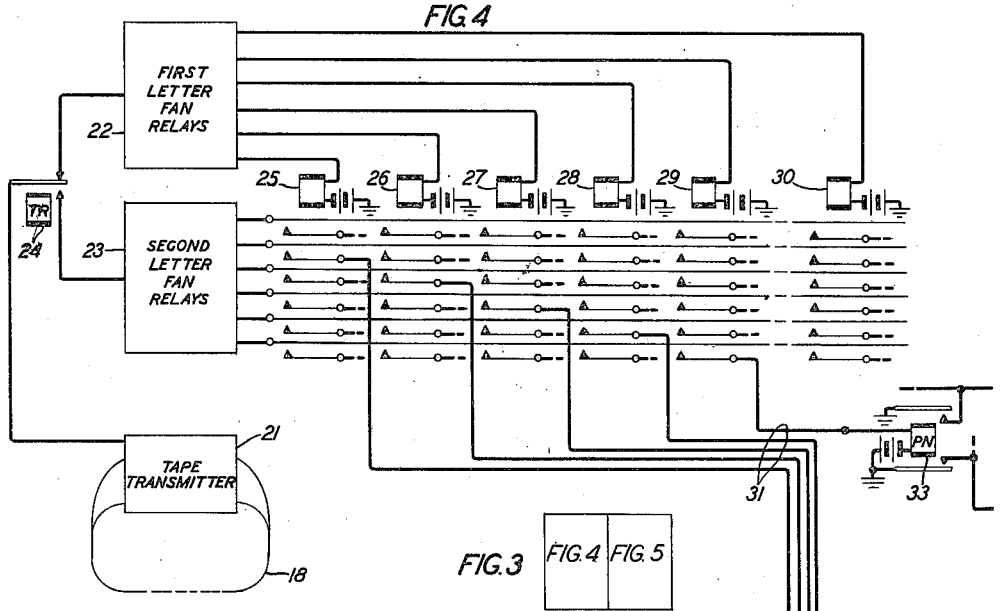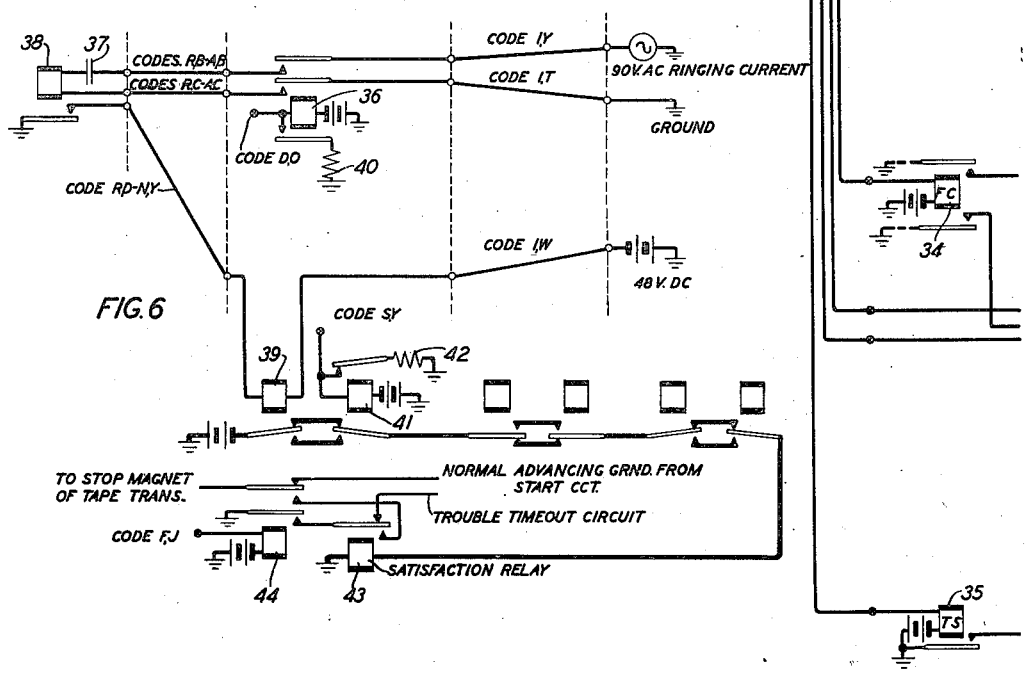

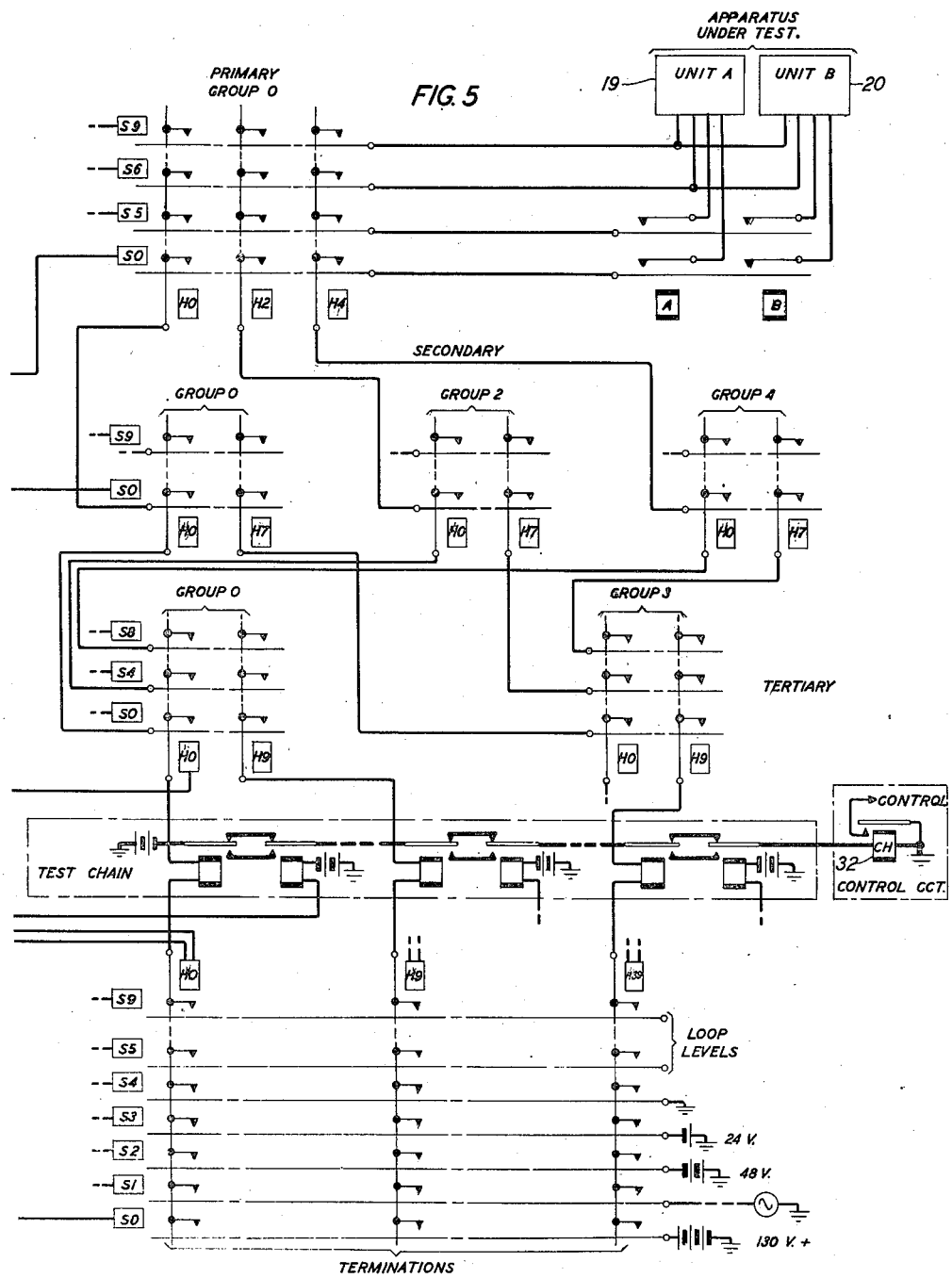

Sept. 7, 1943.　　　R. K. SMITH ET AL　　　2,328,750
TEST DEVICE
Filed April 29, 1942　　　66 Sheets-Sheet 4
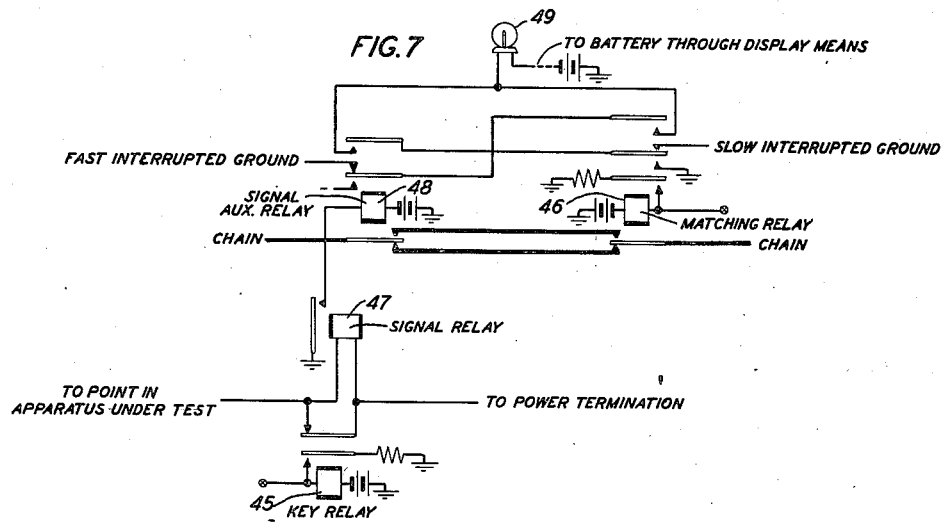
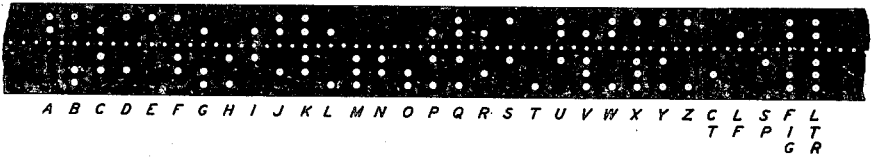
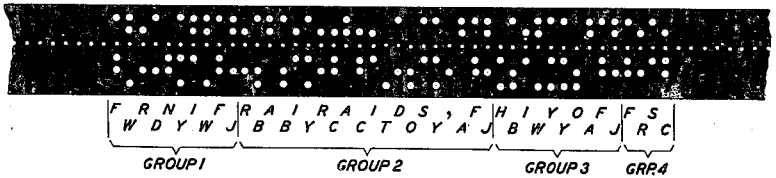
INVENTORS R. K. SMITH
J. H. SULZER
BY
ATTORNEY

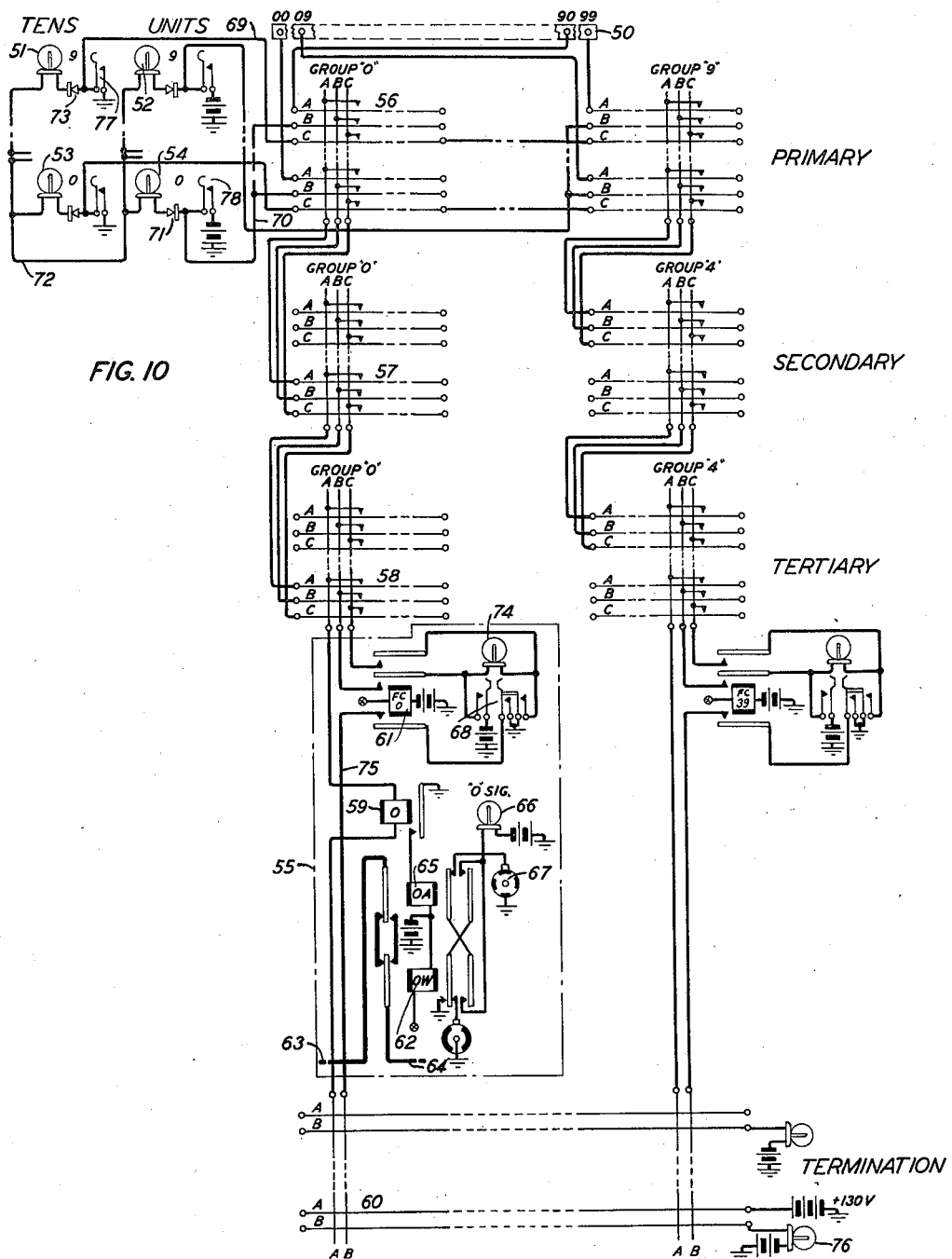

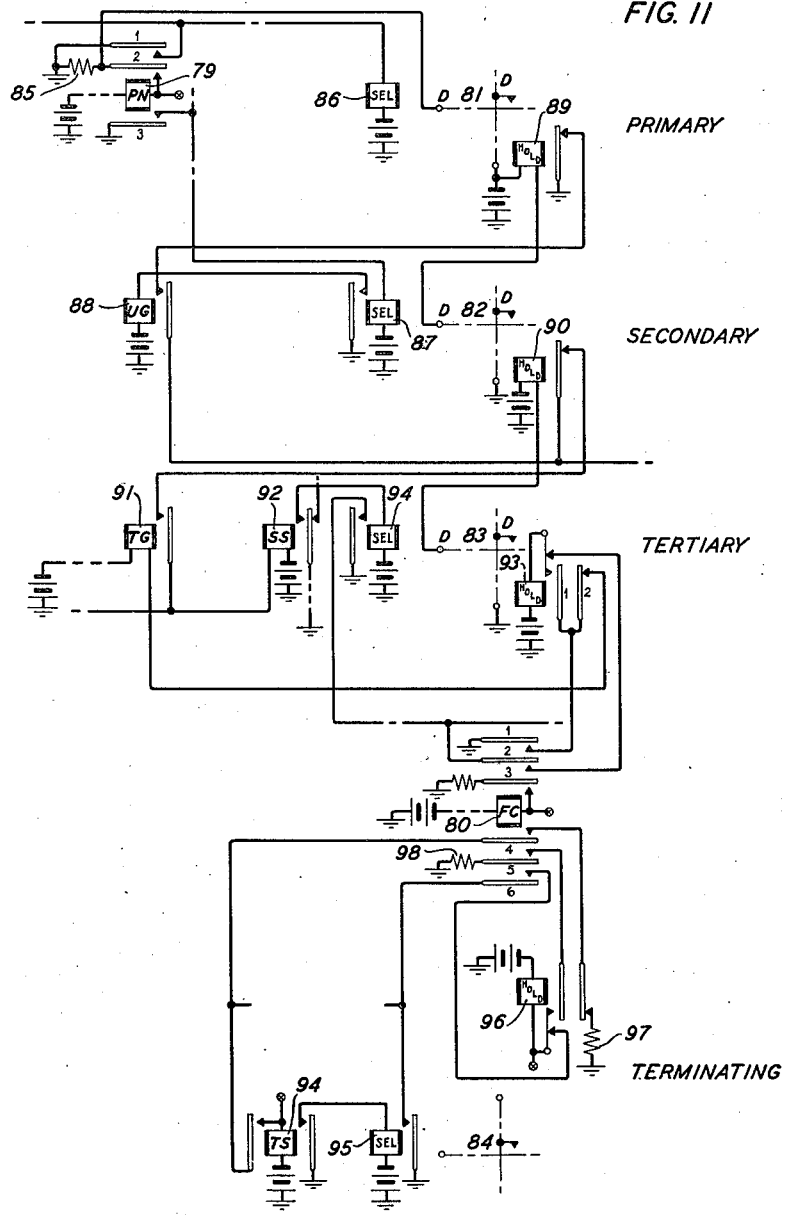

Sept. 7, 1943.                R. K. SMITH ET AL                2,328,750
                                 TEST DEVICE
                    Filed April 29, 1942    66 Sheets-Sheet 7

FIG. 12

| FIG.13 TAPE TRANSMITTER | FIG.14 DECODERS | FIG.15 TRANSLATOR | | FIG.16 | FIG.21 TERMINATION NUMBER RELAYS AND SIGNALS | FIG.22 | FIG.23 PRIMARY SWITCHES | FIG.24 | FIG.69 TERMINATION SHIFTING RELAYS | | |
|---|---|---|---|---|---|---|---|---|---|---|---|
| | | | | | FIG.25 TERMINATION NUMBER RELAYS AND SIGNALS | FIG.26 | FIG.27 PRIMARY SWITCHES | FIG.28 | FIG.70 ALTERNATIVE TERMINATIONS | FIG.71 ATTACHMENT PLUGS AND SIGNALS | |
| | | | | | FIG.29 GROUP RELAYS FOR SECONDARY SWITCHES | FIG.30 | FIG.31 SECONDARY SWITCHES | FIG.32 | FIG.33 | FIG.34 | |
| | | | | | FIG.35 GROUP RELAYS FOR SECONDARY SWITCHES | FIG.36 | FIG.37 SECONDARY SWITCHES | FIG.38 | FIG.39 | FIG.40 | |
| | | | | | FIG.41 GROUP RELAYS FOR TERTIARY SWITCHES | FIG.42 | FIG.43 TERTIARY SWITCHES | FIG.44 | FIG.45 | FIG.60 RINGING RECEIVING CIRCUIT | FIG.61 CHAIN CIRCUIT RELAYS FEATURES 1&2 |
| | | | | | FIG.46 GROUP RELAYS FOR TERTIARY SWITCHES | FIG.47 | FIG.48 TERTIARY SWITCHES | FIG.49 | FIG.50 | FIG.63 FEATURES 1,2,3&4 | FIG.64 FEATURES 1,2,3&4 |
| | | | | | FIG.16 | FIG.51 FEATURE CONNECTOR RELAYS 0-5 | FIG.52 10-22 | FIG.53 23-30 | FIG.54 34-39 | FIG.65 FEATURES 20,25,34,36&37 | FIG.66 FEATURES 21,22,23&24 | FIG.67 FEATURES 21,22,23&24 |
| | | FIG.19 CONTROL KEYS | FIG.20 CONTROL CIRCUIT | | FIG.55 POWER 0-5 | FIG.56 TERMINATION SWITCHES 10-22 | FIG.57 23-30 | FIG.58 34-39 | FIG.62 FEATURE 0 FEATURE 35 | FIG.68 DIAL CIRCUIT PULSE COUNTING |
| | FIG.18 LOCATION AND TEST POSITION SIGNALS | | | | FEATURES 0-5 | FEATURES 10-22 | FEATURES 23-30 | FEATURES 34-39 | FIG.59 TONE RECEIVING CCT.-RINGING SENDING CCT. | | |
| FIG.17 FIELD OF CODE POINTS | | | | | | | | | | | |

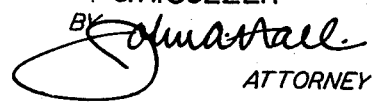

INVENTORS R.K.SMITH
          J.H.SULZER
BY
                     ATTORNEY

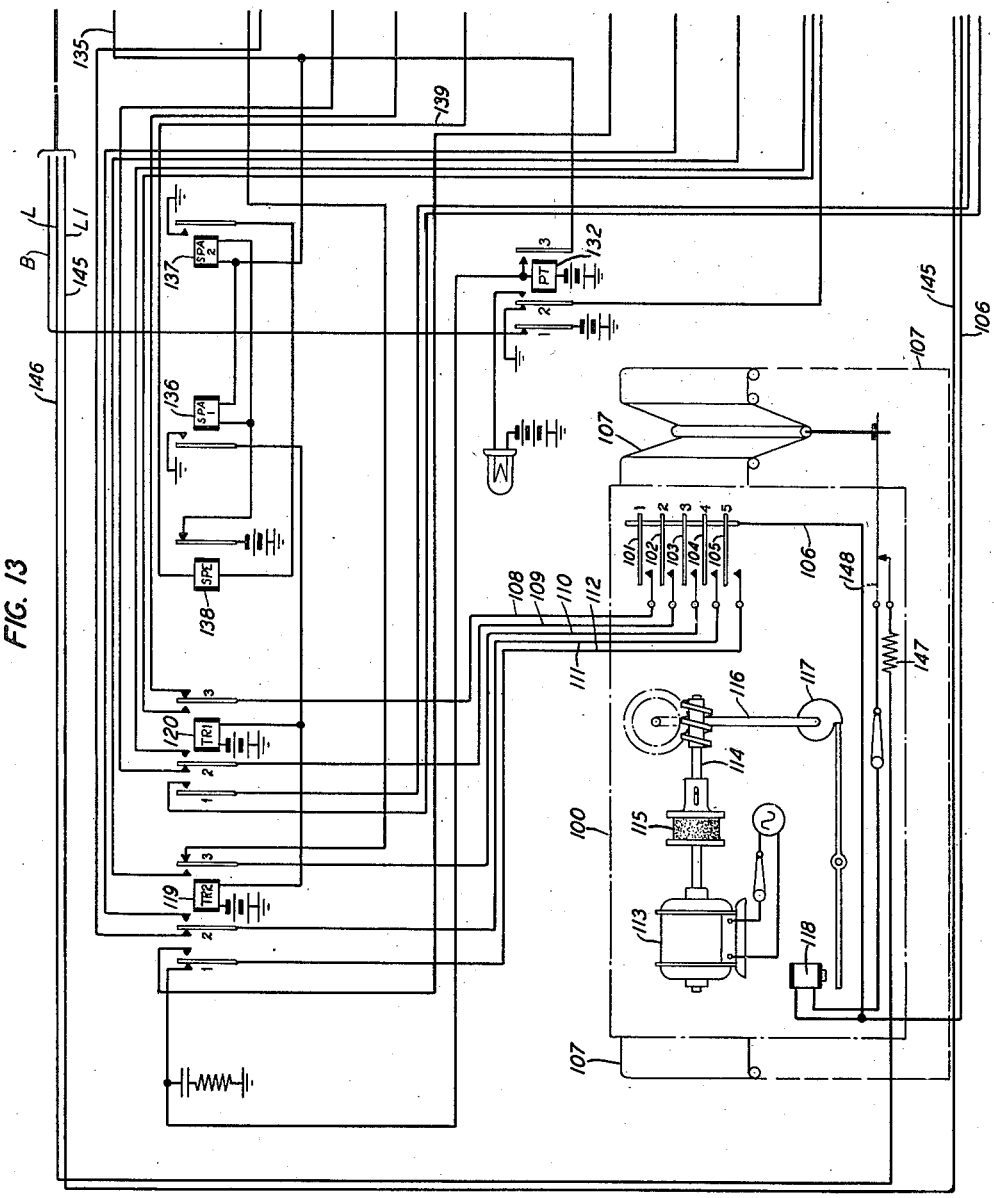

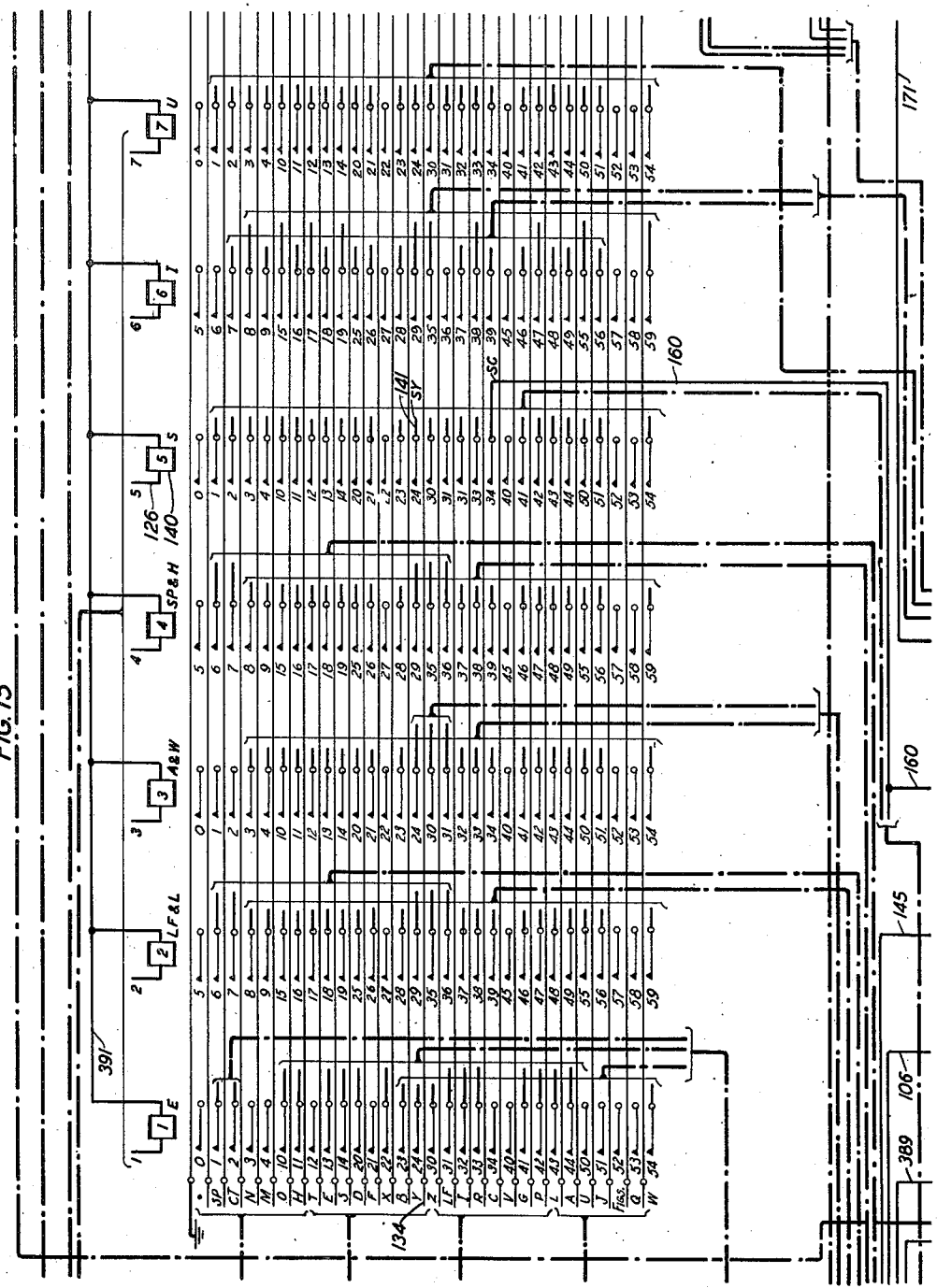
FIG. 15
INVENTORS R.K.SMITH
J.H.SULZER
ATTORNEY

INVENTORS R.K.SMITH
J.H.SULZER

ATTORNEY

Sept. 7, 1943.  R. K. SMITH ET AL  2,328,750
TEST DEVICE
Filed April 29, 1942  66 Sheets-Sheet 19

INVENTORS R.K.SMITH
J.H.SULZER
ATTORNEY

INVENTORS R.K.SMITH
J.H.SULZER
BY
ATTORNEY

Sept. 7, 1943.   R. K. SMITH ET AL   2,328,750
TEST DEVICE
Filed April 29, 1942    66 Sheets-Sheet 28

INVENTORS R.K.SMITH
J.H.SULZER
BY
ATTORNEY

Sept. 7, 1943. R. K. SMITH ET AL 2,328,750
TEST DEVICE
Filed April 29, 1942 66 Sheets-Sheet 39

INVENTORS R.K.SMITH
J.H.SULZER
BY
ATTORNEY

Sept. 7, 1943.  R. K. SMITH ET AL  2,328,750
TEST DEVICE
Filed April 29, 1942  66 Sheets-Sheet 42

FIG.47

INVENTORS R.K.SMITH
J.H.SULZER
BY
ATTORNEY

Sept. 7, 1943.  R. K. SMITH ET AL  2,328,750
TEST DEVICE
Filed April 29, 1942   66 Sheets-Sheet 43

INVENTORS R. K. SMITH
J. H. SULZER
BY
ATTORNEY

Sept. 7, 1943.   R. K. SMITH ET AL   2,328,750
TEST DEVICE
Filed April 29, 1942   66 Sheets-Sheet 44
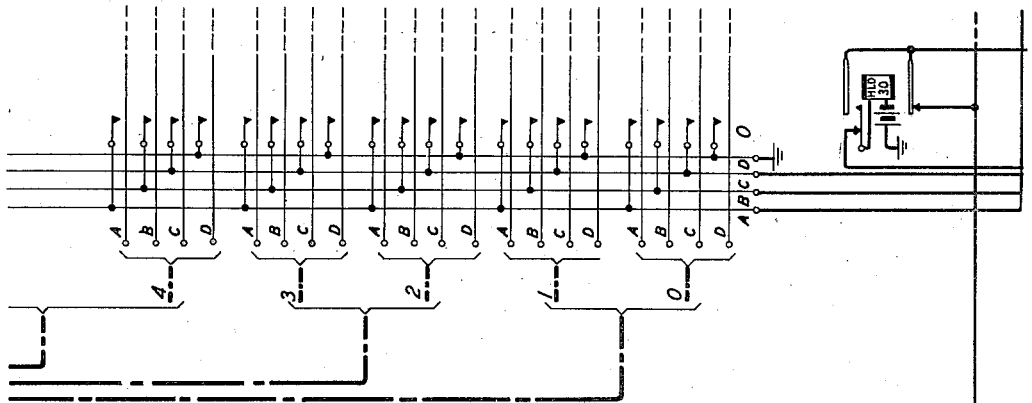
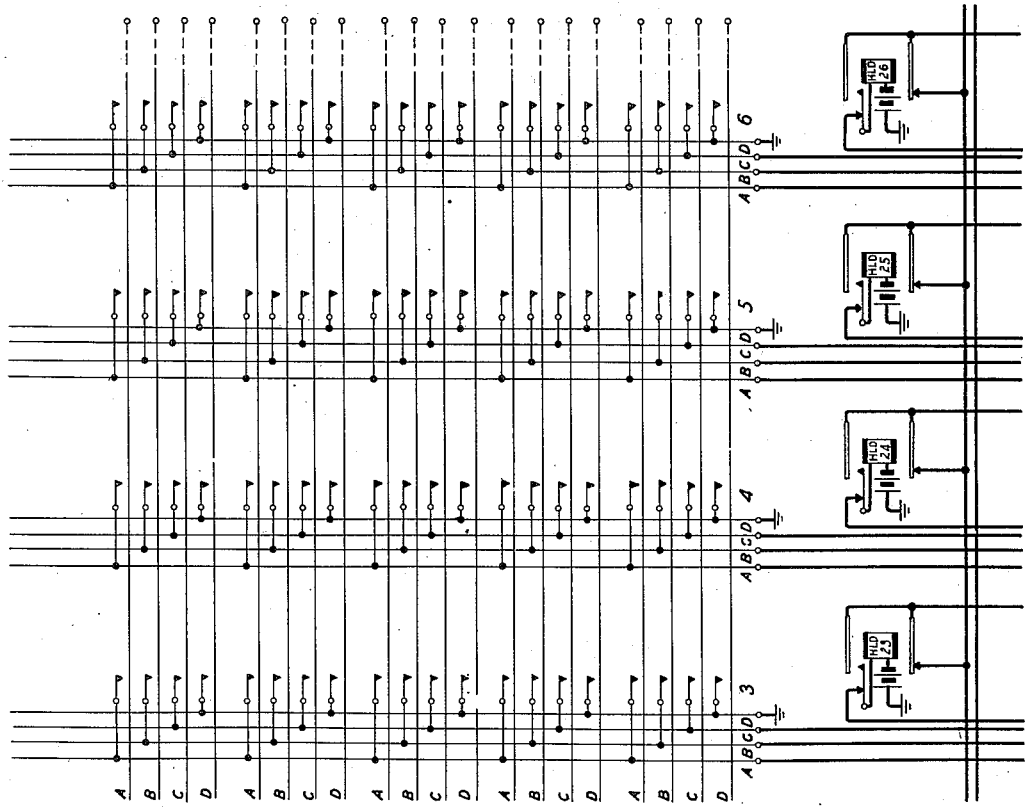
FIG. 49
INVENTORS R. K. SMITH
J. H. SULZER
BY
ATTORNEY Sept. 7, 1943.  R. K. SMITH ET AL  2,328,750
TEST DEVICE
Filed April 29, 1942   66 Sheets-Sheet 45

INVENTORS R.K.SMITH
J.H.SULZER
ATTORNEY

Sept. 7, 1943.  R. K. SMITH ET AL  2,328,750
TEST DEVICE
Filed April 29, 1942   66 Sheets-Sheet 56
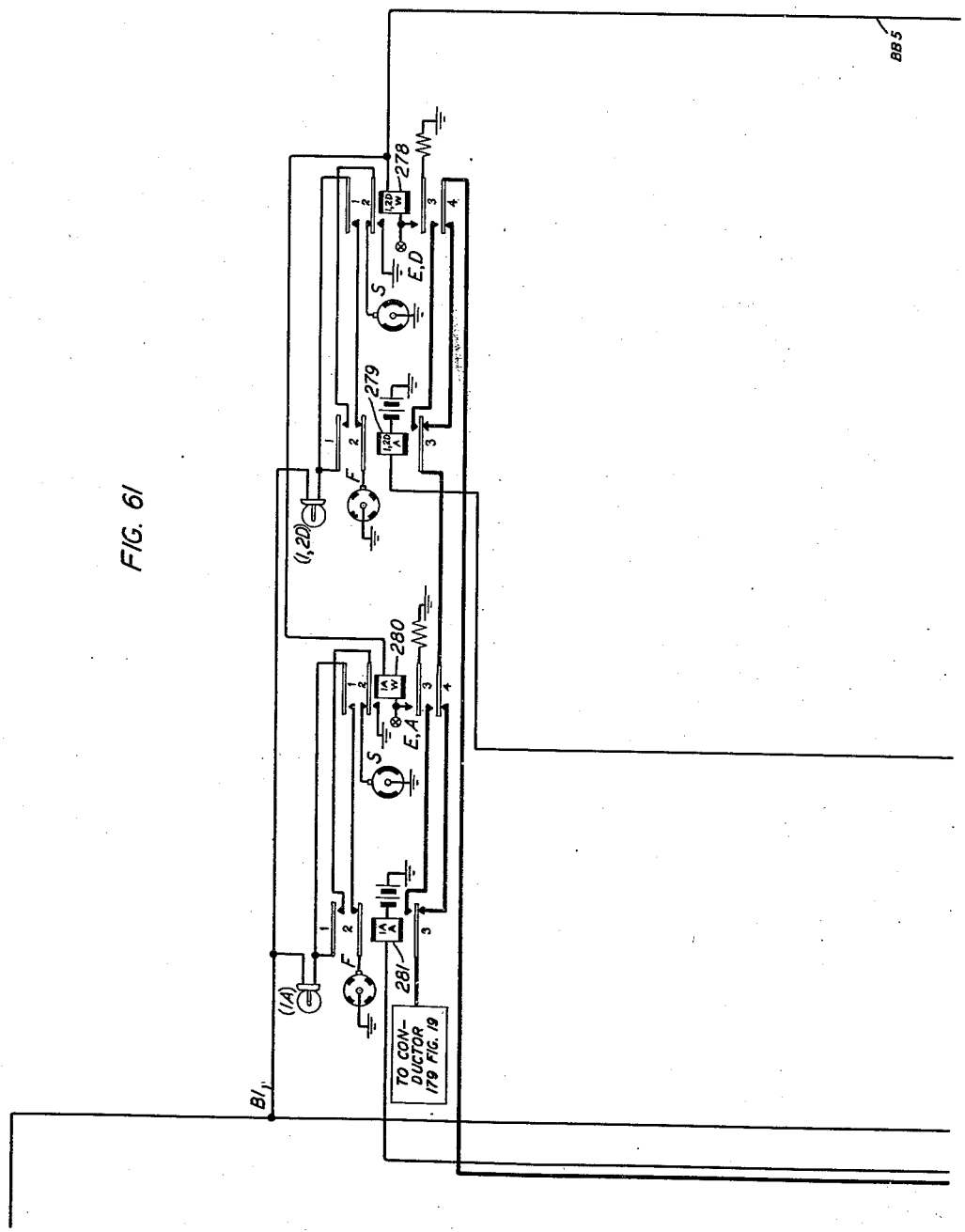
FIG. 61
INVENTORS R.K.SMITH
J.H.SULZER
BY
ATTORNEY Sept. 7, 1943.　　　R. K. SMITH ET AL　　　2,328,750
TEST DEVICE
Filed April 29, 1942　　　66 Sheets-Sheet 62

FIG. 67

INVENTORS R.K.SMITH
J.H.SULZER
BY
ATTORNEY

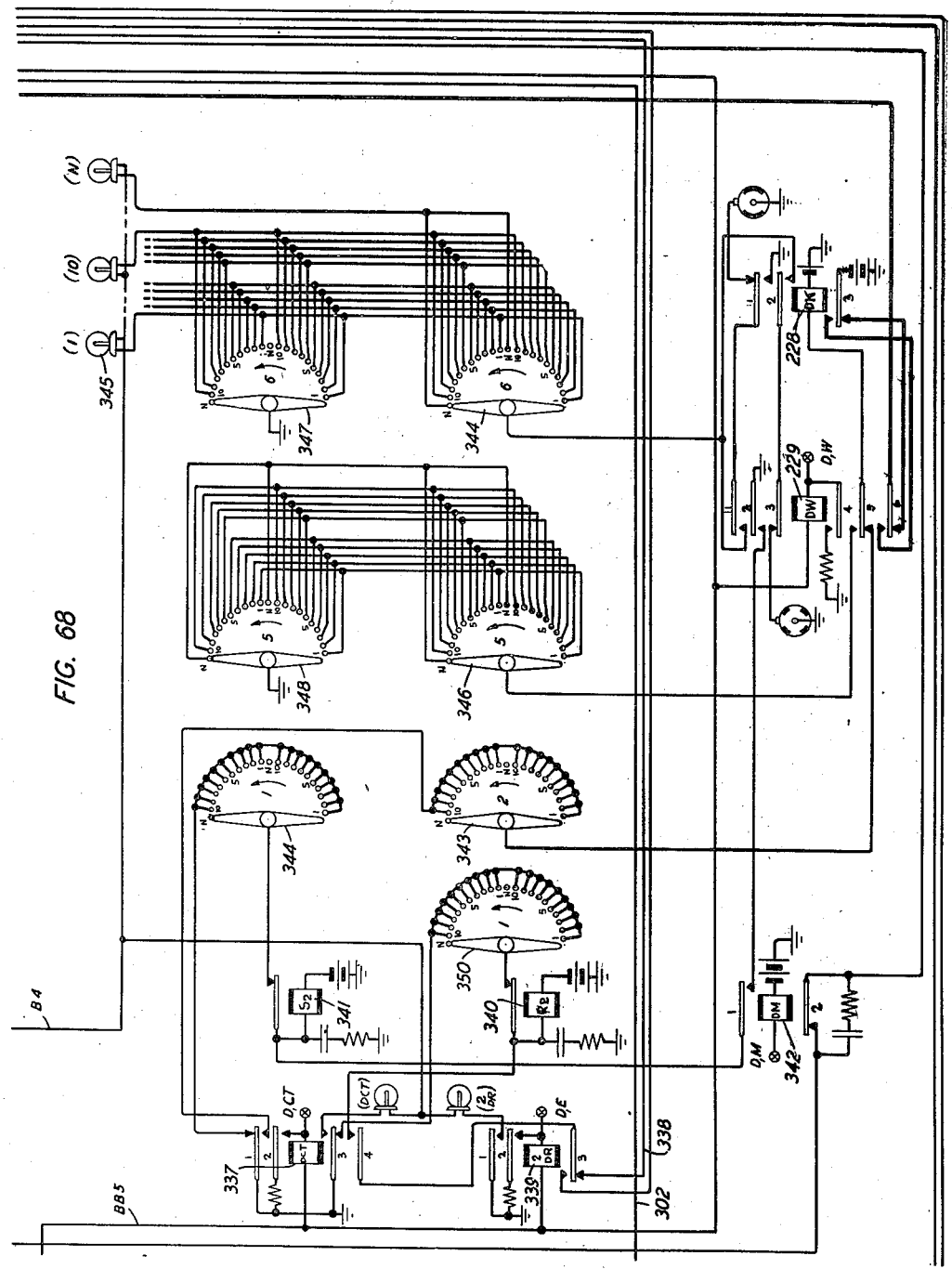

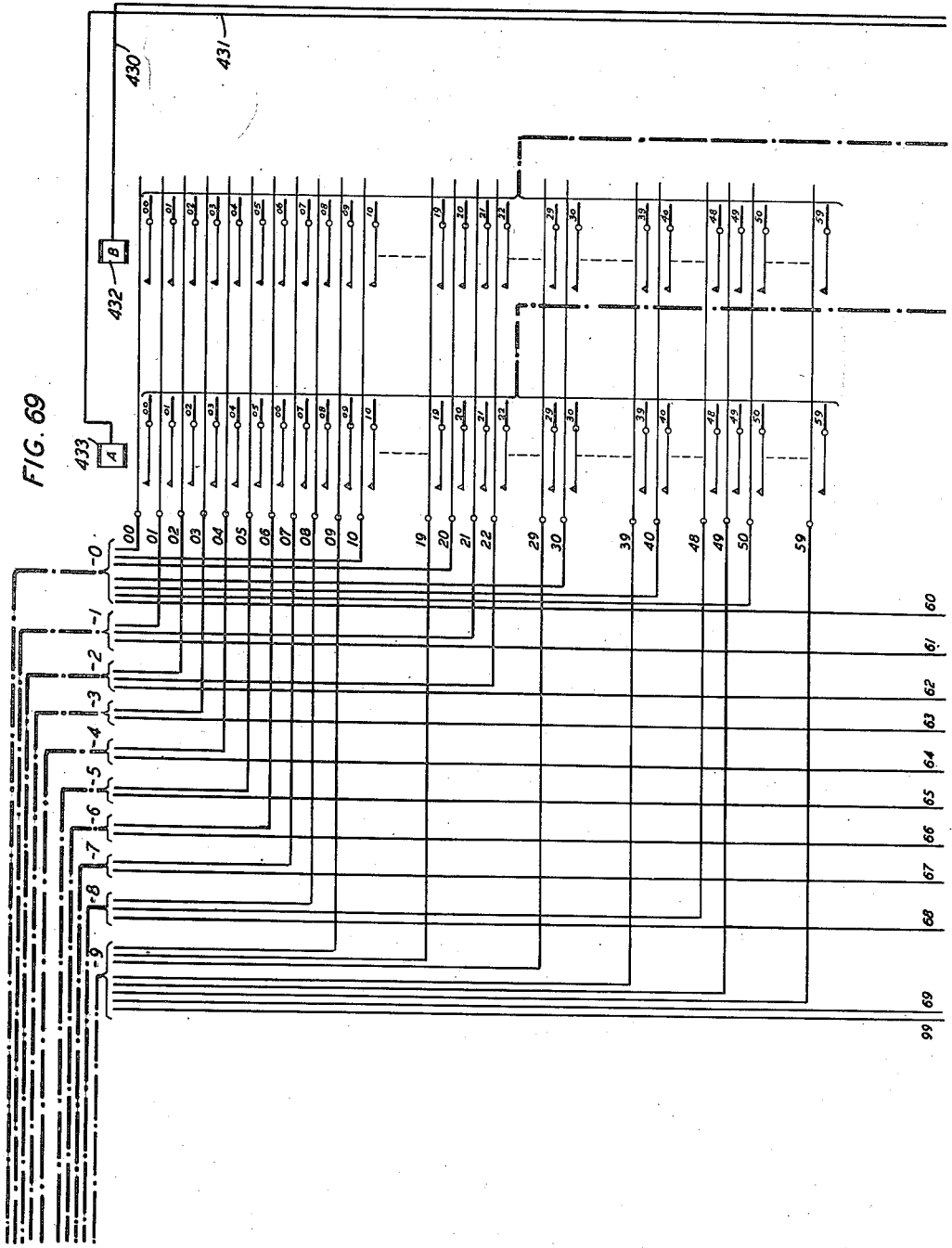

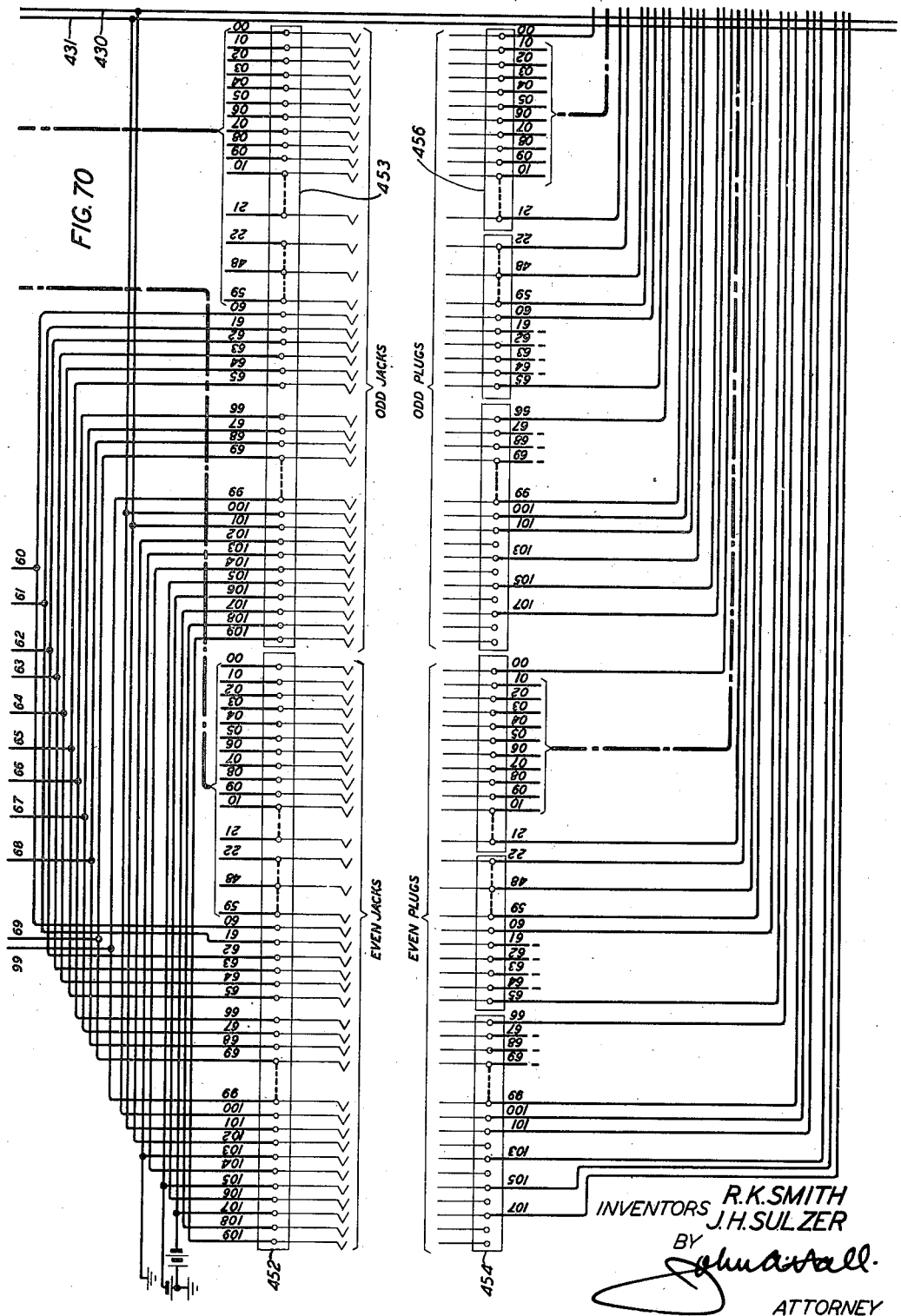

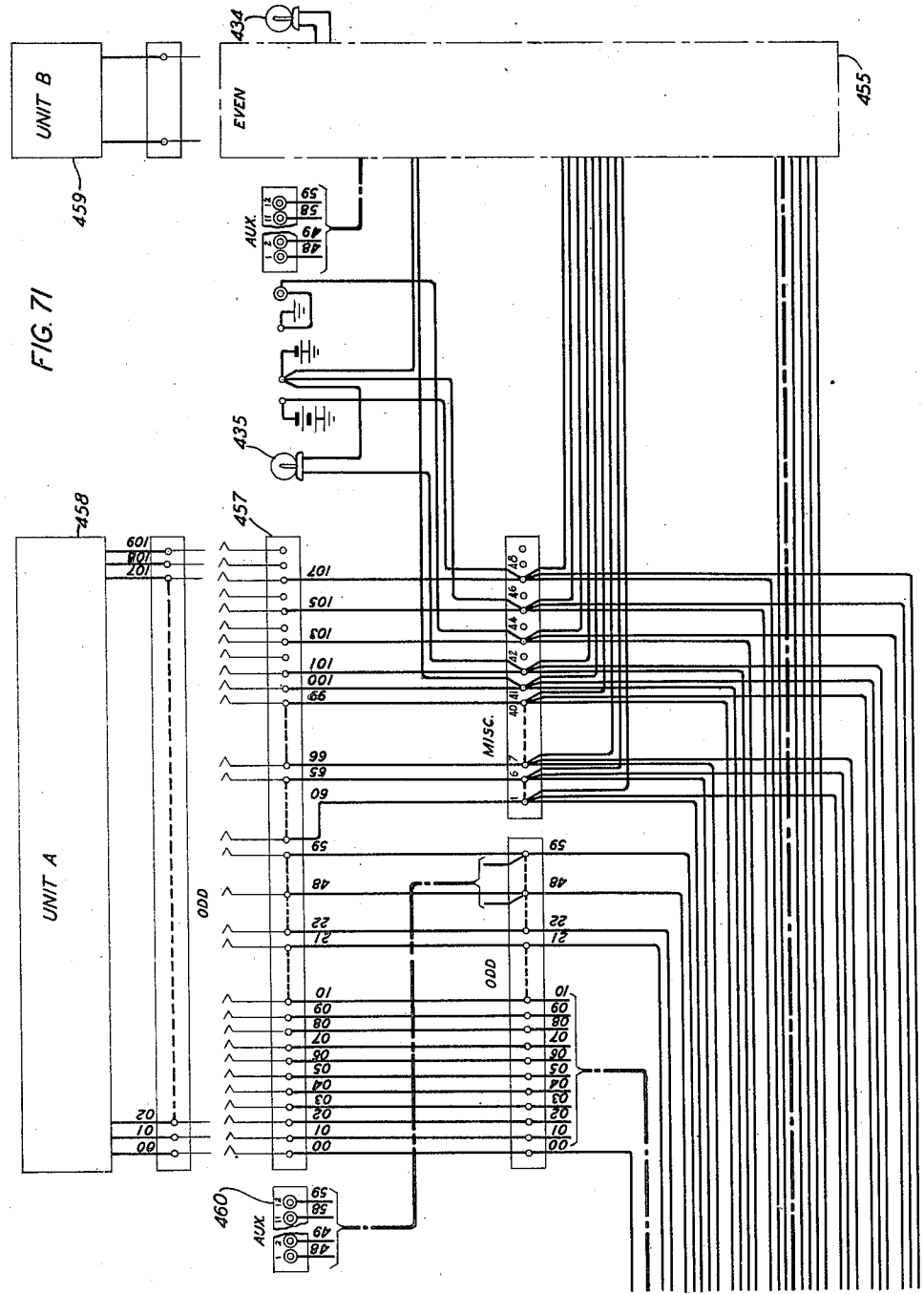

Patented Sept. 7, 1943

2,328,750

UNITED STATES PATENT OFFICE 2,328,750

TEST DEVICE

Robert K. Smith, Newark, and John H. Sulzer, Westfield, N. J., assignors to Western Electric Company, Incorporated, New York, N. Y., a corporation of New York Application April 29, 1942, Serial No. 441,057

32 Claims. (Cl. 175—183)

This invention relates to control systems and particularly to devices for automatically controlling a plurality of operations according to a prearranged plan.

The object of the present invention is to provide a universal control machine which will automatically control a series of prearranged operations on various types of devices each of which requires a different prearranged series of operations. The present invention is an improvement of the device disclosed in the application of John H. Sulzer, Serial No. 438,930 filed April 14, 1942. An application Serial No. 441,056 filed April 29, 1942, in the name of Hanson et al. contains the same disclosure as the present application, but claims inventions differing from those claimed herein.

In manufacturing plants where various types of electrical devices wired into circuits are produced, the testing of the finished articles or the units which may later be assembled into more extensive systems presents a major problem. Manual testing is slow, laborious and open to error which must be carefully checked and rectified and hence automatic testing is preferably employed. Where the device or the article produced is of one design or where very great numbers of any one type are produced, the construction of a machine or device particularly adapted to test such device or article is justified. But where limited numbers of various types of devices are manufactured it becomes desirable to have a universal type of testing machine which can be readily adapted to the testing of these various types of manufactured devices.

The testing device is controlled by indexing means each appropriately designed for a particular device or article to be tested. Thus a temporary connection is made to such device, the corresponding indexing means placed in the machine and the designated tests automatically made.

In manual testing a certain condition is imposed on the device or article under test and the result is observed on a meter, or signal or other indicating device. In automatic testing an electrical responsive device observes the result of the test. A testing circuit comprising a chain circuit is employed having a plurality of pairs of relays for changing the path thereof. One relay of each pair breaks the continuity of the chain circuit and the other relay of the pair repairs the break. The one relay of the pair is operated to designate a certain condition imposed on the device or article under test and the other relay of the pair designates the response of the device or article. If the response is correct then the operation of the said other relay of the pair repairs the break in the chain circuit caused by the said one relay of the pair. Through the employment of a plurality of such chain circuit controlling relays a plurality of tests may be made simultaneously. If all such simultaneously performed tests produce a satisfactory result then an advancing operation is automatically performed and another and different plurality of tests is performed. If all the tests designated by the indexing means are performed satisfactorily, then a satisfaction signal is operated, whereupon the device or article under test is passed as satisfactory and another device or article is associated with the machine.

The fundamental circuit for automatic testing comprises a key relay and a watching relay both energized as directed by the indexing means. Companion to the watching relay is a signal relay. The watching relay breaks the chain circuit and the signal relay repairs the break. The key relay imposes a given condition on the device under test and the signal relay responds to the operation caused by such imposed condition. The chain circuit terminates in a satisfaction relay which through its operation automatically causes an advance in operations. The terminology herein employed is for convenience and is dictated by the analogy between the functions of the relays and the corresponding apparatus and operations employed in manual testing.

Hereinafter certain testing features will be described. Each such testing feature involves the use of at least a watching relay and a signal relay. Each generally also involves a key relay, though in some cases the key relay is dispensed with since its function is discharged by the key relay for some other testing feature simultaneously employed.

In previously disclosed systems the device or article under test was wired permanently (during the testing of such device or article) to the test set terminations and hence one testing feature could be used but once, even though the same test be made a number of times in different locations during the complete testing period. Therefore in such prior systems certain test features had to be duplicated. In the present invention each testing feature is connected to the device under test only when needed and through such arrangement may be shifted from time to time to association with different parts of the circuit under test, and therefore a smaller number of test features can be used. This is accomplished by a switching arrangement under control of the indexing means. Means are therefore provided to selectively associate different testing features with any one portion of the device under test and to associate any one testing feature with various parts of the device under test.

A feature of the invention is a means controlled by the indexing means for temporarily connecting a testing feature to the device or article under test. In the preferred embodiment of this invention this means is a crossbar switch through which the testing features terminating in one set of conductors in one coordinate direction and the terminations of the device or article under test terminating in conductors in another coordinate direction may be interconnected by coordinately arranged sets of permanently paired contacts. The operation of these sets of contacts is under direction of the indexing means so that one set of tests may be set up, performed and then torn down expeditiously and accurately. This operation may be repeated any number of times desired, each time ending in the operation of the satisfaction relay which becomes the signal that the designated tests have proved to be satisfactory. At the end of the complete testing operation a satisfaction signal will be operated whereupon the device or article under test will be passed as satisfactory and another one associated with the testing device.

In the preferred embodiment of the present invention the indexing means is in the form of a tape with holes punched therein in accordance with certain permutation codes. Also in the preferred embodiment of the present invention certain instrumentalities familiar in printing telegraph working are employed though it will be understood that the invention is not limited to the use of these instrumentalities. The functions of this apparatus may be carried out by other apparatus of vastly different design.

The indexing means, in the form of a tape, is punched in two letter codes each group of two letter codes being the means for designating a single switching operation. In the operation of the testing device the tape is moved through a transmitter having a plurality of sensing fingers for detecting the codes punched therein. Each letter code will, upon reaching the fingers of the transmitter have the electrical product of its letter stored. When the second letter code of the combination reaches the fingers of the transmitter the total combination of the two letter codes will cause an electrical connection to be made which results in the association of a particular test feature with a particular part of the circuit of the device under test. This connection will become locked in. As the tape continues moving other test feature connections will be likewise established. When all the desired test features have been set up for one particular test, which may consist of one simple test or a plurality of tests to be simultaneously made, a two letter test code will be sent to the control circuit to stop the movement of the tape. The tape movement is momentarily stopped at this point to permit the control circuit to check the response of the designated testing features. If the response is correct the satisfaction relay will operate and permit the tape to start its movement again. Thereupon the connections to the test features set up are dismissed and a new set in accordance with further punchings of the tape are established. This cycle is continued until all the tests designated by the indexing means have been performed, whereupon a satisfaction signal is operated.

Another feature of the invention is an indexing means in the form of a tape perforated in the manner common in the printing telegraph art with letter and functional code groups of perforations. Since the number of switching operations is greater than the ordinary number of codes available, so called two letter codes are used. It should be noted however that the invention is not limited to the use of two letter codes but that any number might be used. The capacity of the device is unlimited, so that in cases where two letter codes do not provide enough combinations three letter codes might be used and so on. A conventional tape transmitter is employed to sense the codes encountered and to send electrical impulses corresponding thereto. Deviating from the printing telegraph art practice these impulses are not rearranged sequentially but are transmitted simultaneously to a decoder. This decoder then controls means to operate the switches which interconnect the circuit of the device under test and the test features as well as to control the test features.

Another feature of the invention is the use of an indexing means unrestricted as to size. Heretofore the indexing means was in the form of a standard sized card and hence the number of testing operations which could be performed were limited by the size of the card. The indexing means of the present invention however is in the form of a tape and may be made as short or as long as desired so that the capacity of the present device is unlimited.

Another feature of the invention is in the use of two letter codes whose elements are simultaneously decoded to selectively control the interconnection of the device under test and the test features and to selectively control the test features.

Another feature is a distributing arrangement interposed between the decoder and the circuits to be controlled which may be termed a translator. The decoder responds to various code impulses simultaneously transmitted and produces a given set of electrical conditions and the translator converts these electrical conditions into operating impulses for the switches and test features. By the use of two letter codes and a pair of decoders alternatively operated, one for the first code and the other for the second code, a pair of given electrical conditions may be selectively produced. The translator may consist of a plurality of multicontact relays selectively operated by one of said pair of electrical conditions and the contacts of said operated relay selectively rendered operative by the other of said pair of electrical conditions whereby one of a great field of circuits from the contacts of said multicontact relays is rendered effective.

Another feature of the invention is therefore a means responsive to the sequential passage of a plurality of letter codes through a tape transmitter for simultaneously transmitting the elements of each code and combining the result into a single electrical condition selectively applied to a large field of circuits. Whereas the code perforations are sequentially encountered by the transmitter, in order to combine the electrical conditions produced by two serially arranged groups of perforations into a resultant single electrical condition, a means is employed to maintain the effect of the electrical condition produced by one code group until it may be combined with the electrical condition produced by a following code group. This is in the form of a locking circuit for the first decoder which is automatically unlocked when the tape transmitter passes the second code.

Another feature of the invention is a system of signals to facilitate the rapid discovery of an unstandard condition when it is encountered. Under normal conditions the control device once started will automatically operate to make a large plurality of tests and to finally operate a satisfaction signal as an indication that all tests specified by the indexing means have been satisfactorily performed. If, however, an unstandard condition is encountered then a general failure signal will be displayed. At the same time a normally open circuit for the test feature signals is closed so that a specific failure signal associated with the test feature which has discovered the unstandard condition may be displayed. Since any particular test feature may, during a complete test of an apparatus unit, be associated with different parts of the circuit of the device under test, means is provided to display a signal indicating with which terminations of such circuit the test feature is at the moment associated. This means takes the form of a key associated with each test feature and a field of signals numbered in accordance with the numbering of the terminations of the circuit of the device under test. When the general failure signal is displayed the key associated with the specific failure signal then being displayed is operated whereupon the location signals are operated so that the tester may at once examine the circuit under test with the definite knowledge of the approximate location of the encountered unstandard condition.

Another feature of the invention is the use of an indicator popularly termed the "should be" indicator. When a device or article to be tested is designed, the separate components are arbitrarily numbered in accordance with their physical location. The designer who is responsible for designating the tests to be performed will include a code in the indexing means to display a signal for each component to indicate when it should be operated and when an unstandard condition is encountered the closing of the normally open circuit for the individual signals will result in the display of signals in the "should be" indicator to show which components of the device under test should be in operation. The circuits of the should be indicator are not cooperatively associated with any of the test features but are operated as other parts of the control device through the transmission of certain codes in the indexing means.

Another feature of the invention is the provision of means for temporarily stopping the action of the automatic testing device so that some special manual operation may be performed. Accordingly a number of manual operation relays are provided each of which when operated automatically by the indexing means will stop the operation of the tape transmitter and hold up further automatic testing. When this point has been reached in the indexing means a signal will be displayed which will notify the attendant that a predetermined manual test should be made. When this has been satisfactorily performed the attendant will operate an associated key which will result in the starting of the automatic testing device on a further series of automatic tests.

Another feature is a means for making optional tests. It frequently happens that one device to be tested differs from another only in certain minor details requiring only certain additional tests. These additional tests are provided for in the indexing means but each is preceded by and ended with a code for operating and releasing an optional test relay. Associated with each such relay is a key for further controlling such relay. If the optional test is to be performed then the key remains unoperated with the result that the optional test relays are immediately released and all codes indexed between the operating and releasing codes for that relay to become effective. If however, it is decided that such optional test is not to be performed then the associated key is operated before the indexing means has reached that point with the result that the optional test relay operates and locks and renders all succeeding codes ineffective until the relay is released. Thus the tests designated by certain portions of the indexing means may be skipped at will.

The drawings consist of 66 sheets having the following figures:

Fig. 1 is a schematic circuit diagram used to explain the fundamental theory of testing;

Fig. 2 is a schematic circuit diagram used to explain the fundamental manner of operation;

Fig. 3 is a diagram to indicate how Figs. 4 and 5 should be placed together to form another schematic circuit diagram;

Fig. 4 is part of a schematic circuit diagram showing the indexing means, the code transmitter, the decoders and the translator by which operating and releasing impulses may be applied to a field of circuit terminations;

Fig. 5 is the second part of this schematic circuit diagram and indicates the relation between the device under test, the switches, the test features and the power termination switch;

Fig. 6 is a schematic circuit diagram used to explain in more detail the principle of operation particularly with regard to the use of two letter permutation codes of the type common in the printing telegraph art;

Fig. 7 is a fragmentary circuit diagram showing the relays of a simple test feature and illustrating particularly the operation of the test feature signal under different conditions;

Fig. 8 is a silhouette of a short piece of tape as used for the indexing means with the various codes employed arranged in alphabetical order;

Fig. 9 is a similar silhouette of a piece of tape properly perforated to cause the control device to perform a series of three tests with the arrangement of Fig. 6;

Fig. 10 is another schematic circuit diagram explaining the operation of the termination signals used to rapidly locate an unstandard condition;

Figure 14:
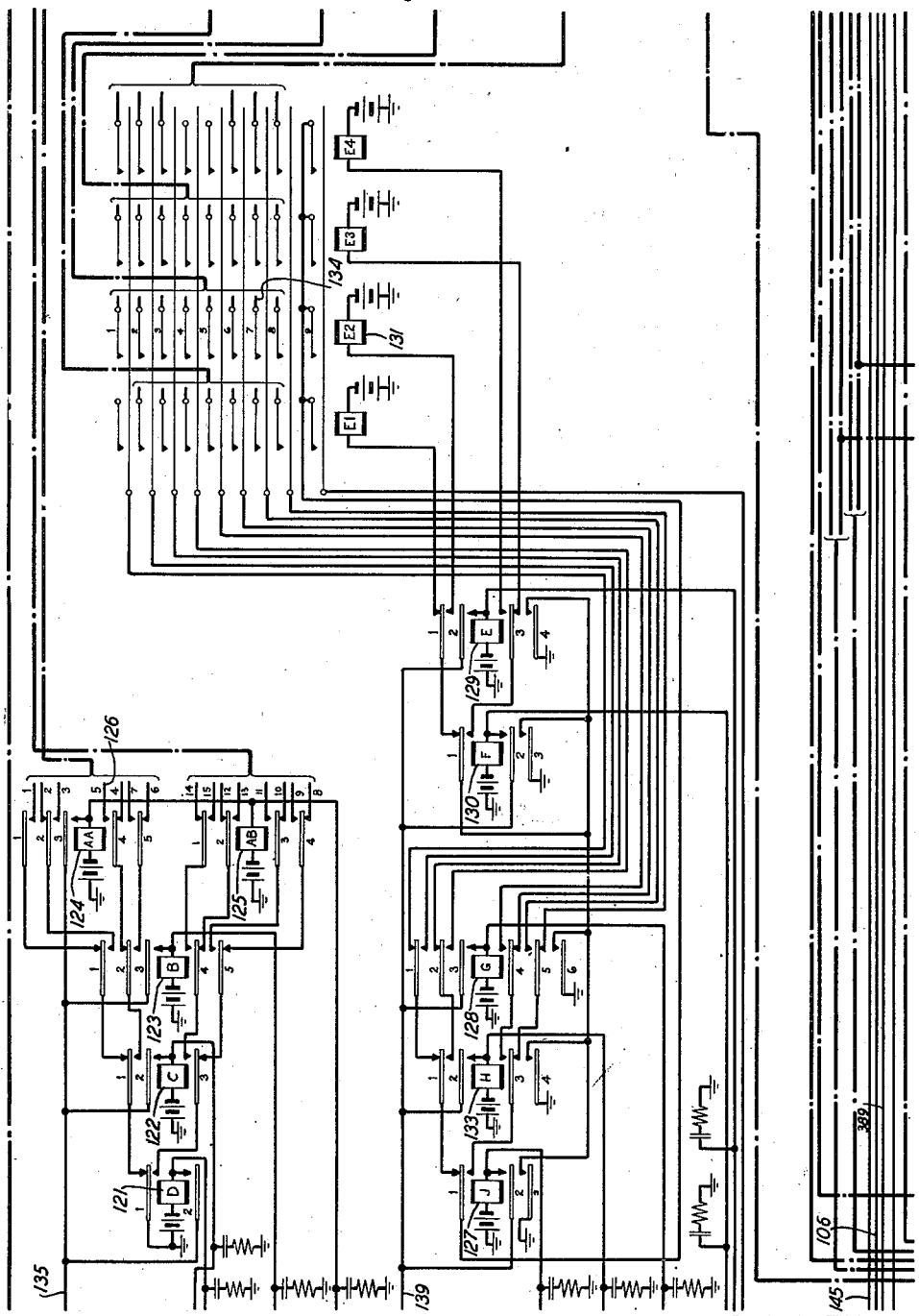
Figure 16:
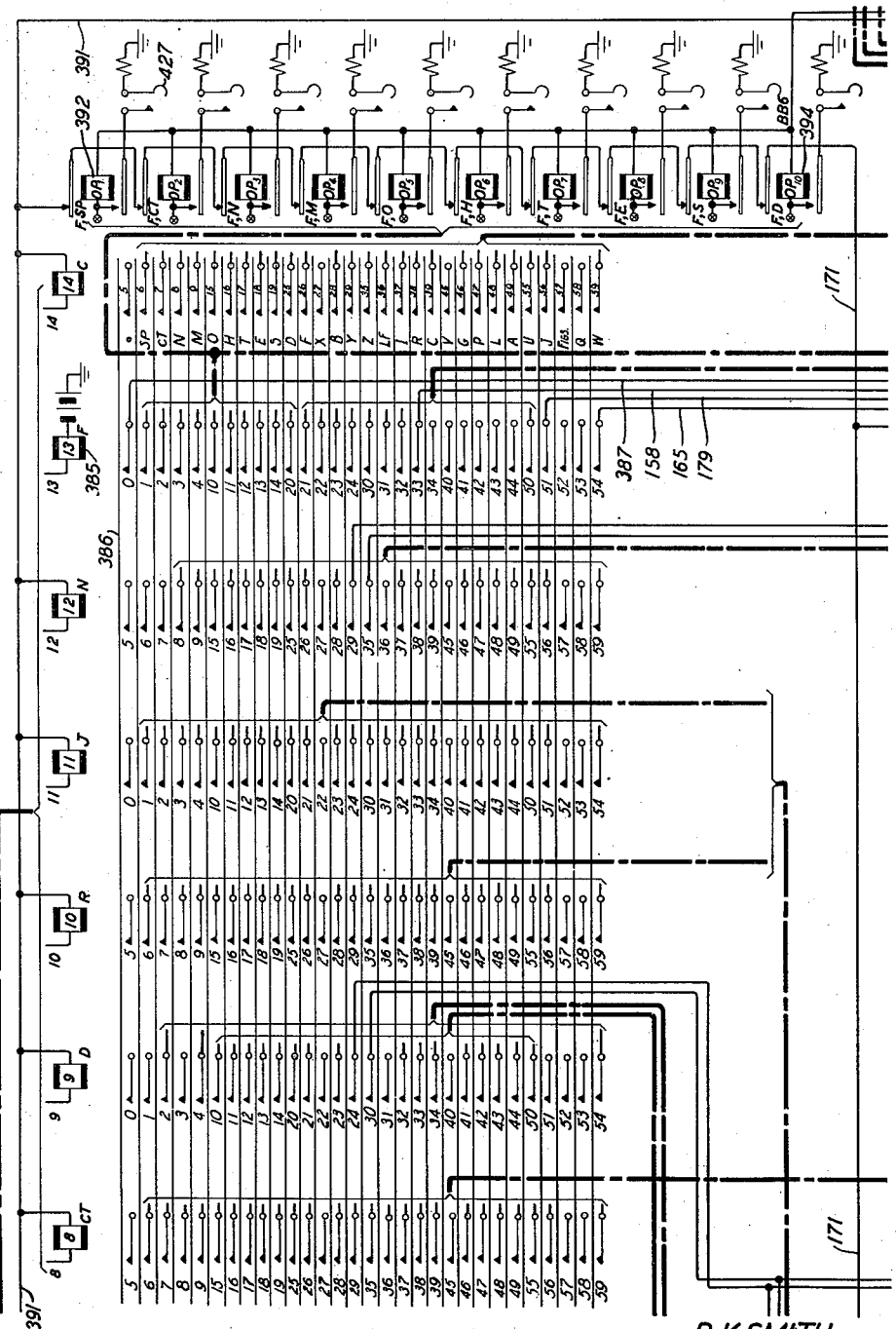
Figure 17:
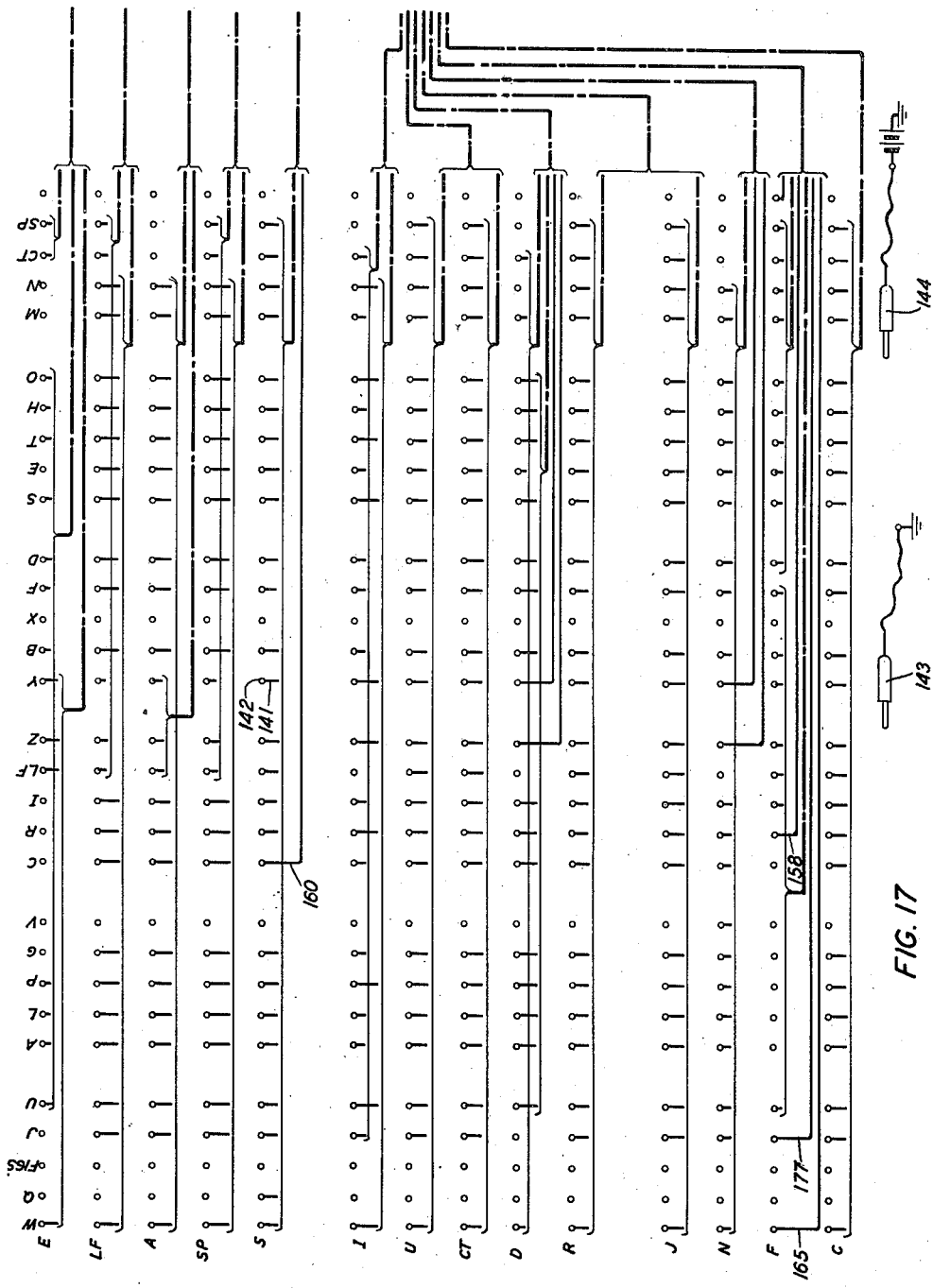
Figure 18:
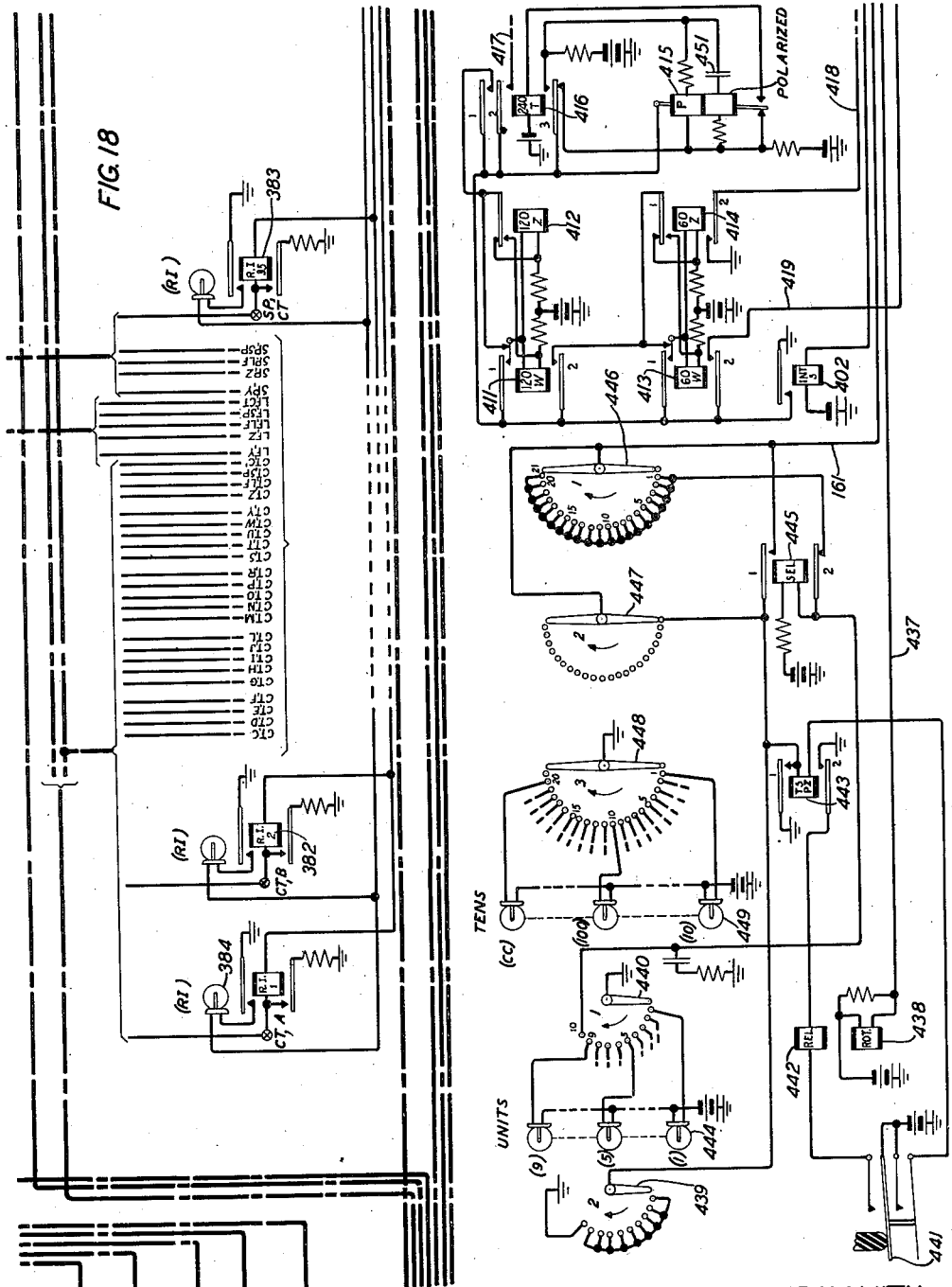
Figure 19:
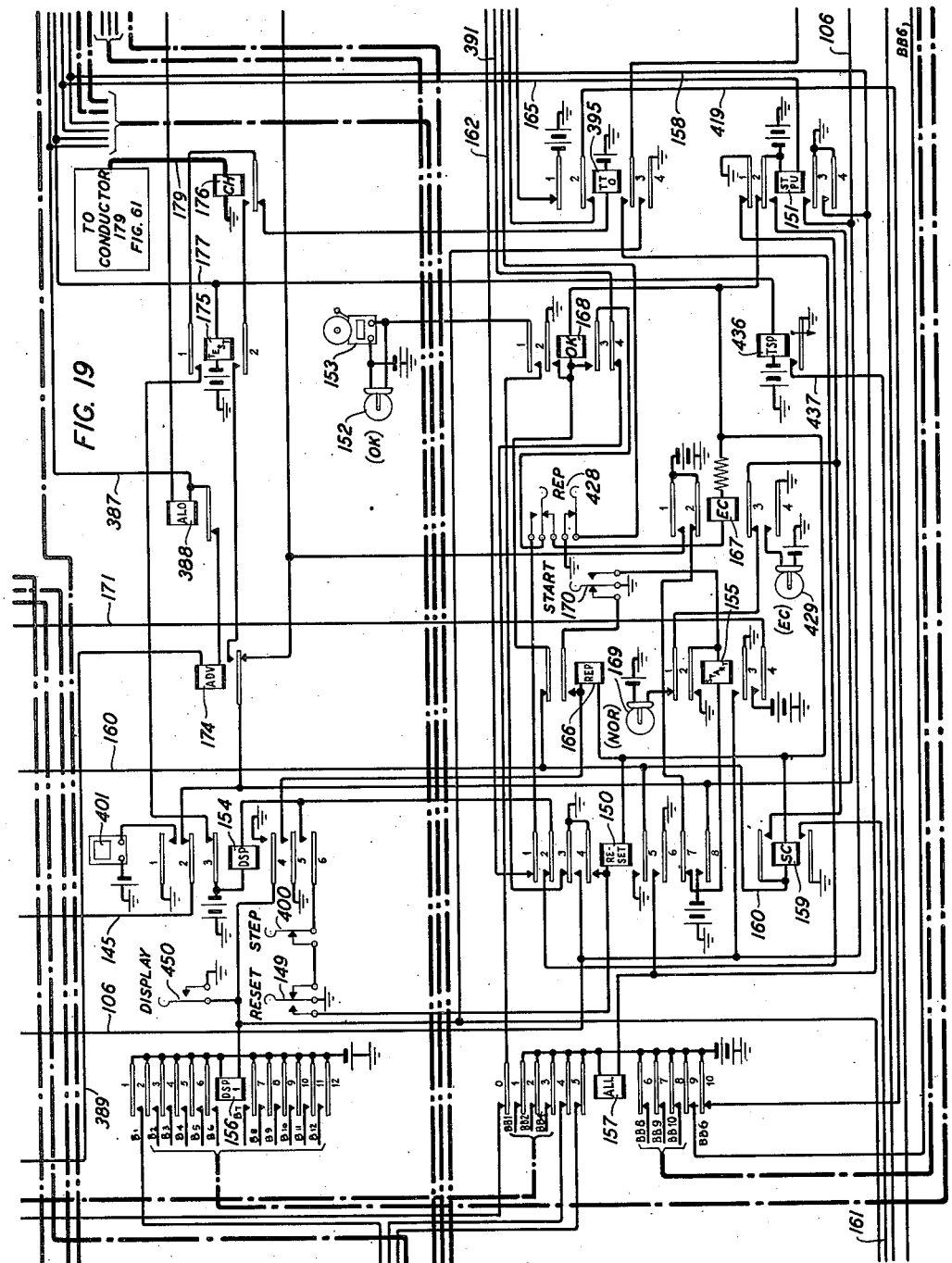
Figure 20:
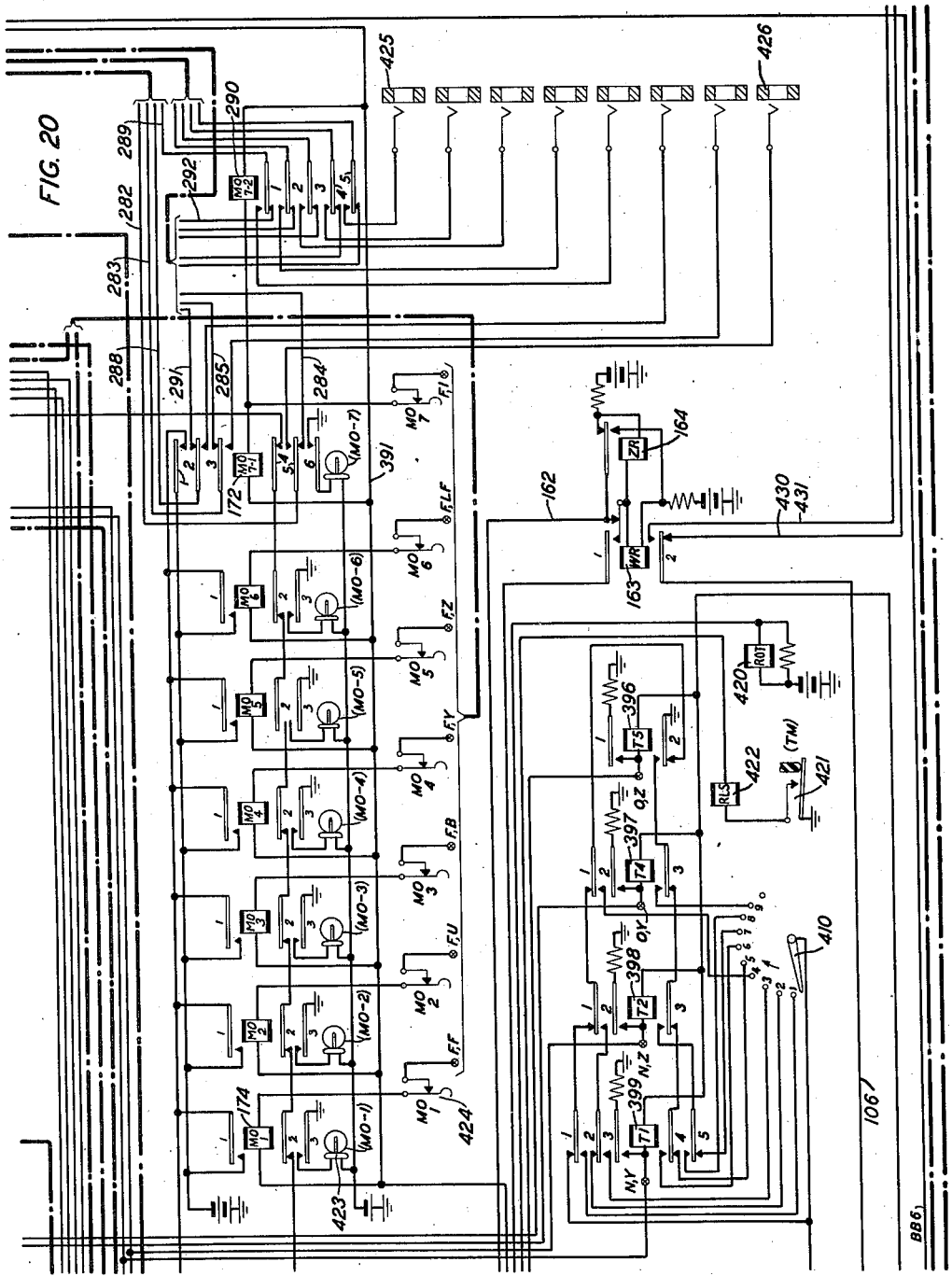
Figure 21:
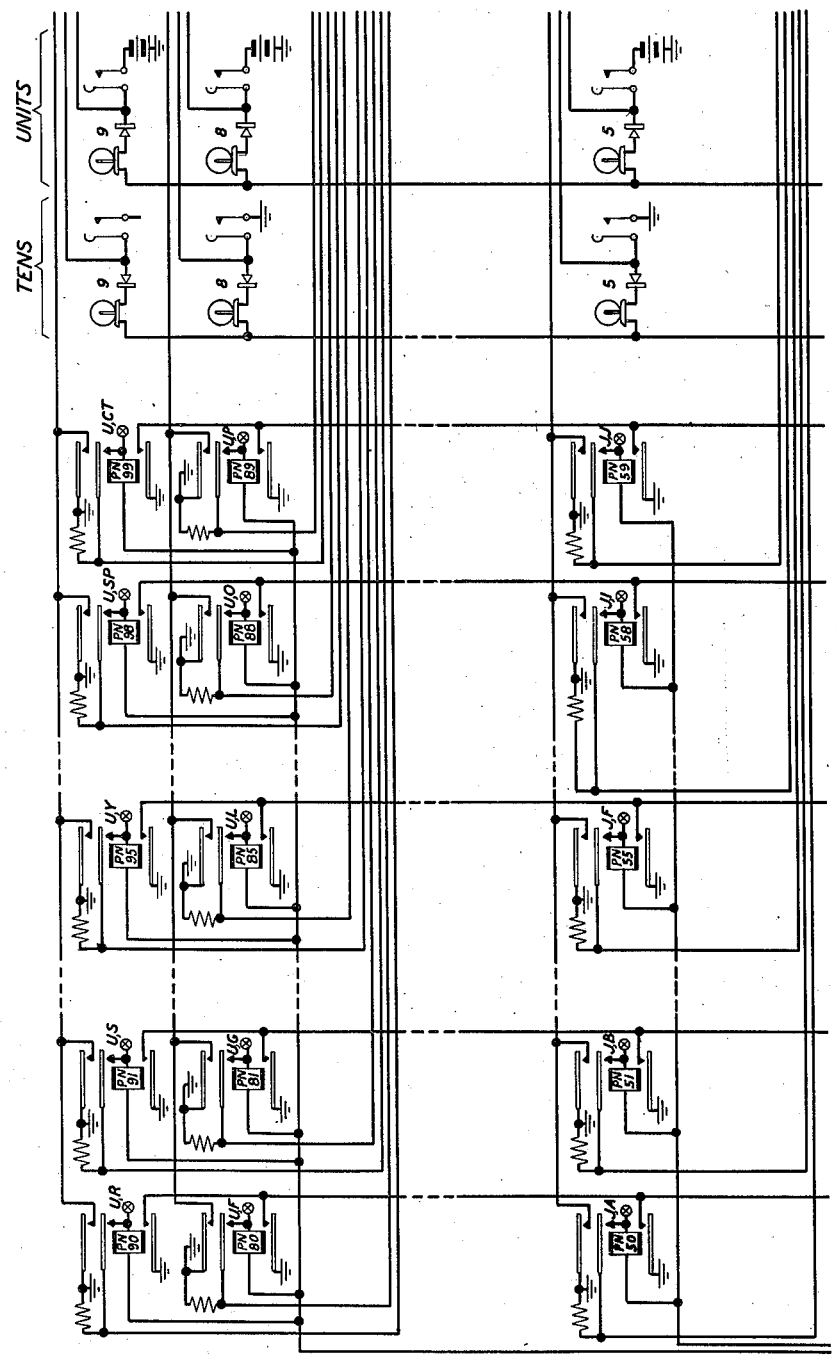
Figure 22:
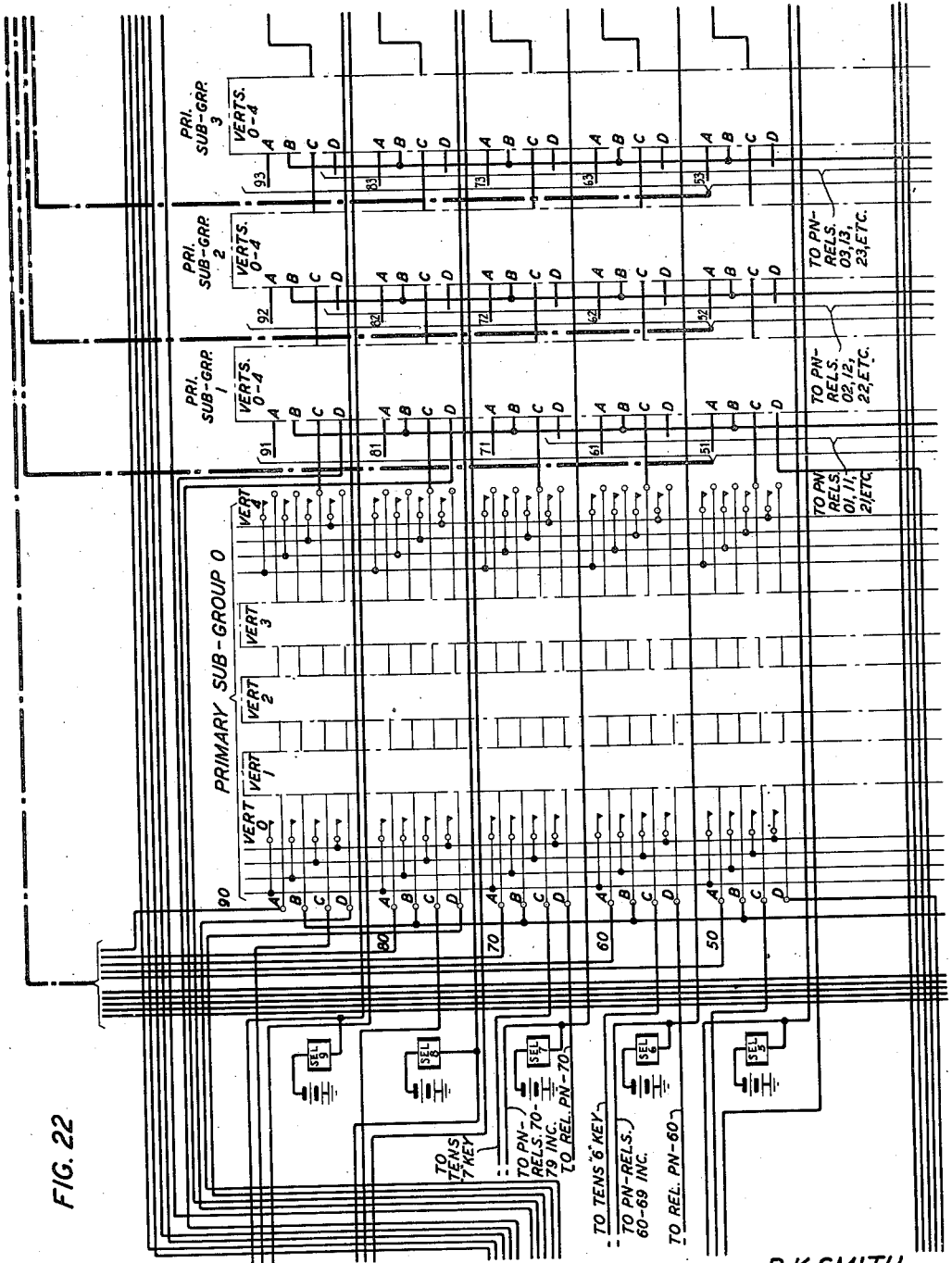
Figure 23:
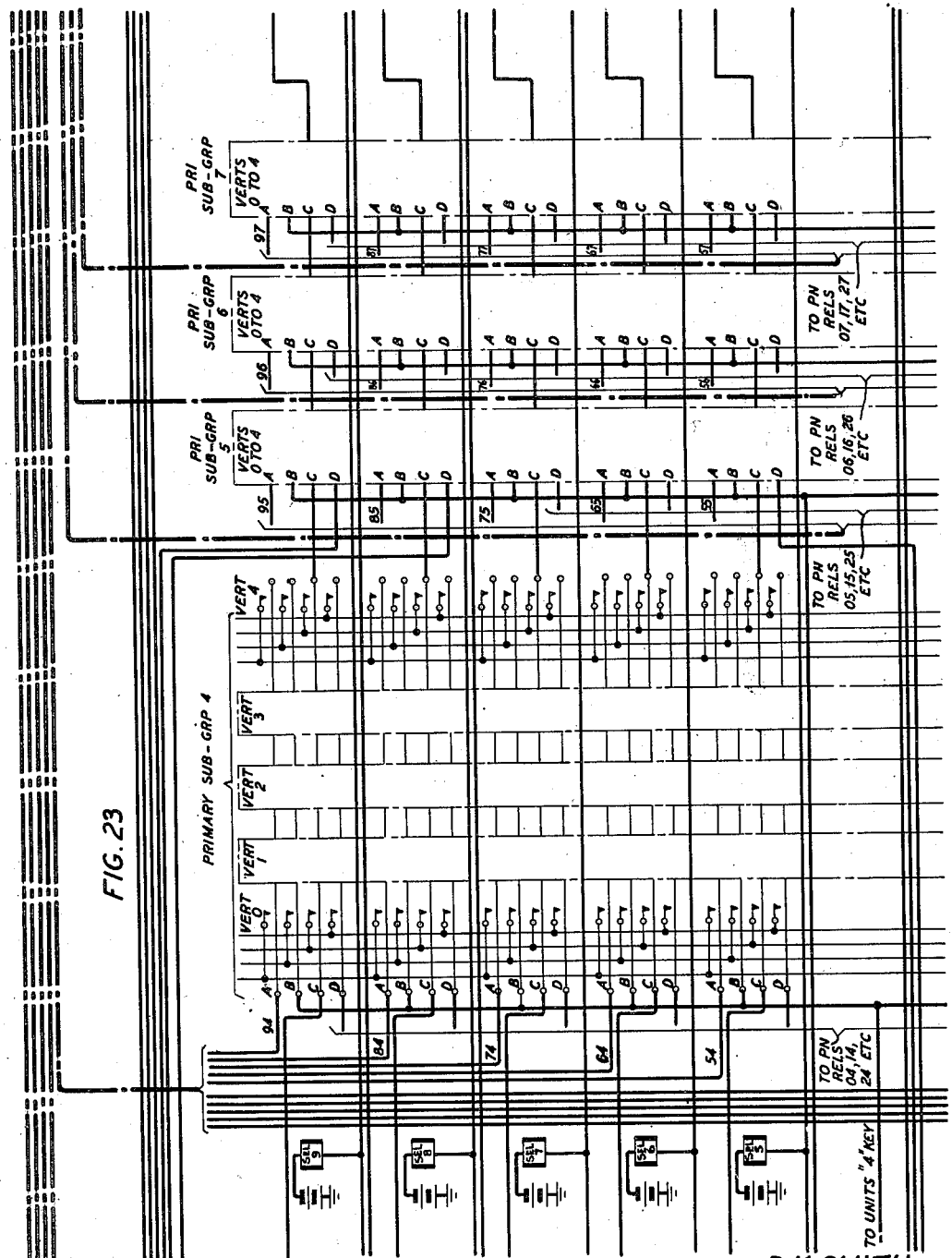
Figure 24:
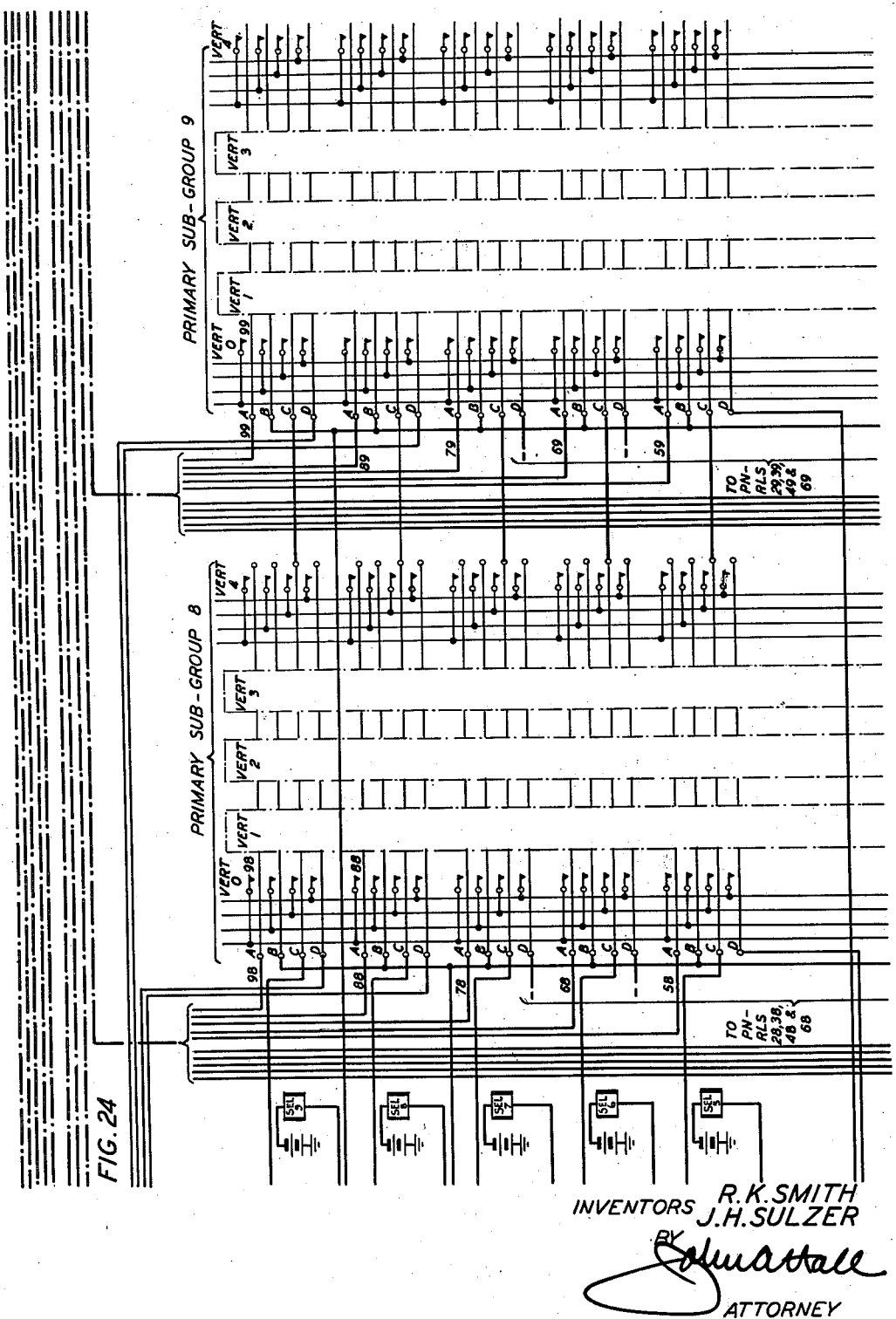
Figure 25:
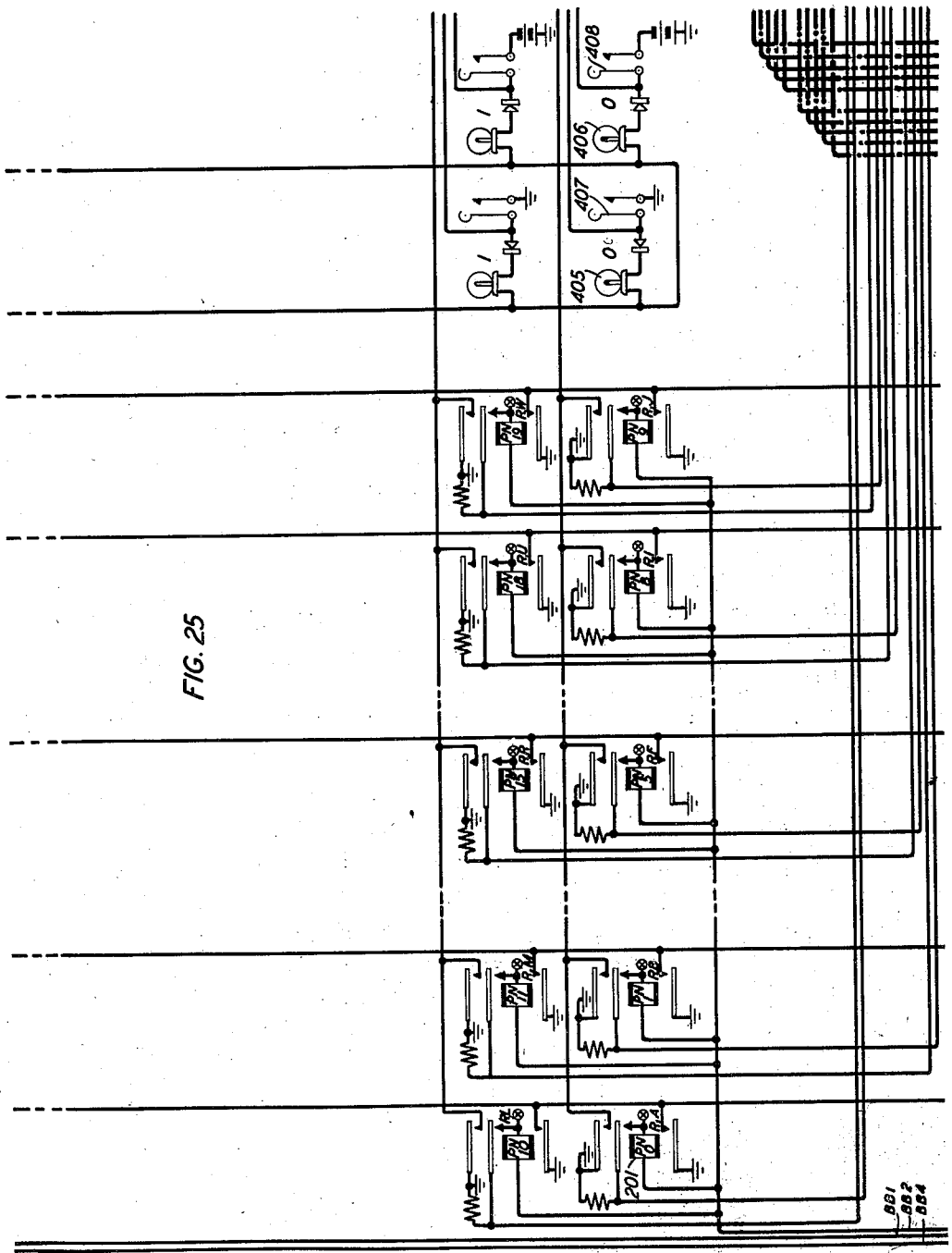
Figure 26:
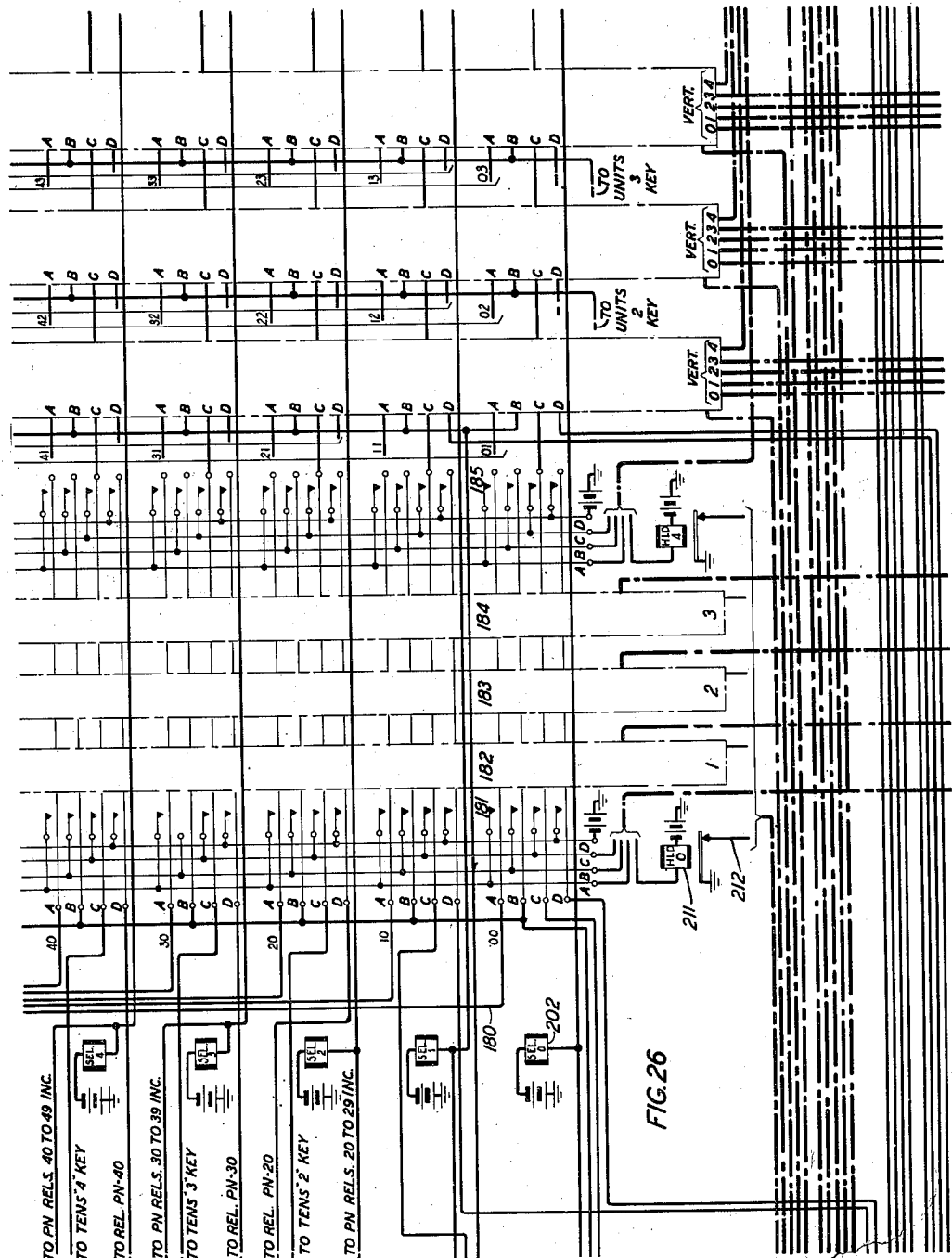
Figure 27:
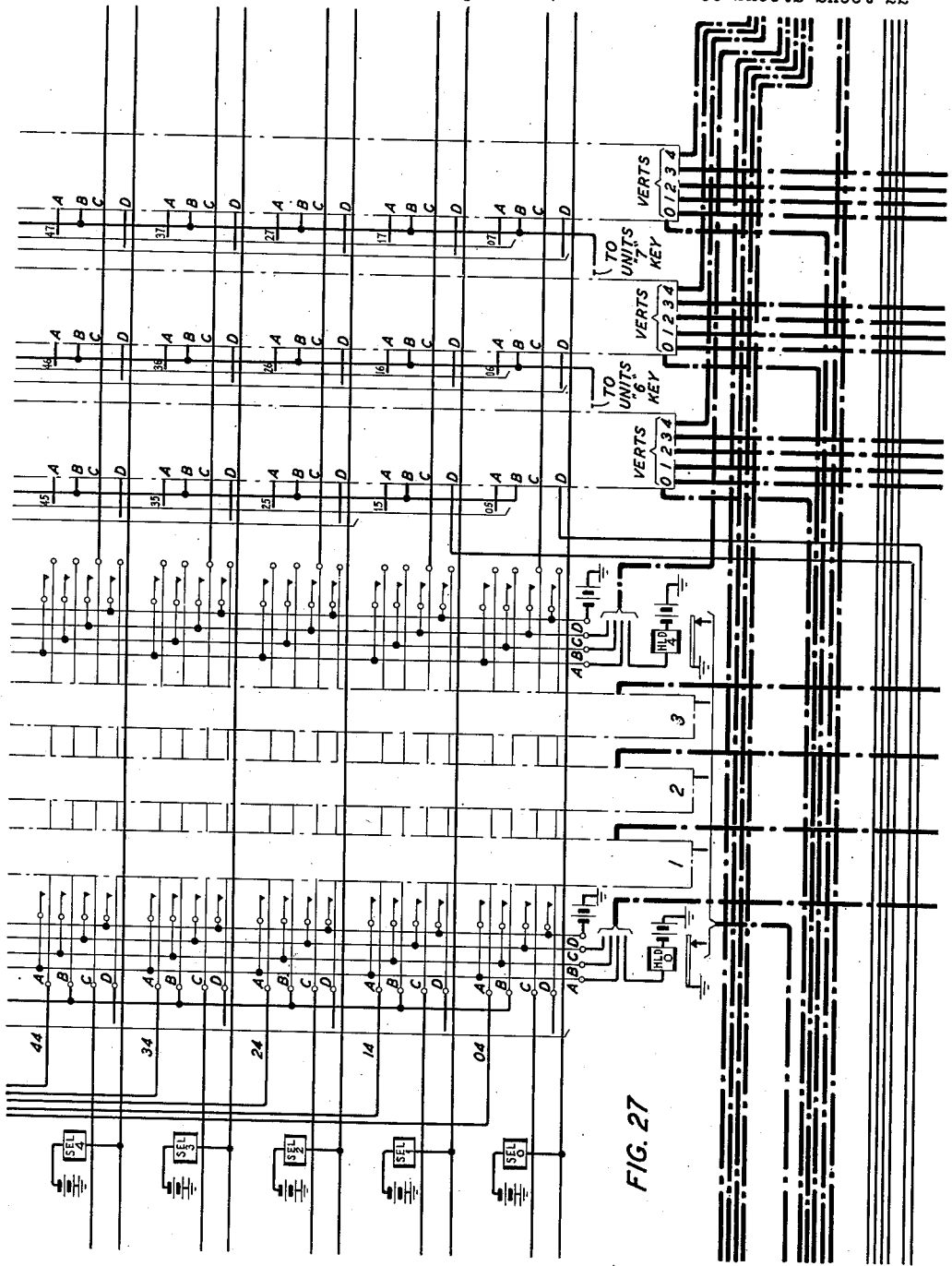
Figure 28:
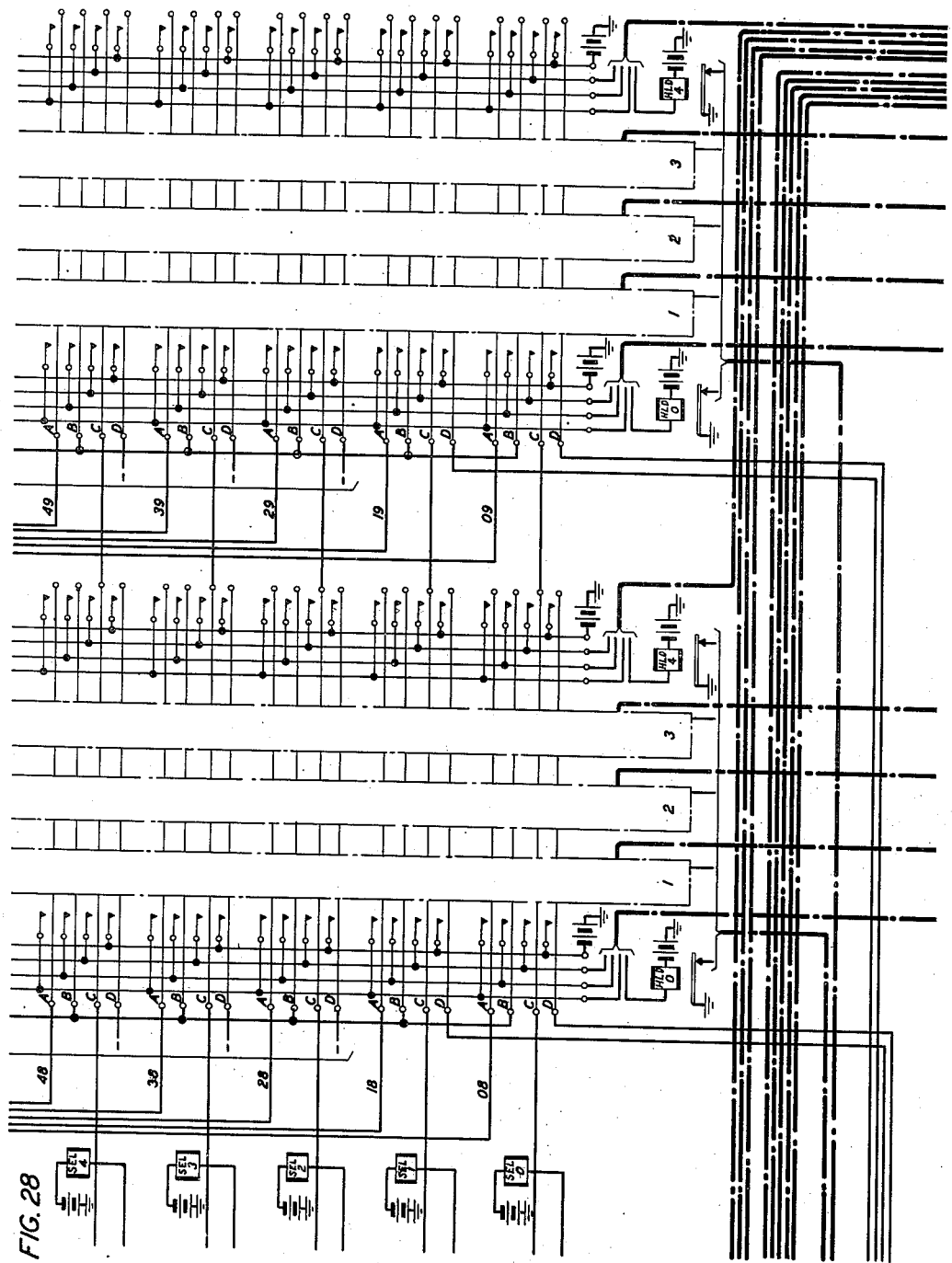
Figure 29:
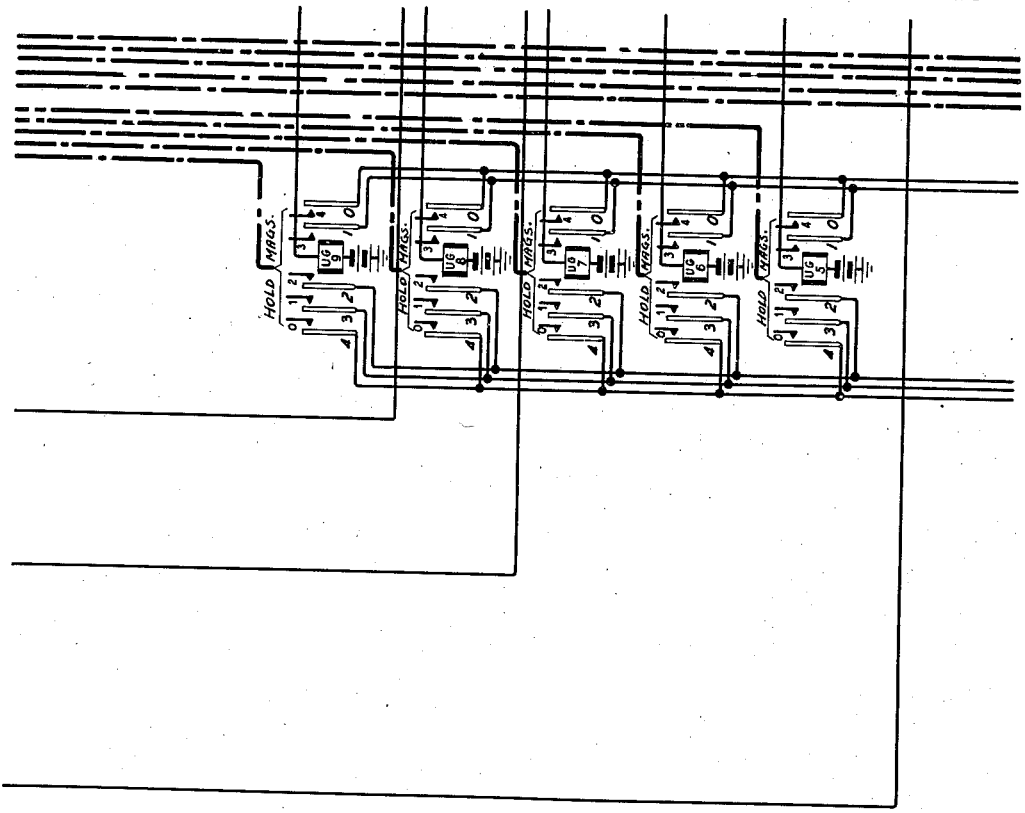
Figure 30:
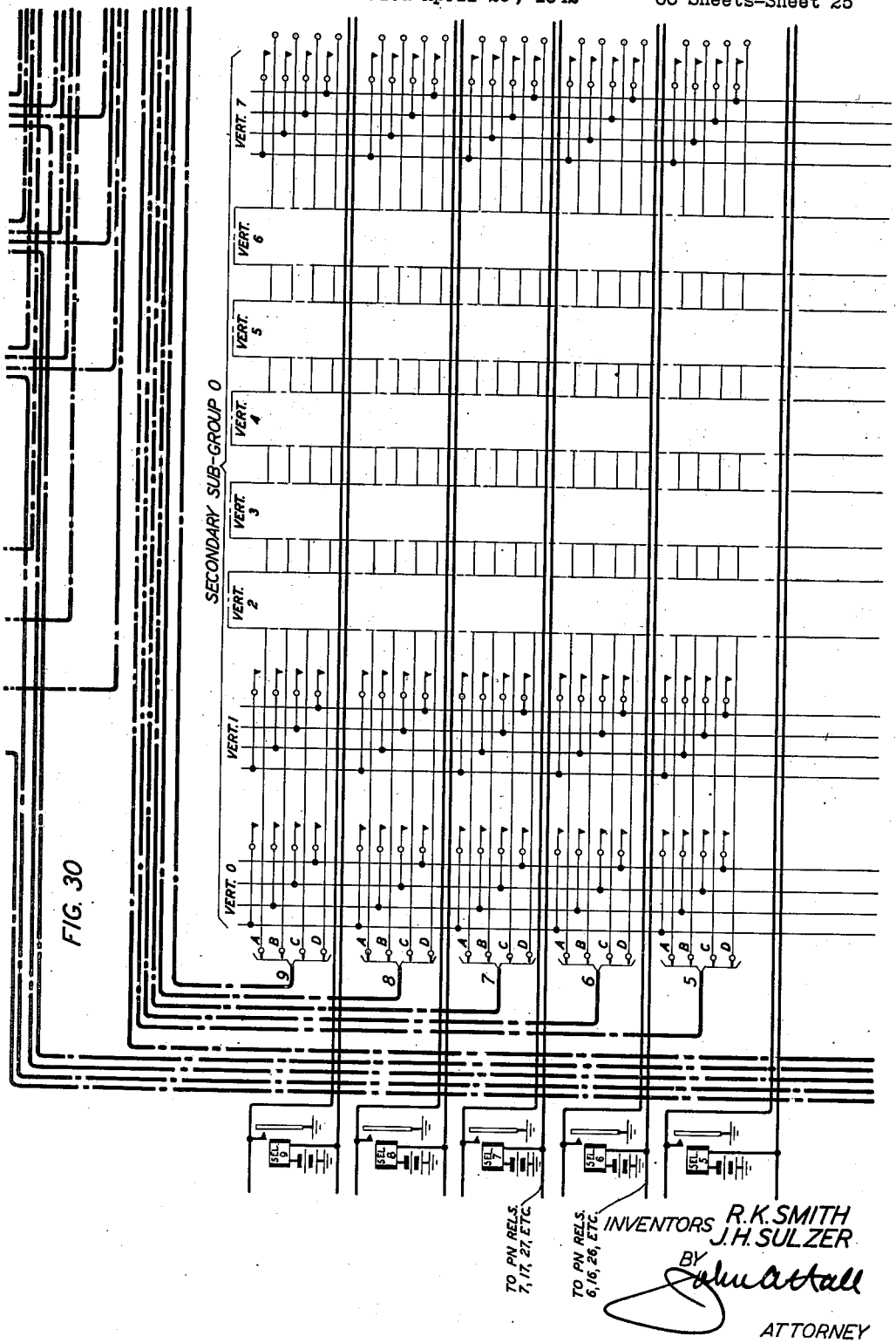
Figure 31:
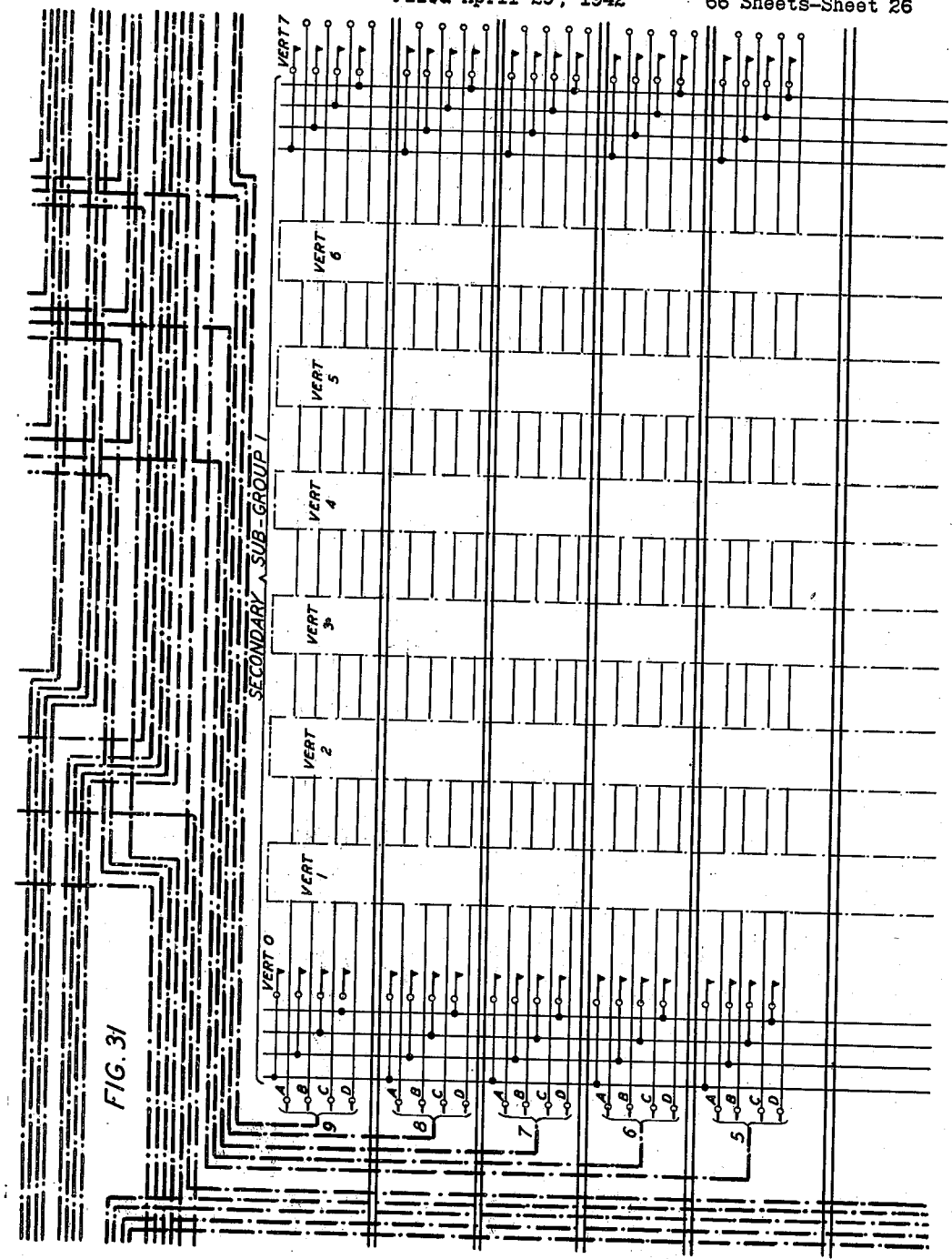
Figure 32:
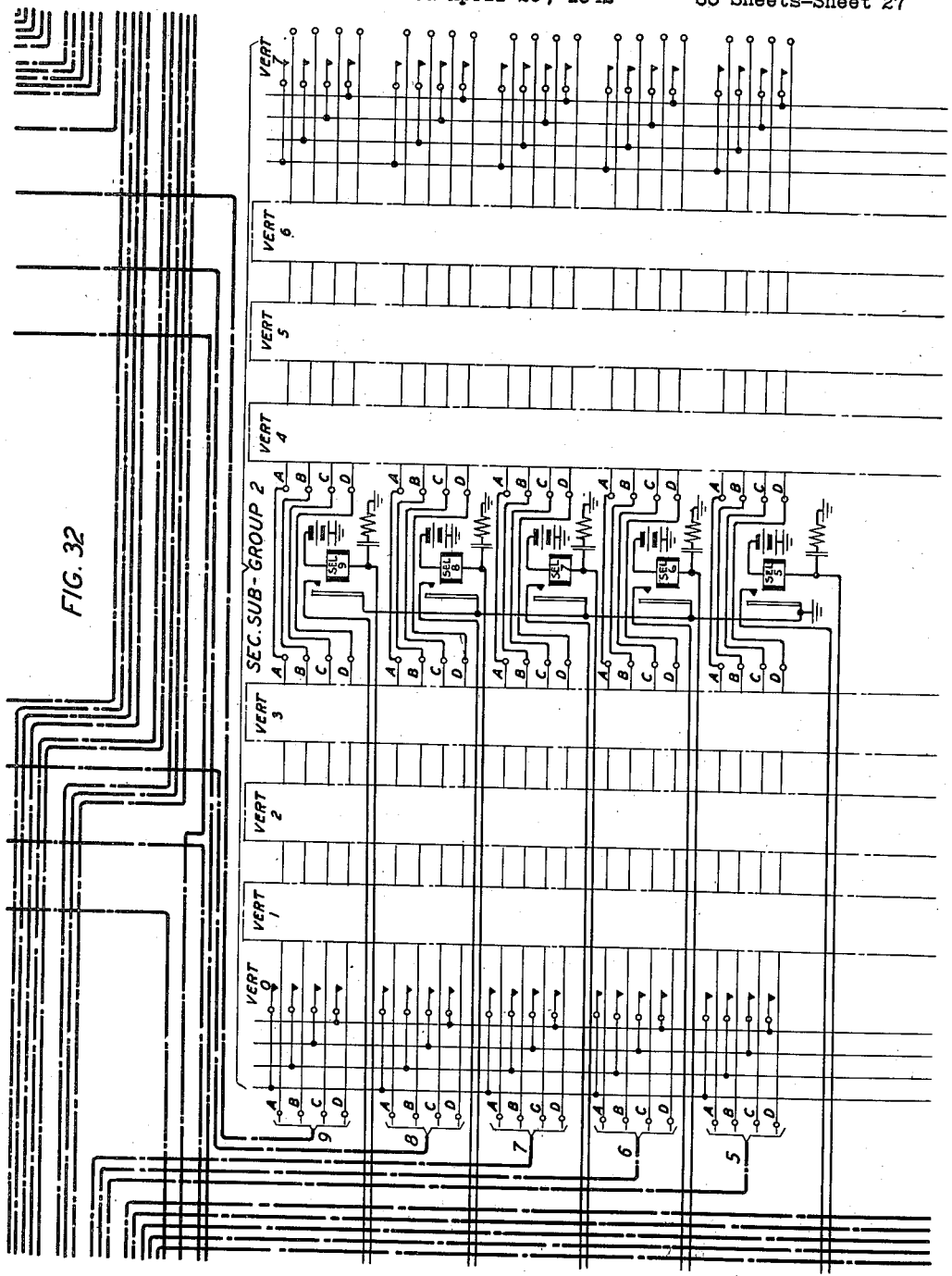
Figure 33:
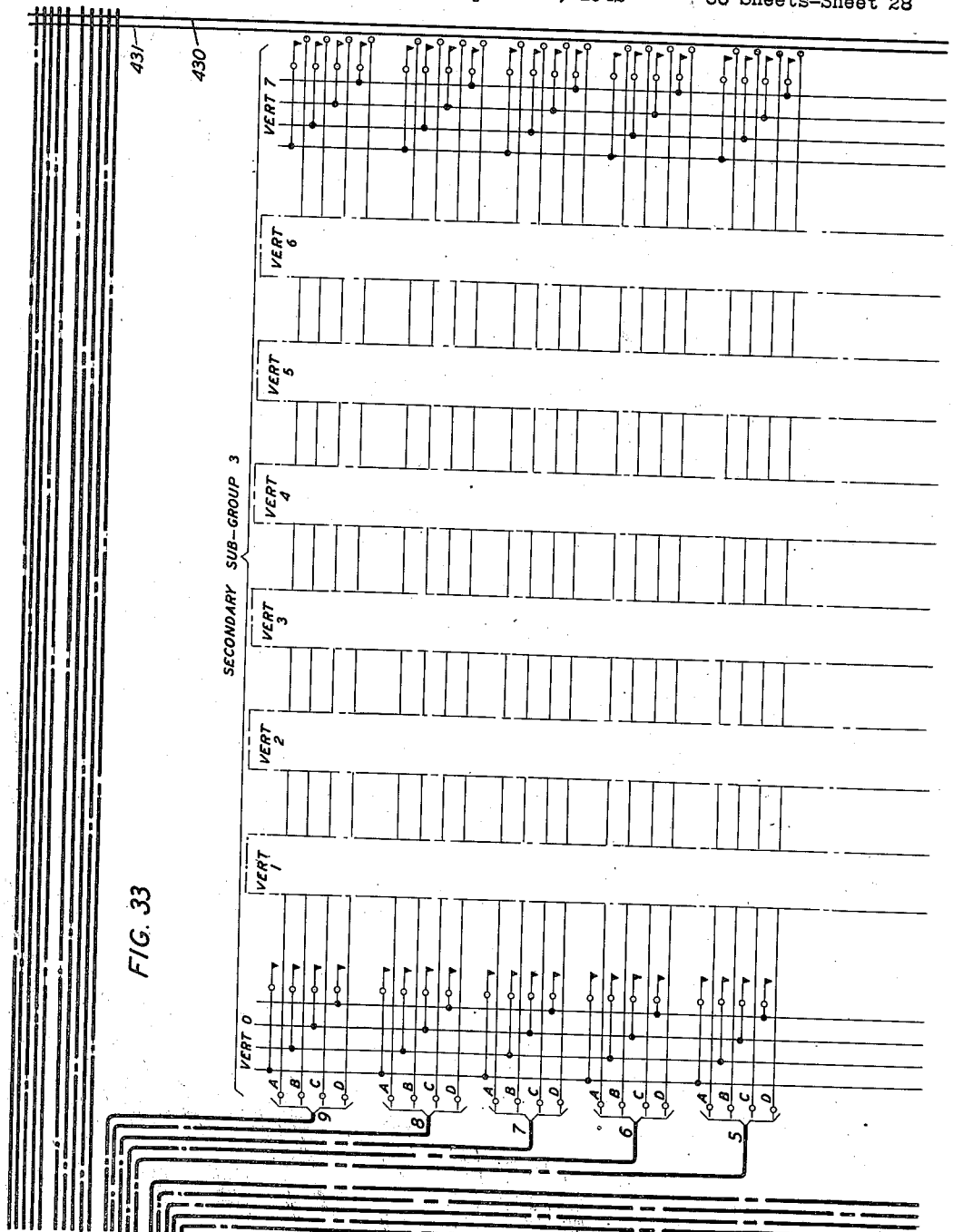
Figure 34:
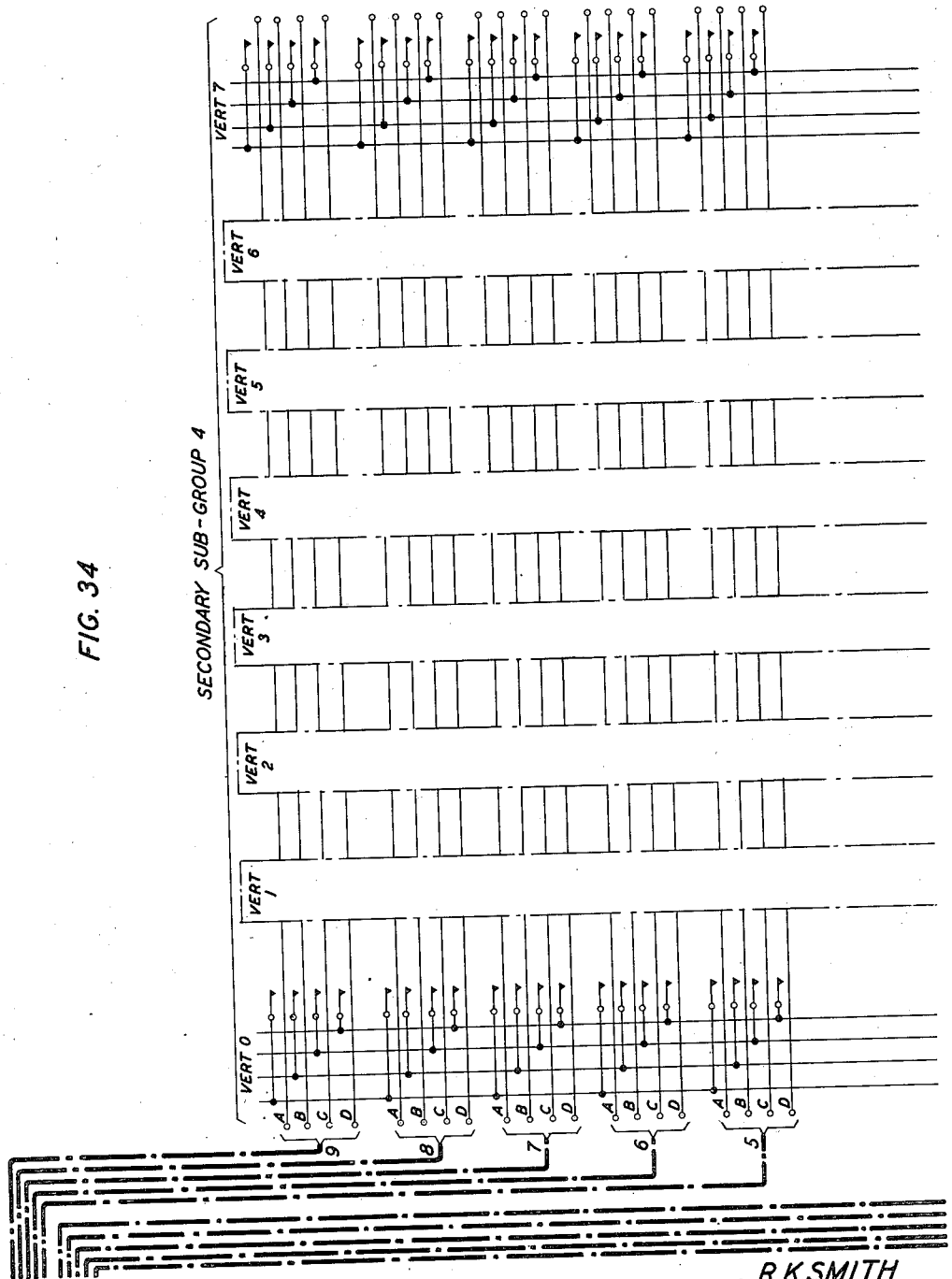
Figure 35:
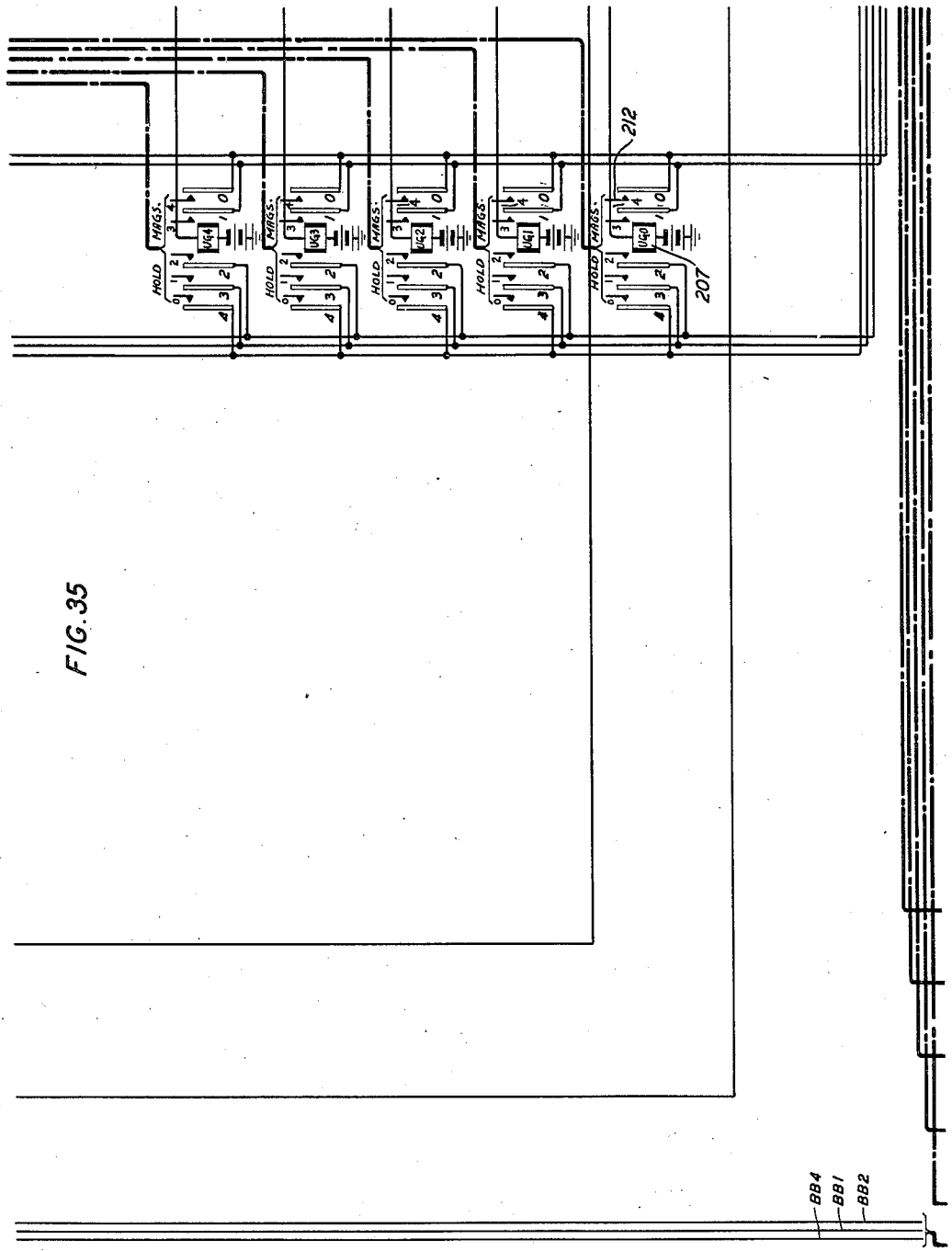
Figure 36:
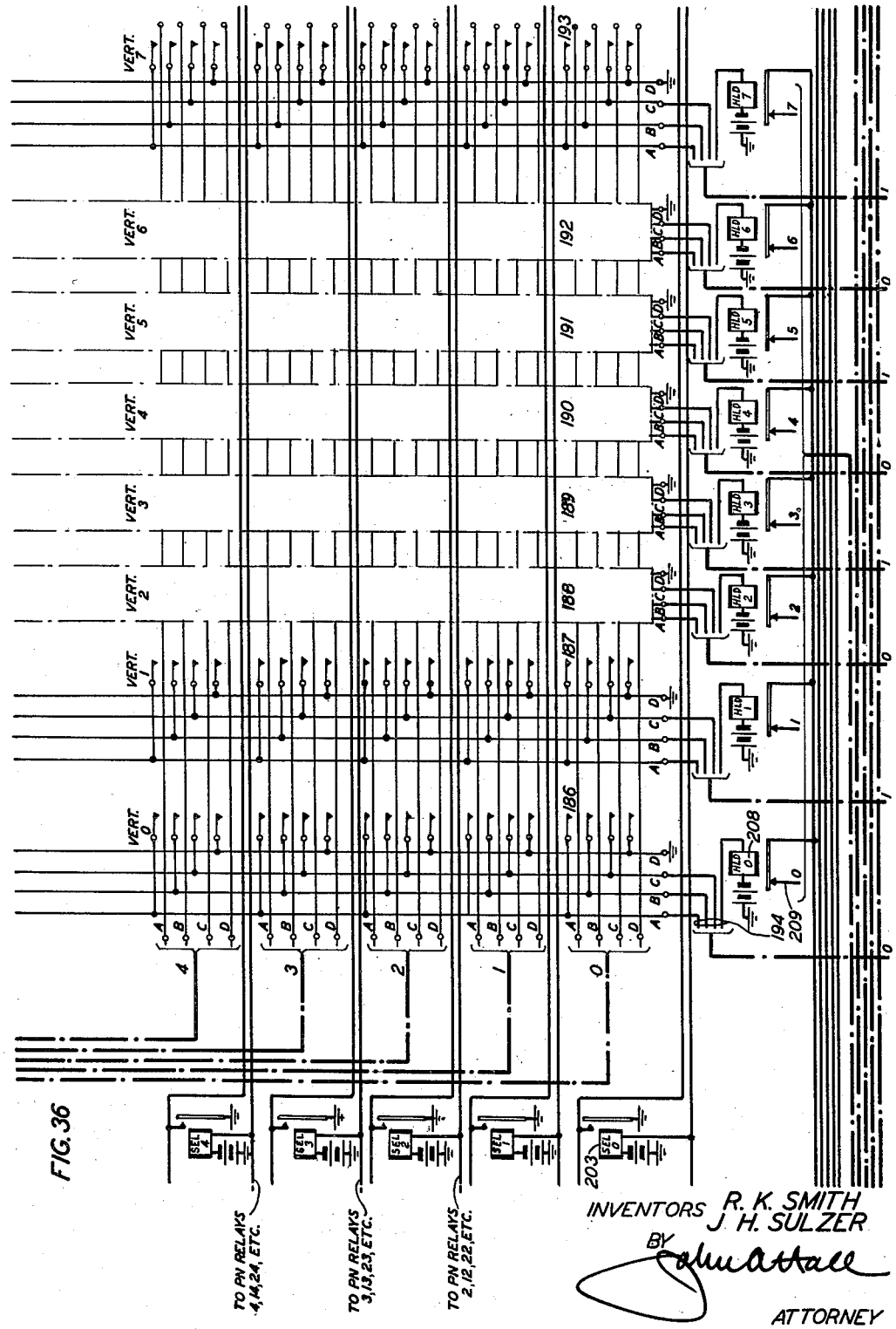
Figure 37:
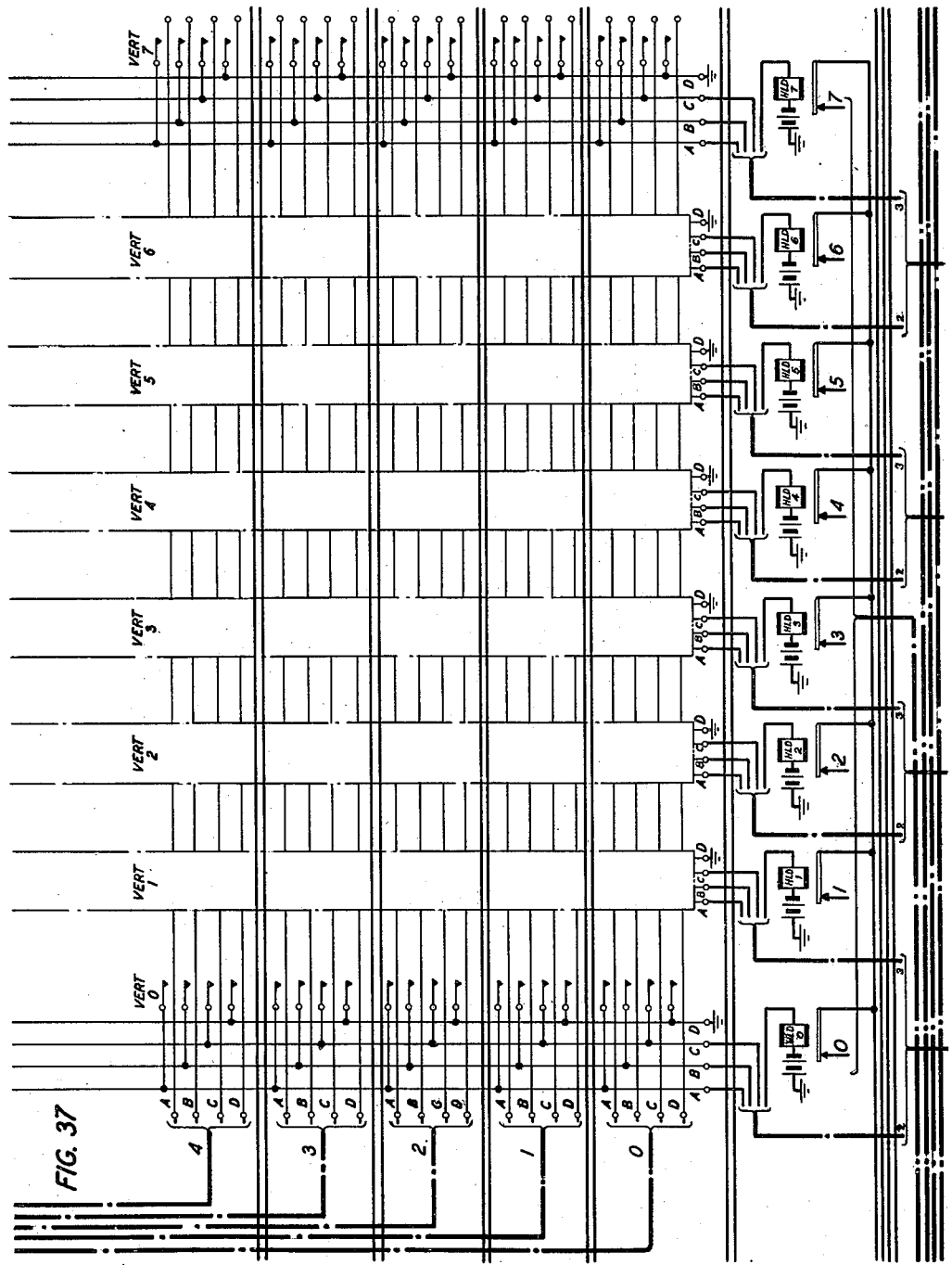
Figure 38:
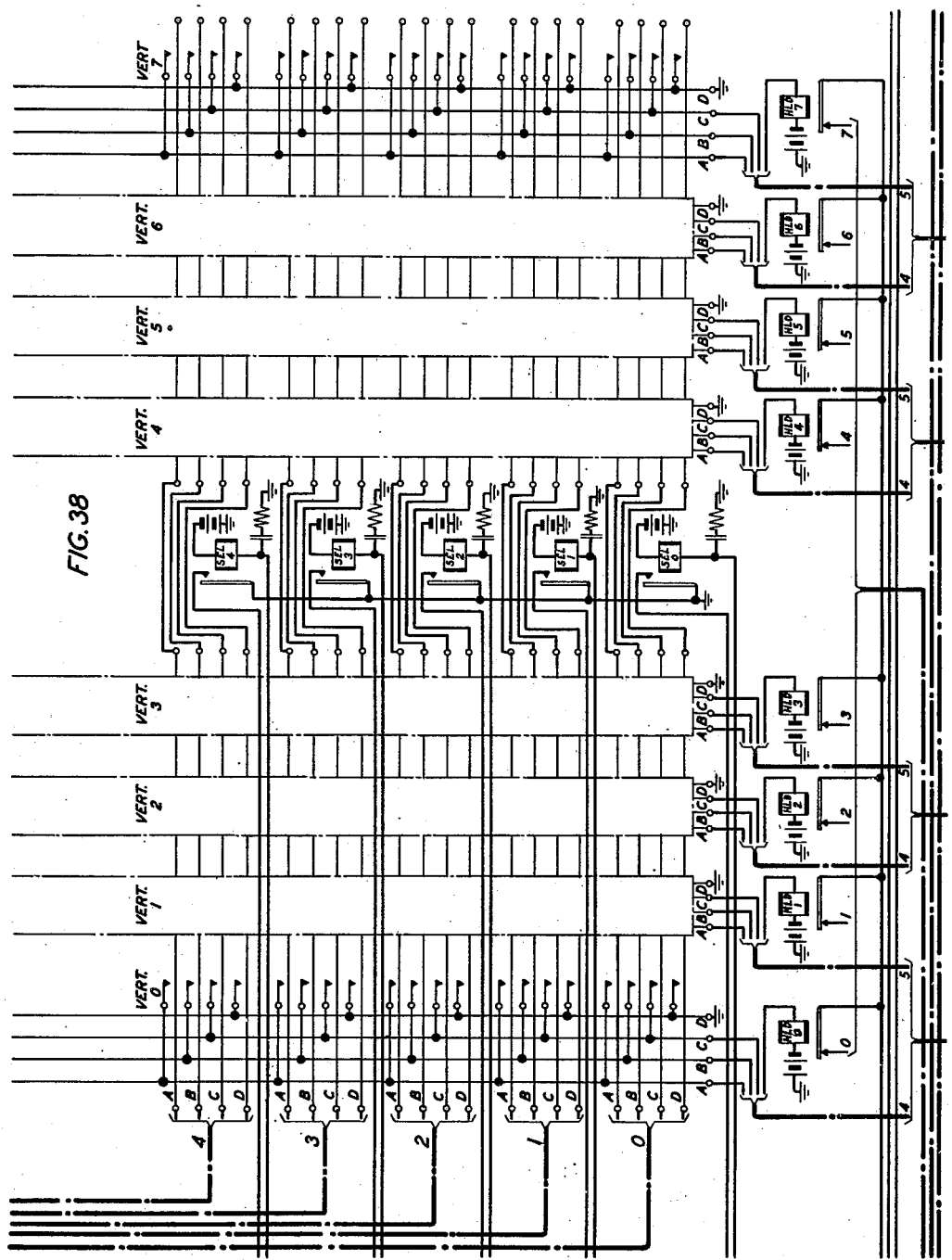
Figure 39:
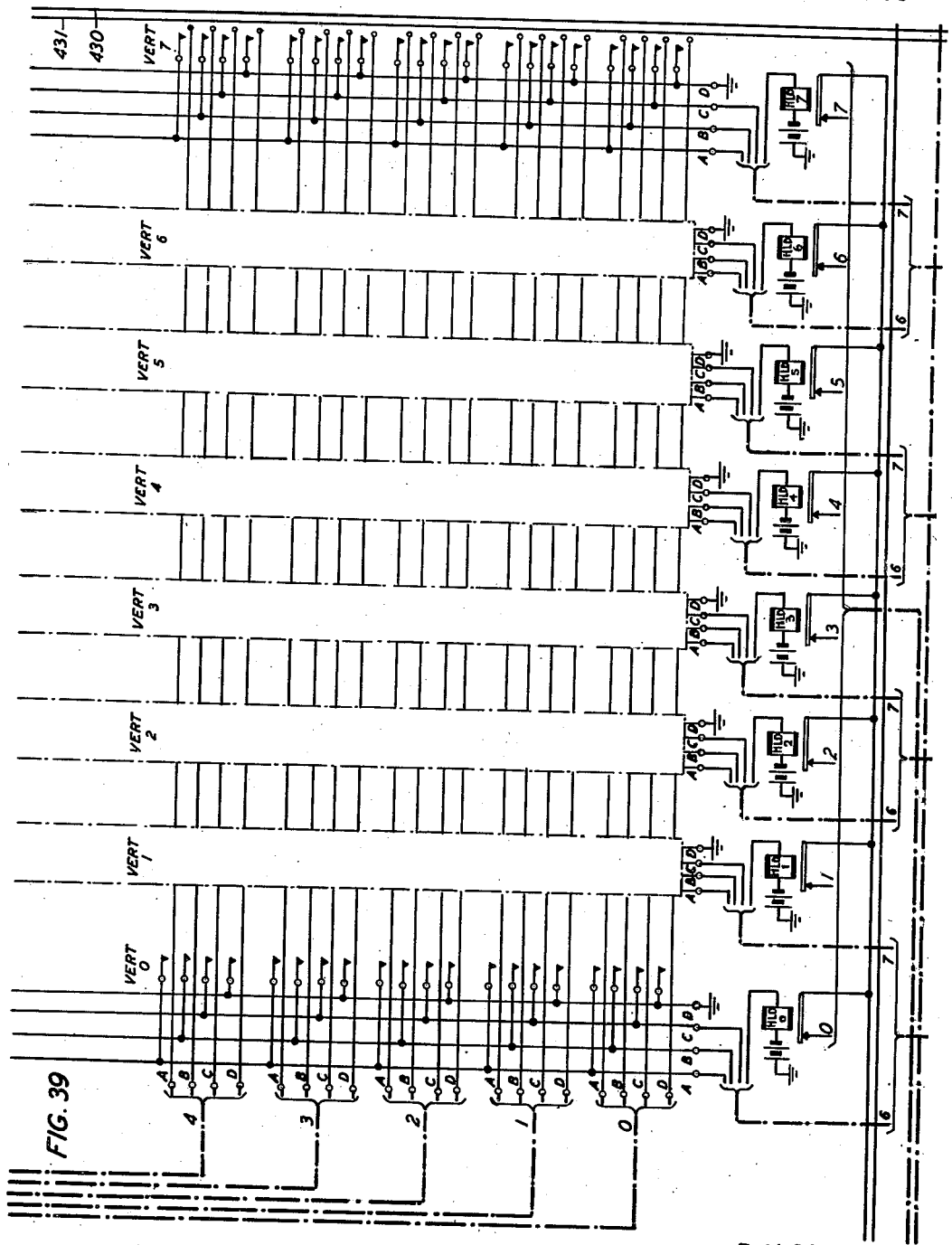
Figure 40:
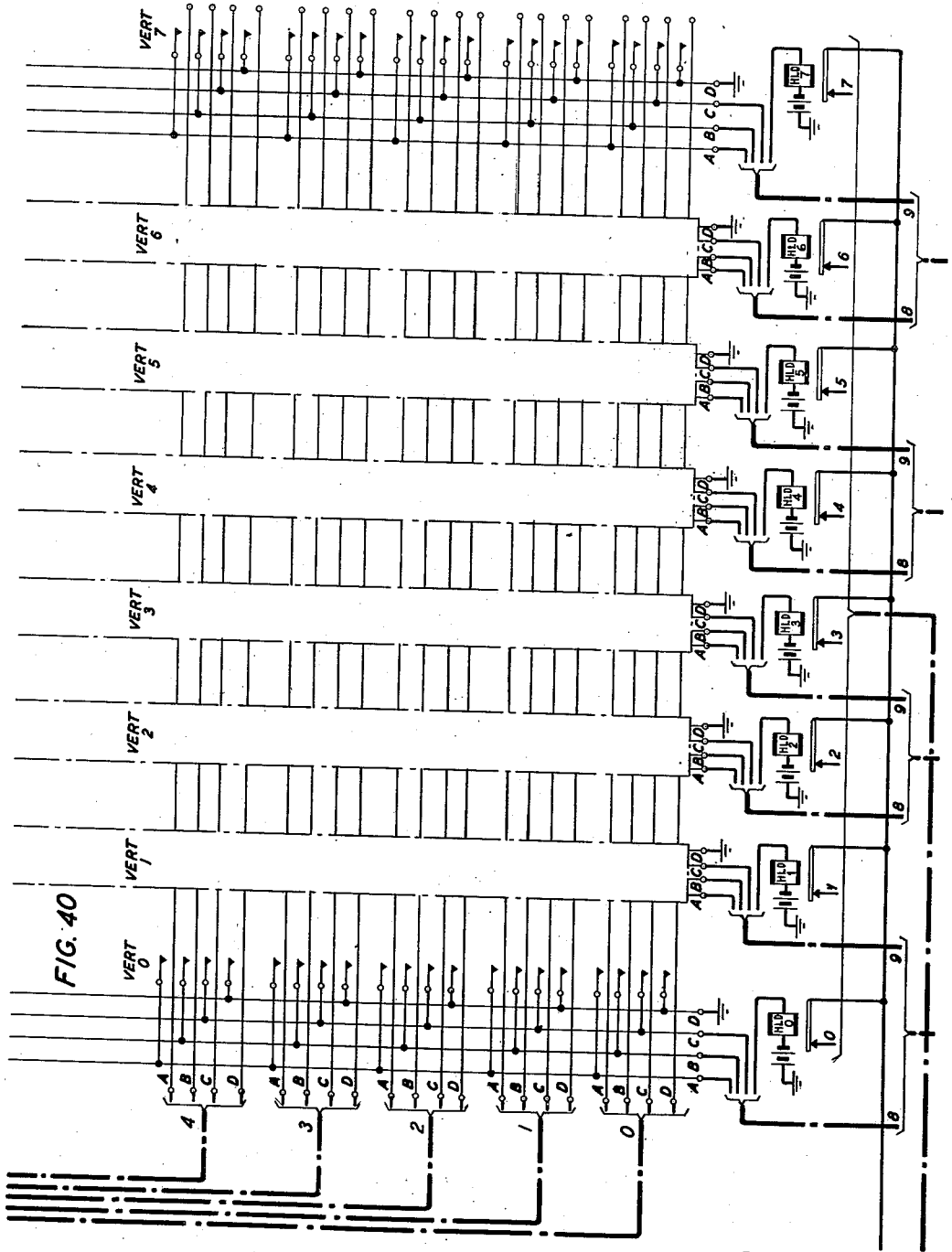
Figure 41:
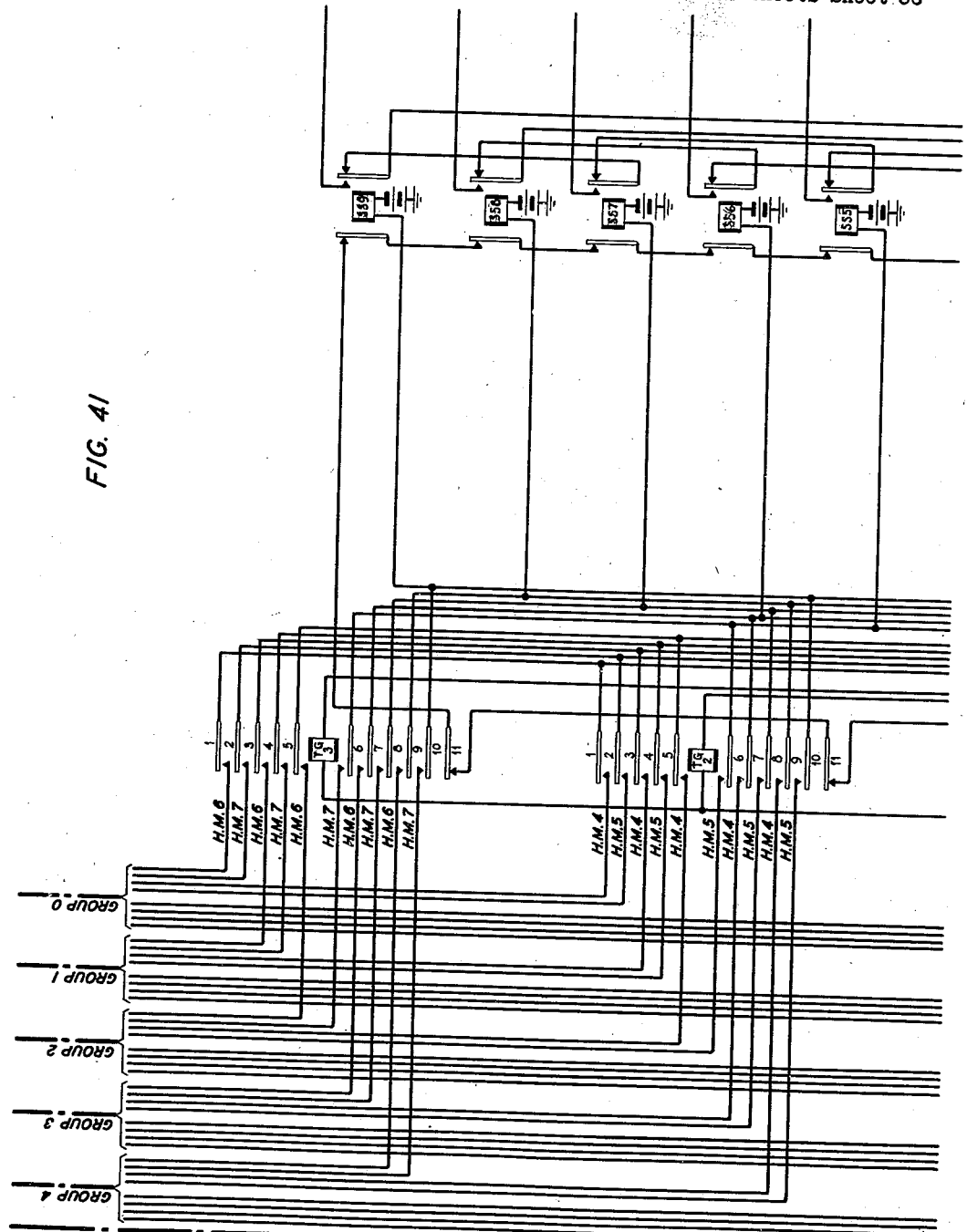
Figure 42:
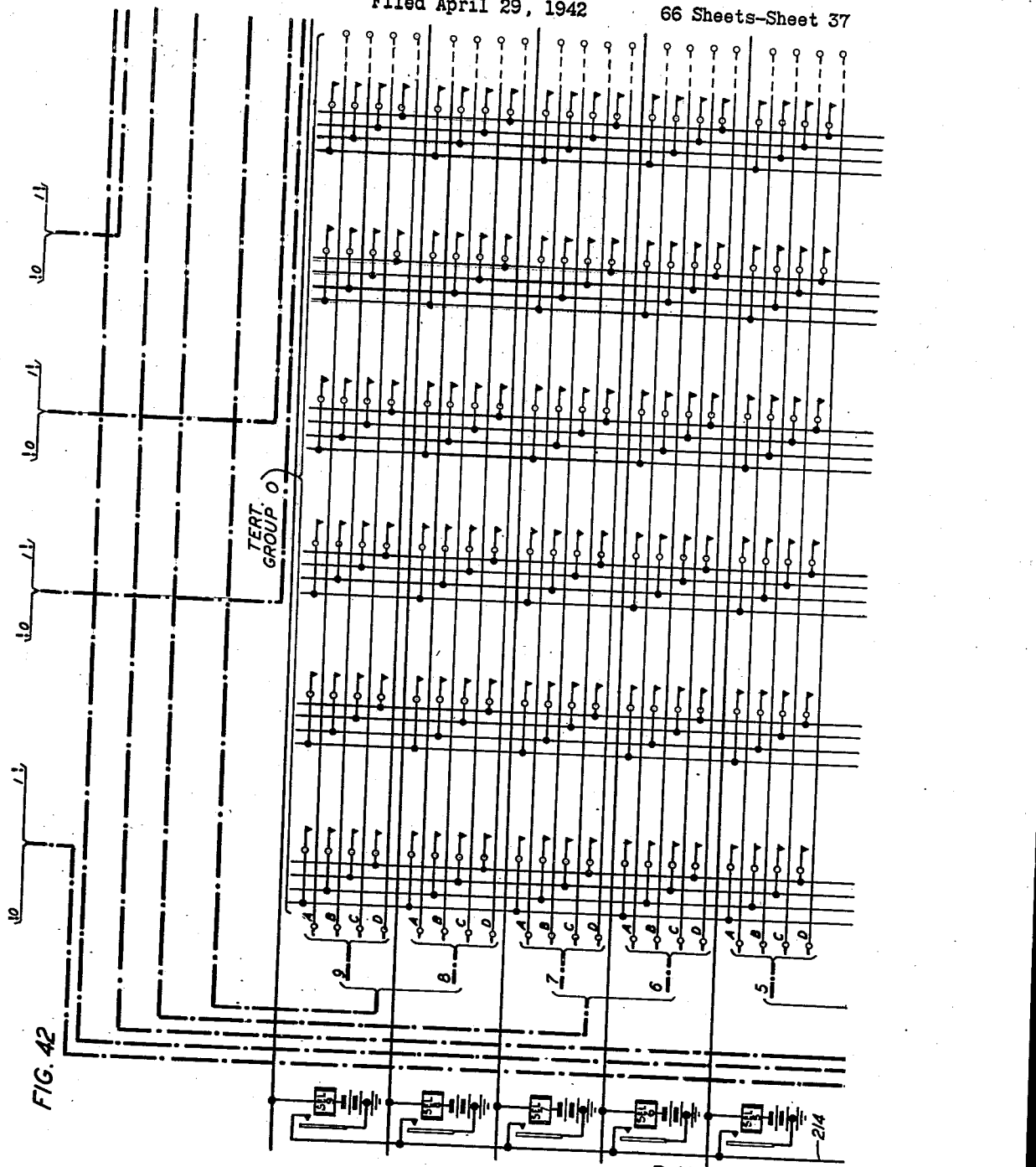
Figure 43:
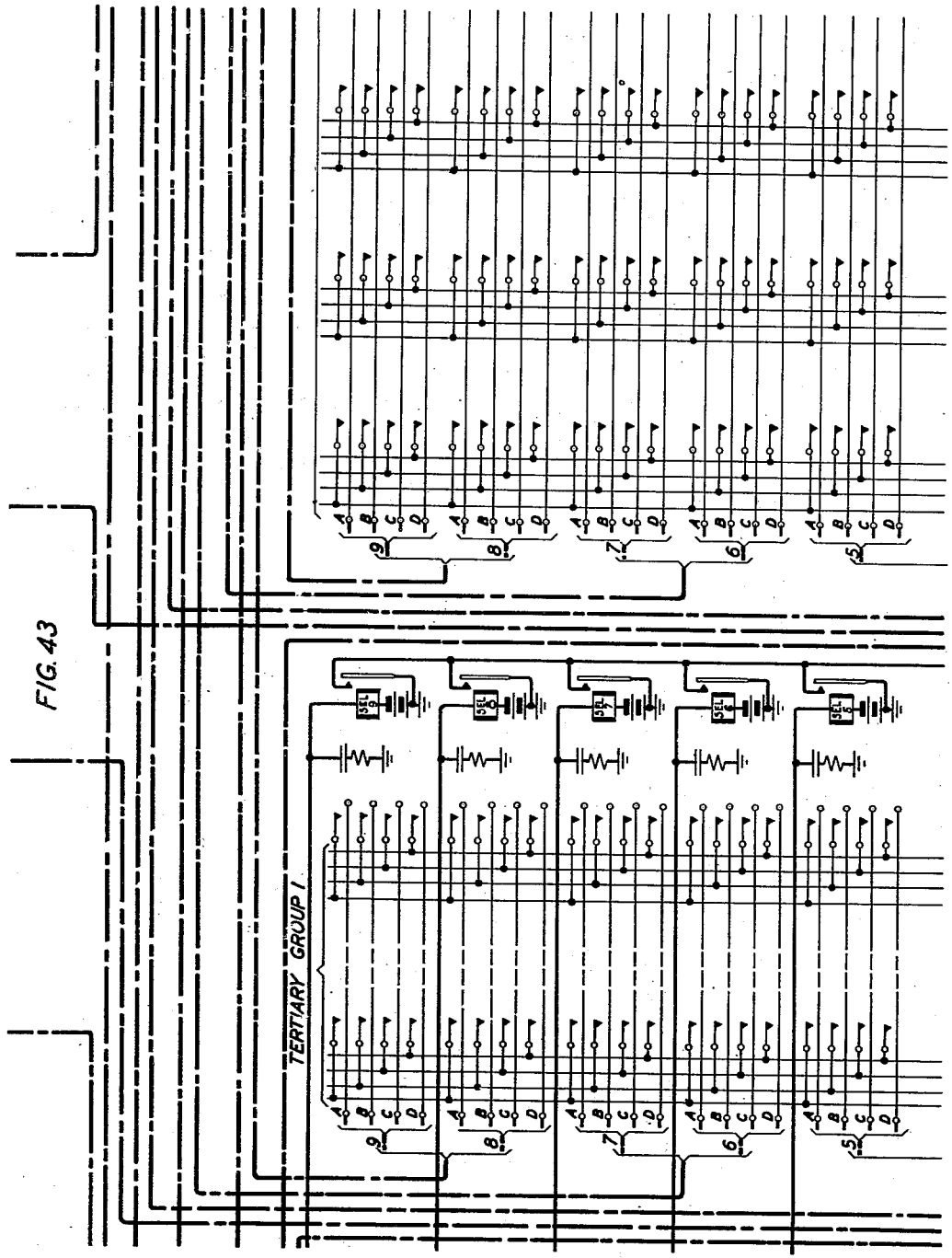
Figure 44:
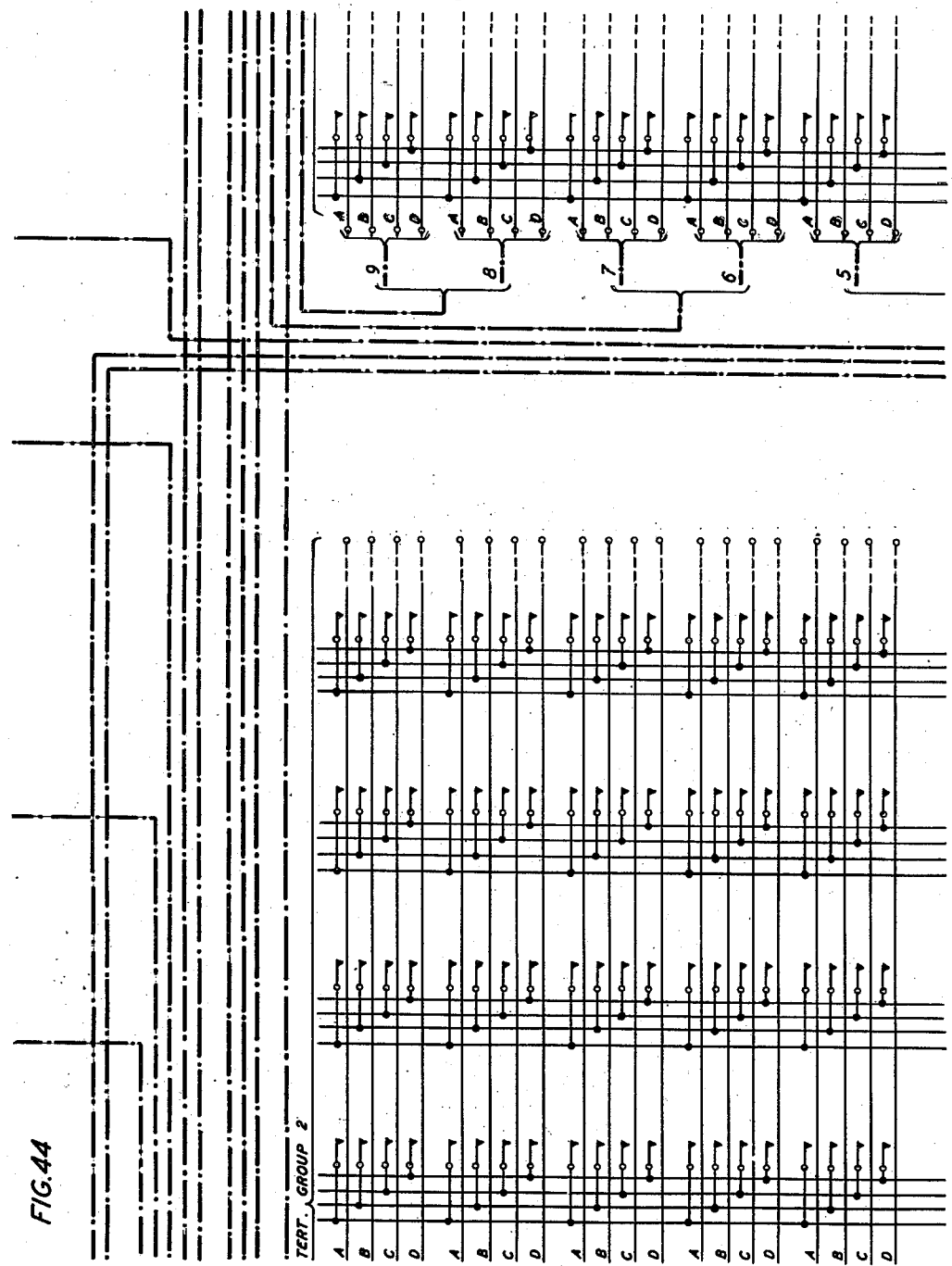
Figure 45:
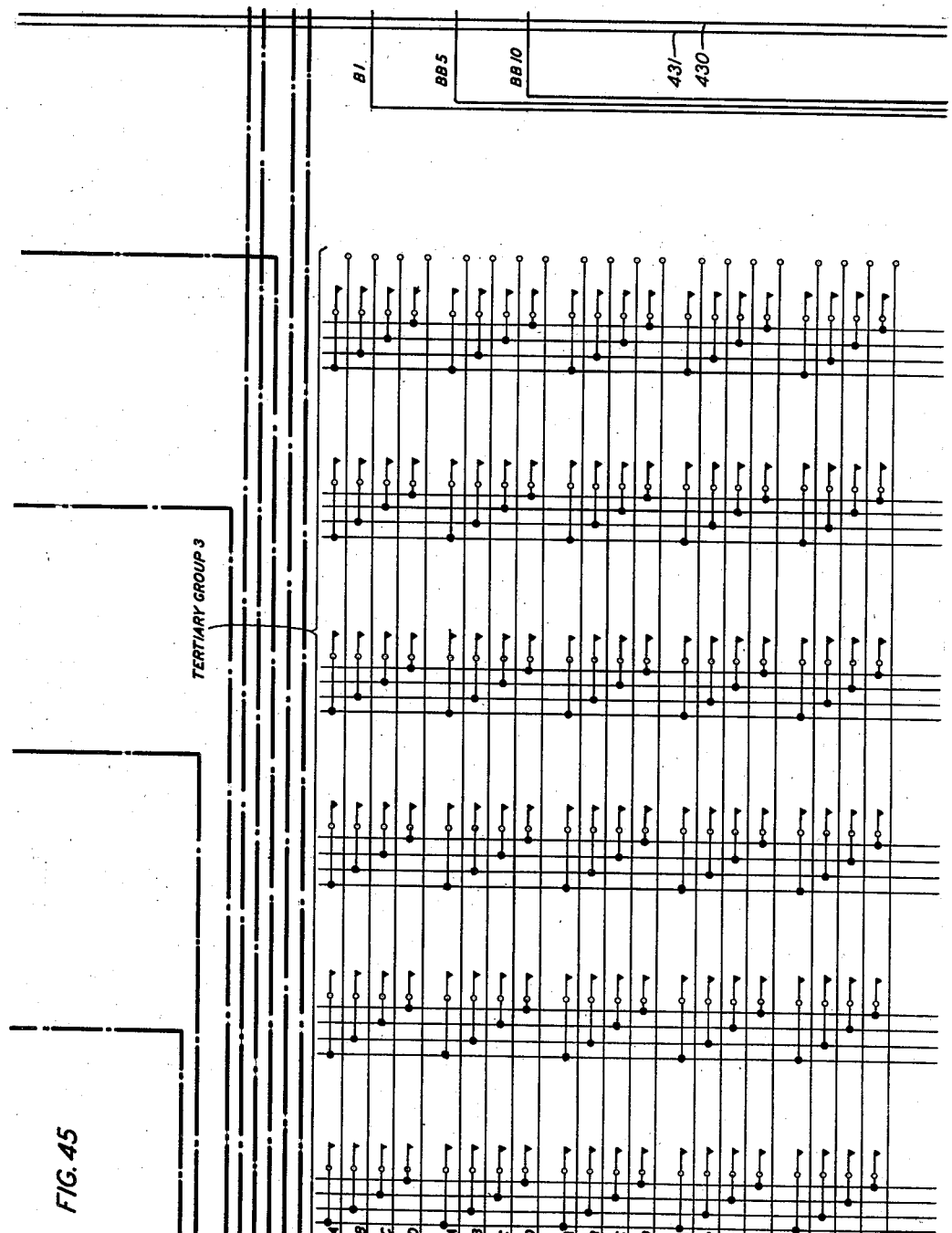
Figure 46:
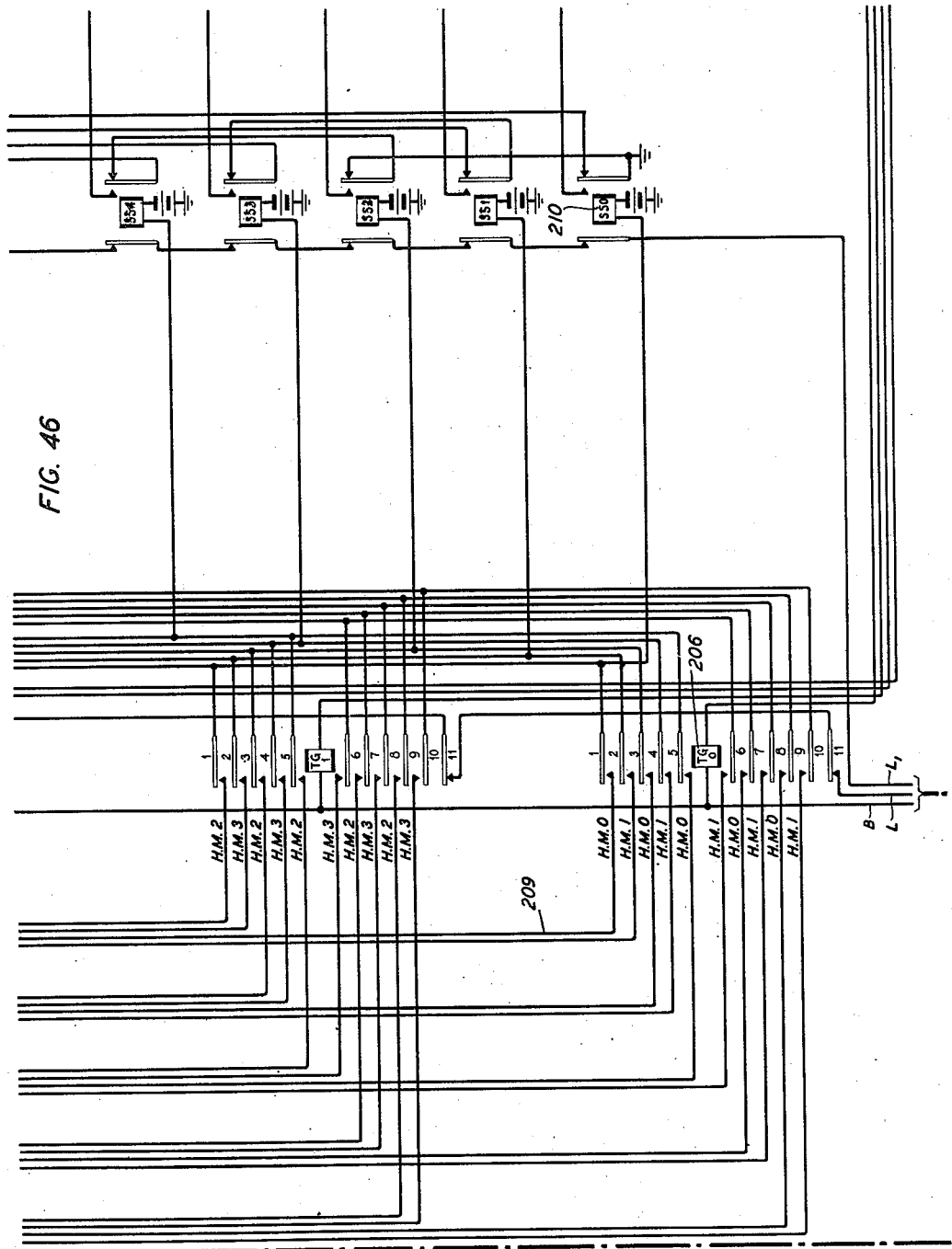
Figure 48:
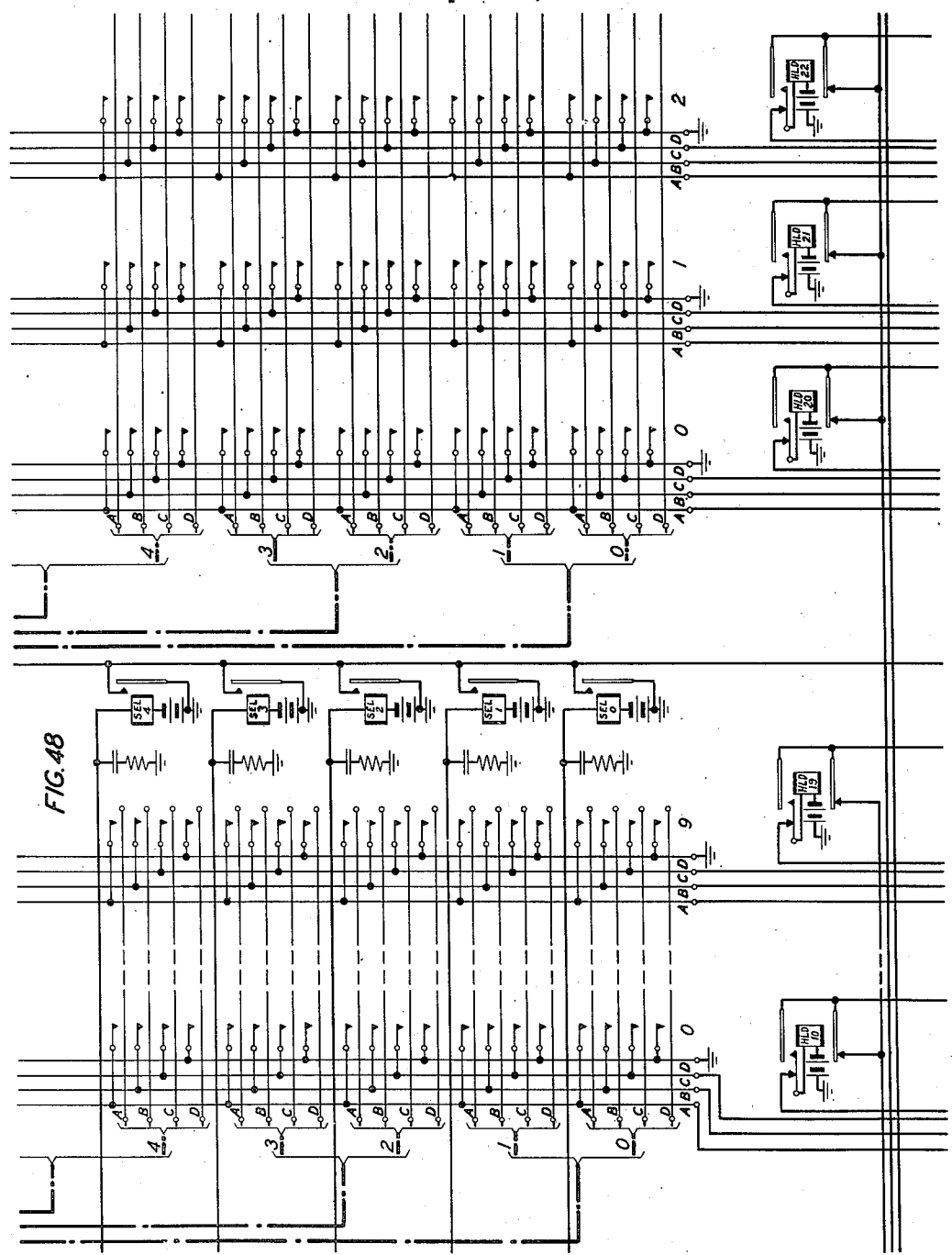
Figure 50:
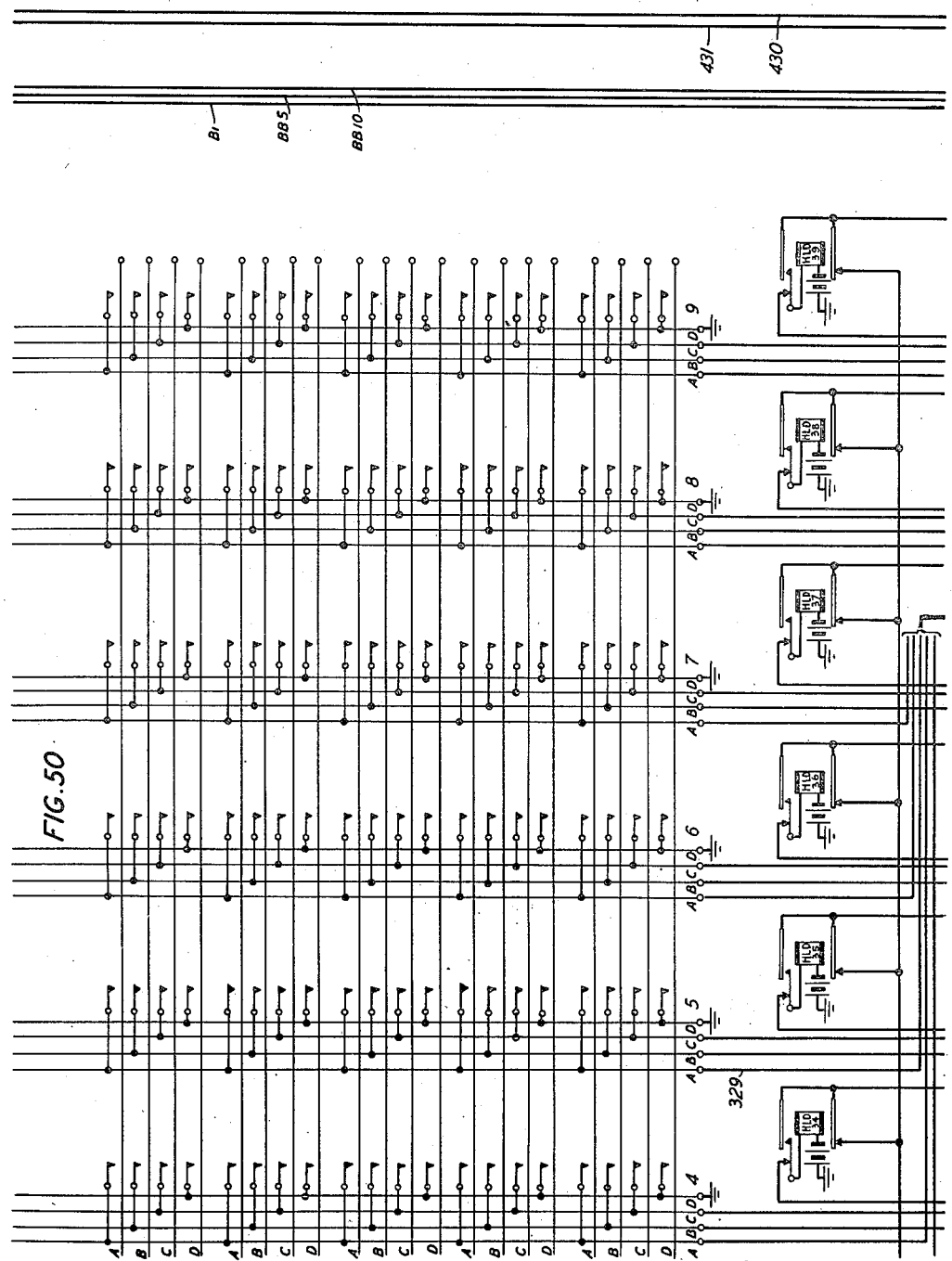
Figure 51:
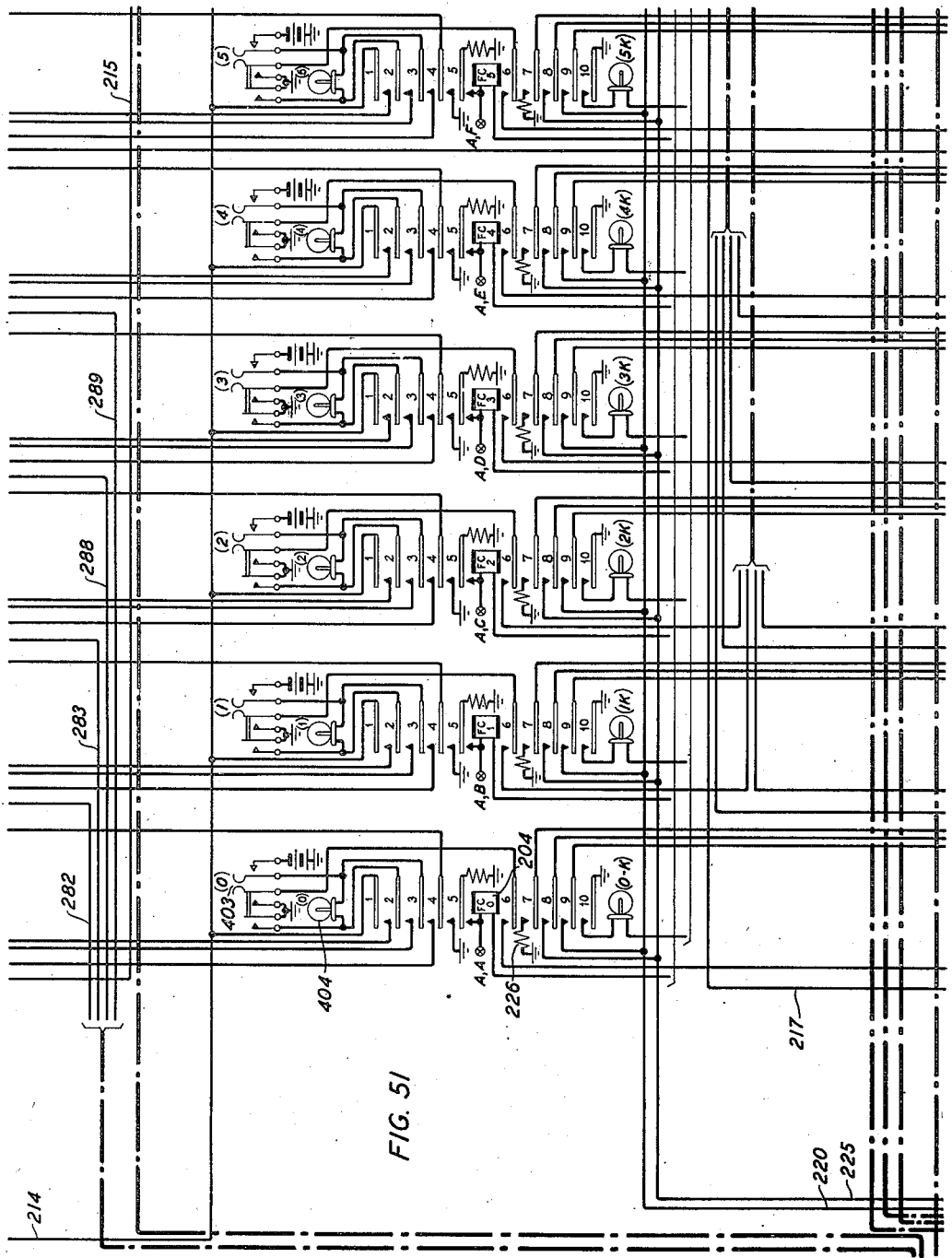
Figure 52:
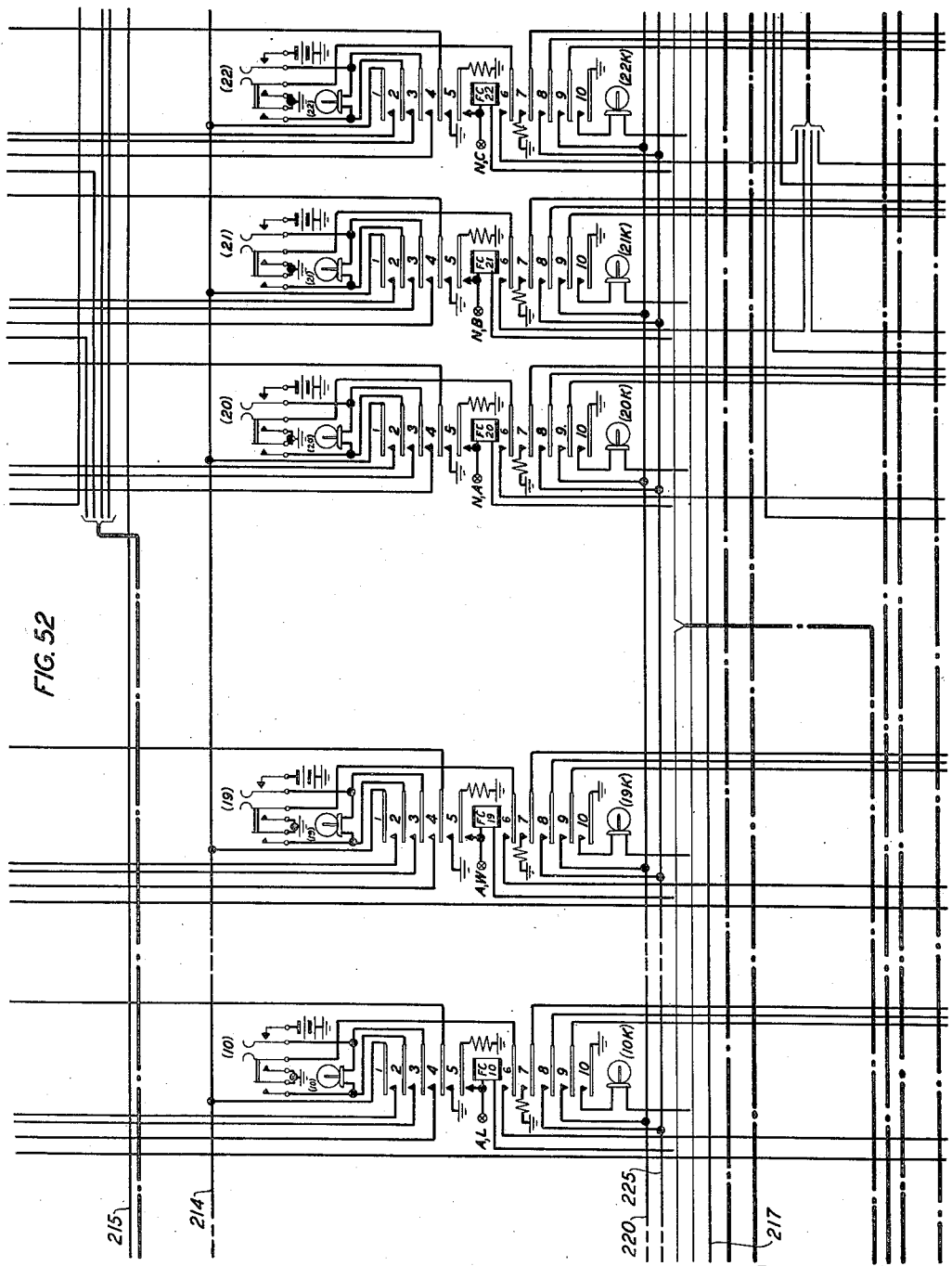
Figure 53:
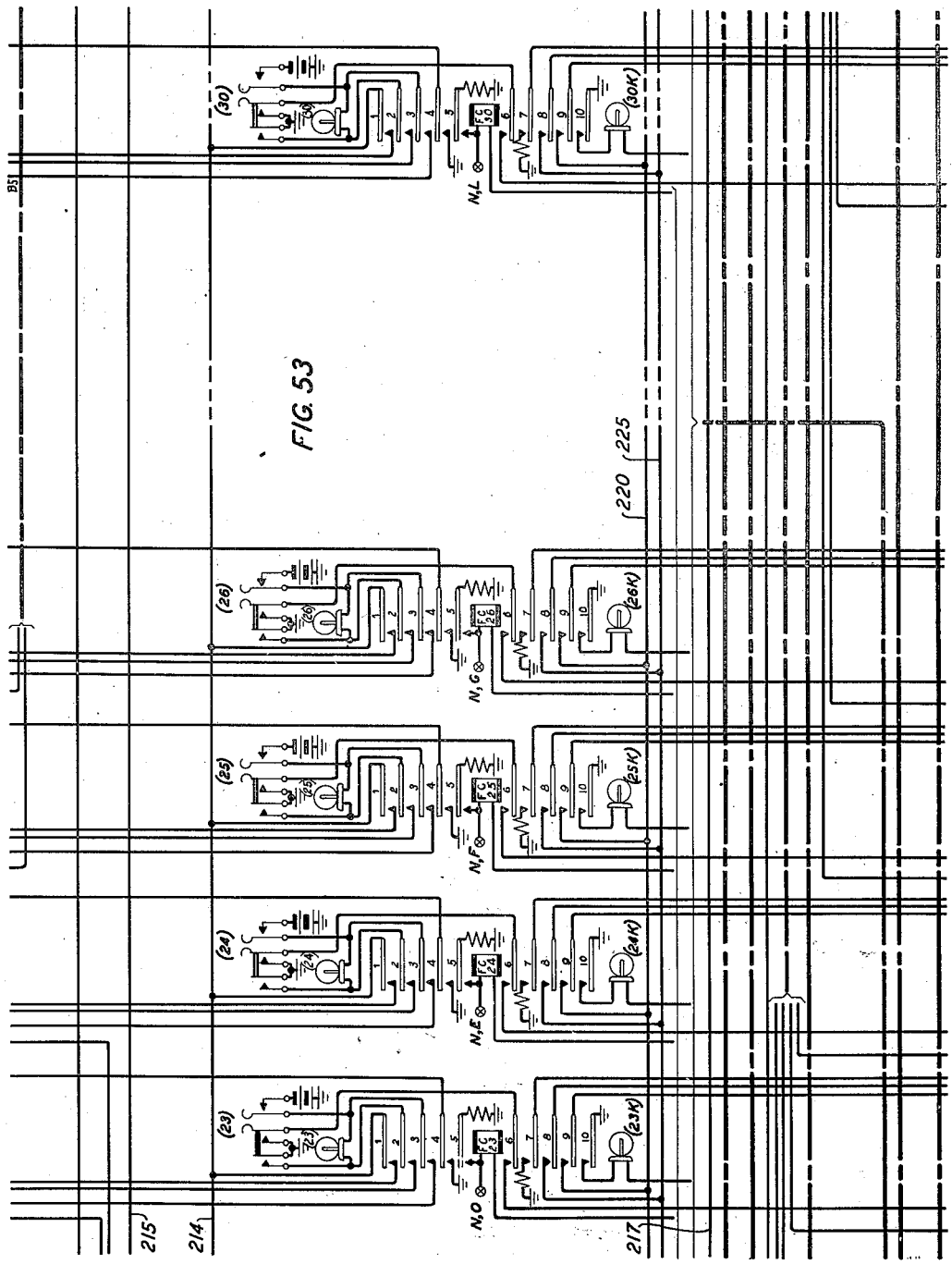
Figure 54:
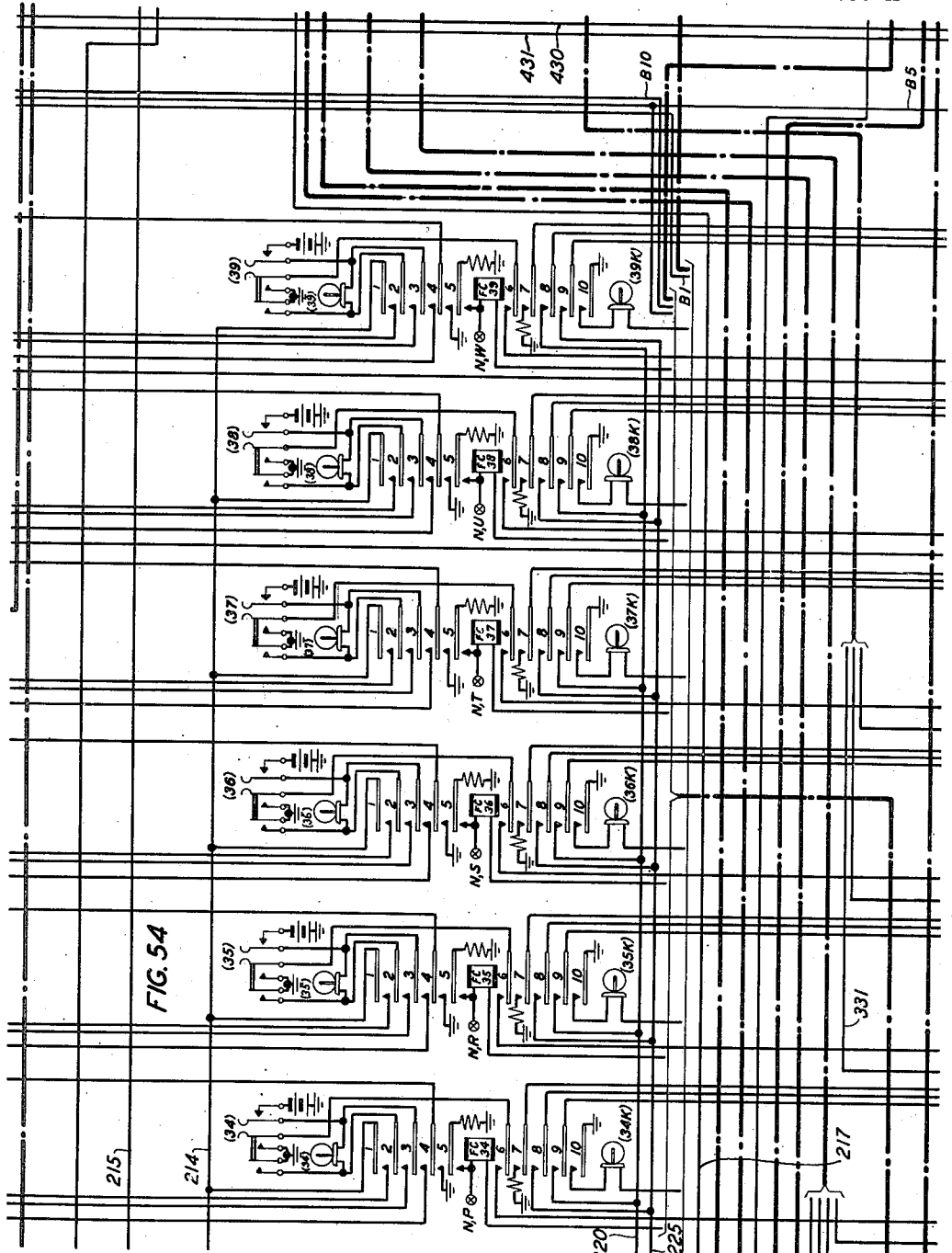

Fig. 11 is another schematic circuit diagram used to show the control of the switches between the test set terminations and the test features. This diagram especially illustrates how a complex electrical path is established by indexing the number of the test set termination and the number of the test feature, how the self-locking relay responding to the test set termination number is automatically released and how the connection is held under control of the test feature connector relay until this is released by a specific releasing code; and Fig. 12 is a block diagram showing how the remaining figures are placed together to form a complete detailed circuit diagram. Each rectangle represents a separate sheet of the drawings and each shows the figure number and a caption indicating in general the subject-matter of the particular circuit details contained therein;

Fig. 13 shows the tape transmitter for transmitting the designation of the indexing means to the decoders and the translation;

Fig. 14 shows the decoders for changing the permutation codes of the two groups each into a single electrical condition;

Figs. 15 and 16 show the translator for changing the two electrical conditions from the decoders into a single operating or releasing impulse for the switches and relays of the control device;

Fig. 17 shows an array of code points equal to the code points reached by the translator, which are manually available for controlling the device;

Fig. 18 shows the location signals, the test position signals and the interrupter circuit;

Figs. 19 and 20 show the control circuits;

Figs. 21 and 25 shows the termination number relays and signals;

Figs. 22 to 24 and 26 to 28 show the primary switches;

Figs. 29 and 35 show the group of relays for the secondary switches;

Figs. 30 to 34 and 36 to 40 show the secondary switches;

Figs. 41 and 46 show the group relays for the tertiary switches and the preference circuit arrangement;

Figs. 42 to 45 and 47 to 50 show the tertiary switches;

Figs. 51 to 54 show the feature connection relays;

Figs. 55 to 58 show the power termination switch;

Figs. 59 to 68 show the test features;

Fig. 69 shows the termination shifting relays;

Fig. 70 shows the alternative termination arrangements to which the flexible cables to the devices under test may be attached; and Fig. 71 shows the attachment plugs and the signals by which connection to another device may be made while one device is under test, the signals operating to show which one is effective at the time.

The principles of operation of the automatic testing may best be explained by the use of several schematic diagrams.

The fundamental theory of operation of the testing device is shown in Fig. 1. The indexing means for each test will operate two relays, one known as the key relay and the other known as the watching relay. The watching relay immediately opens the chain circuit and therefore the circuit of what may be termed the satisfaction relay. The chain circuit is opened at the back contact of the watching relay and transferred to the front contact thereof. The key relay imposes a condition on the device under test. In the example given it closes a circuit through the device under test so that if this circuit is complete as it should be the signal relay will be operated. The signal relay repairs the break in the chain circuit caused by the watching relay and therefore causes the energization of the satisfaction relay, whereby an advance is made in the testing device to another test.

The fundamental manner of operation of the testing device is shown in Fig. 2. Here there are a number of rectangles, variously labelled "unit under test," "connecting means," "test chain," "control circuit," "test feature selecting means" and "power termination selecting means." The indexing means has control over the connecting means, the test feature selecting means and the power termination selecting means. In accordance with the designation of the indexing means a circuit may be established from battery in the power termination selecting means, through the winding of a signal relay 1 in the test chain, switch point 2 in the connecting means, the winding of a relay 3 in the unit under test, switch point 4 in the connecting means, a signal relay 5 in the test chain and a switch 6 in the power termination selecting means to ground. Another circuit may be likewise established from the front contact of the armature of relay 3 in the unit under test, through lamp 7, switch point 8 in the connecting means, signal relay 9 in the test chain, and switch 10 in the power termination selecting means. The indexing means will also cause the operation of switches 11, 12 and 13 in the test feature selecting means to cause the operation of watching relays 14, 15 and 16, companion to signal relays 1, 5 and 9, respectively. The watching relays 14, 15 and 16 will immediately open the chain circuit to cause the release of the satisfaction relay 17 in the control circuit. The windings of relays 1, 3 and 5 being serially included in an effective circuit will cause the operation of signal relays 1 and 5 if the path through relay 3 under test is found to be properly closed. Also relay 3 will operate in this circuit whereupon signal relay 9 will respond if the armature of relay 3 properly moves to its front contact and the circuit through lamp 7 is complete. Thus the breaks in the chain circuit caused by the watching relays 14, 15 and 16 are repaired by the companion signal relays 1, 5 and 9, respectively and the chain circuit now being again closed the satisfaction relay 17 is operated and the control means causes the indexing means to advance to the next position, where other test circuits are set up in the same manner.

This schematic is designed to show that the test features are not permanently wired to the device under test but are temporarily associated therewith by some sort of switching means under control of the indexing means. Actually and for the sake of flexibility the test chain circuit is sandwiched in between two switching devices, one for selectively making connections to different parts of the circuit of the device under test and the other for providing the proper power terminations for the test circuits thus established.

The means shown in the rectangle marked connecting means is a schematic representation of a crossbar switch which may be more completely understood by reference to the following patents: 1,953,503, J. N. Reynolds, Apr. 2, 1934; 2,021,329, J. N. Reynolds, Nov. 19, 1935; and 2,040,334, J. N. Reynolds, May 12, 1936.

The switching scheme is closely copied from the following patent: 2,244,004, E. L. Erwin, June 3, 1941. While a feature of this invention is the use of a switch at this point under control of the indexing means so that the interconnections between the unit under test and the test features may be made automatically, it will be understood that the invention is not limited to the use of crossbar switches but that any other equivalent means may be employed. In some cases it might be expedient to use what is known as the sandwich toaster cross connector which consists of an array of horizontal wires and a similar array of vertical wires between which may be inserted removable cards of insulating material having metal eyelets or other conducting means placed at desired cross points.

Figs. 4 and 5 when placed together as indicated in Fig. 3 form another schematic circuit diagram to explain in more detail the relation of the essential instrumentalities employed and the method of their cooperation.

The control of the testing device is essentially in the indexing means which in this embodiment of the invention takes the form of a tape 18 similar to the well-known printing telegragh tape. This is punched with five-place permutation codes which for convenience are the same as the ordinarily employed letter codes. The tape, also for convenience, is formed in an endless loop so that as the end of the testing operation designated is reached the beginning will again be in place to cause the performance of the test again. In order to save time this test set is arranged so that two devices to be tested may be associated therewith at the same time. While the apparatus 19 under test is being tested the other unit 20 may be in the process of connection thereto, so that as soon as the unit 19 is found satisfactory the movement of the tape 18 need not be stopped. Thereupon the unit 20 will be tested and while that is under test the unit 19 may be removed and replaced by still another. Thus the testing of these apparatus units becomes a continuous performance.

The tape 18 passes through a tape transmitter 21 and each two-letter code operates first the register 22 and then the register 23 under control of a transfer relay 24. The registers 22 and 23 through their control over a bank of multicontact relays 25, 26, 27, 28, 29 and 30 variously ground the conductors in the bundle designated 31 to cause the setting up of a group of testing circuits. When this operation is completed the chain circuit extends into the control circuit and causes the operation of the satisfaction relay 32 whereupon the tape 18 is advanced and another group test is prepared.

The connecting means of Fig. 2 in which the switch points 2, 4 and 8 are located are here shown as a group of crossbar switches in a primary, secondary and tertiary arrangement. Each crossbar switch group has its group of selecting and holding magnets which are selectively operated by the indexing means as indicated by the relays 33 and 34, to interconnect the circuits of the apparatus under test and the testing features. The watching relays of the testing chain circuit are also variously energized by the indexing means. Lastly, the power termination selecting means is here shown as another crossbar switch operated by the indexing means through the control by relays 34 and 35.

The primary, secondary and tertiary arrangement of switches between the apparatus under test and the test chain is an economical method of quickly interconnecting a large number of test points in the apparatus under test and a large number of test set terminations. The power termination switch is comparatively small as the number of variations of power connections is limited. As indicated, by way of example, there is ground, 24 volts direct current, 48 volts direct current, 130 volts direct current and ringing current, the various potentials and so forth that are ordinarily employed in the systems for which the apparatus under test is manufactured. These values and the number of sources may be varied to suit any given condition.

This power termination switch also provides means for looping connections back again so it will be seen that great flexibility in the desired connections may be had.

One feature of the invention which is here only indicated is that the switches are set under control of the indexing means. In the description to follow it will be seen how the control magnets of these switches are energized by impulses and how they then lock into operated position until released by other impulses. By this means it is not always necessary to completely tear down all established connections after each group of tests has been made as it frequencly happens that the same test feature is used repeatedly in connection with the same test points in the apparatus under test.

It will therefore specifically appear that a connection is established by the use of ground impulses and torn down by the use of battery impulses. If during the transition from one group test connection to another certain leads are neither connected to ground or to battery the connections which they control will remain intact. In this connection it will later appear that all releasing codes will have one common punched hole in the tape. It is important to note that the battery impulse for releasing comes from a potential higher than that of the battery for holding the connection, so that when this battery impulse is applied the current is reversed which tends to produce the utmost speed in release.

The principle of operation is shown in the schematic diagram of Fig. 6. The codes R,B, A,B, I,Y; R,C, A,C, I,T; R,D, N,Y, I,W, on the tape as it passes through the tape transmitter will operate the switches of Fig. 5 above and below the test chain to establish the connections shown. A circuit from a source of ringing current through the upper armature and contact of relay 36 is extended over the condenser 37, through ringing current responsive relay 38, the contact and inner armature of relay 36 to a ground connection. Another connection would be established from the armature and front contact of relay 38 through the winding of signal relay 39 to a source of direct current. Following the setting up of this connection the codes D,O, S,Y and F,J would be transmitted. Code D,O would cause the tape decoding circuit to send a momentary ground impulse to the code point for relay 36 here shown as an X within a circle terminating the circuit of relay 36. This ground impulse will cause the operation of relay 36 which then locks up through the front contact and lower armature of relay 36 and the resistance 40 to ground. As will appear hereinafter the other circuits established by the codes R,B, A,B, I,Y and so forth are set up on the same principle, that is ground impulses are sent which result in the operation of certain magnets and relays which then lock in local circuits.

The operation of relay 36, applies ringing current to the winding of relay 38 whereupon this relay operates and closes the circuit for signal relay 39.

The code S,Y will cause the tape decoding circuit to send a ground impulse to the watching relay 41 which thereupon operates and locks through its associated resistance 42 to ground. Relays 39 and 41 being operated the chain circuit is closed as indicated to operate the satisfaction relay 43.

The last code on the tape for this particular operation is the code F,J which causes the tape decoding circuit to apply a ground to the code point for the test relay 44. This relay transfers the control of the stop magnet of the tape transmitter from its normal path to the contact of the satisfaction relay 43. If this relay is operated the stop magnet will remain energized from the ground on the inner armature of the test relay 44 to advance the tape off the F,J code. If at any time the test relay 44 is operated and the satisfaction relay 43 is normal, the ground will be removed from the stop magnet of the tape transmitter and the tape will stop on the F,J code. The tape in stopping on the F,J code will, under this condition, connect the ground on its inner armature over the back contact of the satisfaction relay 43 to the trouble time out circuit which will function and lock the tape to the F,J code point.

If this same test is to be employed again in the next group of tests the connections thus established will be left undisturbed. If on the other hand, let us say that the relay 36, set by the code D,O is to be released, then another code will be punched in the tape which will result in the application of a momentary reversed battery connection to the D,O code point. Thereupon, due to the inclusion of the resistance 40 in the holding circuit, the relay 36 will be short-circuited and will release. The relay 41 may be dismissed in the same manner.

Fig. 7 is a fragmentary circuit diagram showing the relays of a simple test feature and the indicating lamp used to notify the attendant the nature of the trouble when the tape is stopped and the display means is operated. The key relay 45 imposes a condition on the apparatus to be tested and the watching relay 46 matches the result of this condition. In this example the key relay renders the signal relay 47 operative by removing a normal short circuit from about its winding, thus leaving the signal relay 47 in circuit with some point in the apparatus under test. Both the key relay 45 and the watching relay 46 are operated from the indexing means as indicated by the X within the circle in which their windings terminate and by their resistance holding circuits. The watching relay breaks the chain circuit. If the response of the signal relay is as expected then the signal auxiliary relay 48 will be energized and will repair this break.

The signal lamp 49 is in an open circuit when both relays 46 and 48 are normal as shown. When both these relays are operated then the lamp 49 will be connected to ground so that if the display means is operated at this time the lamp 49 will give a steady signal, indicating that the specified test has been made and that the result is satisfactory. If only the watching relay 46 is operated, then the lamp will be connected to a fast interrupter and by flashing at a fast rate will indicate that the apparatus under test has not responded properly. If only the signal auxiliary relay 48 is operated the lamp 49 will flash slowly, indicating that the signal relay has responded improperly.

Fig. 8 is a silhouette of a short piece of tape as used for the indexing means, showing the codes which are used. These are the codes for each letter of the alphabet and several of the functional codes ordinarily employed in printing telegraph practice, such as carriage return, line feed, space, figures and letters.

Fig. 9 is a similar representation of a piece of tape cut in the proper way to establish the connections of Fig. 6 and to cause the performance of the test specified therein.

The first group of perforations for the codes FWRDNYIWFJ cause the establishment of a single circuit. The code F,W is a starting code and is used to permit restoring the control circuit to normal from whatever condition it may be in at the time. Following this the codes RDNYIW cause the establishment of the path from the front contact of relay 38 through the winding of signal relay 39 to a source of direct current. If relay 38 were operated or if for any other reason the armature of this relay were on its front contact, then the signal relay 39 would respond and open the chain circuit so that at the end of this code when the relay 44 is operated by the test code F,J, the satisfaction relay 43 would fail to respond and the alarm signals would operate. It is to be noted in this connection that it is not always necessary for a watching relay to be operated, for it may perform just as useful a function by remaining normal. In this case the expectation is to find the relay 38 under test to be normal or at least to find no ground connection to the front contact thereof so that the expected response of the signal relay is to remain unoperated. Therefore, the watching relay is left on its back contact to check or match this expected response.

Assuming the test to be satisfactory the satisfaction relay 43 operates and as will appear hereinafter the tape transmitter which is always stopped by the code F,J is started again. This time the codes RBABIYRCACITDOSYCTAFJ are transmitted, decoded and translated into switching operations for the next test. In this code the letters CT represent the functional code for carriage return and comprise a single code. The codes RBABIY set up a connection from the condenser 37 through the upper contact and armature of relay 36 to the source of ringing current. The codes RCACIT set up a companion connection from the winding of relay 38 to ground so that upon the operation of relay 36, the relay 38 should be operated by ringing current. Code D,O causes the operation of relay 36. Code S,Y causes the operation of relay 41. Code CT,A is a location signal code and as will appear hereinafter will cause the operation of a signal which will tell the tester that relay 38 is the relay or component of the device under test that "should be" operated now. Finally the code F,J causes the test to be made. In this instance the expectation is that relay 38 will operate and place ground on its front contact; therefore the watching relay 41 is operated so that upon the response of relay 39 the chain circuit is closed to allow the satisfaction relay to operate. Upon the receipt of the code F,J, therefore relay 44 operates and the satisfaction relay being operated the advance is made by causing the tape transmitter to again operate.

The next group of codes HBIWYYOAFJ cause the following operations. The code H,B is a specific code for releasing the 90 volt alternating current termination to the upper armature of relay 36. This followed by the code I,W will then produce a connection between this upper armature of relay 36 and the source of current 48 volts direct current. It may be noted at this point that one or a plurality of connections may be made simultaneously to any single power termination. Thus, by way of example, when the codes R,B and A,B were followed by the code I,Y the connection shown was established. If the codes RBABRICAC were sent and then followed by the code I,T both the armatures of the relay 36 would be connected to ground. In other words when any one or more back end of a connection is left unconnected it or they will be connected to a particular power termination by the next following code such as I,Y, I,T, or I,W. To release any of these connections a specific code is used. Thus if both armatures of relay 36 had been connected to 90 volts alternating current then the specific code H,B would release the upper armature alone leaving the inner armature still connected to 90 volts alternate current. Now with the upper armature of relay 36 left dangling, so to speak, the code I,W will establish a connection from the upper armature of relay 36 to a source of current 48 volts direct current.

Following this is the code Y,Y which is used to release the connection established by the code S,Y, in other words, to release the watching relay 41. Attention is called to the fact that the only difference between the codes S,Y and Y,Y is that the first letter contains a particular perforation in the bottom row as shown in Figs. 8 and 9. It will appear hereinafter that the bottom row perforations in the first letter of a two-letter combination plays no part in the selection of a terminal but is used only to determine the potential applied thereto. Thus the codes S,Y and Y,Y will both reach the same terminal but the first will cause ground to be applied thereto while the second will cause battery to be applied thereto. Both codes S,Y and Y,Y will cause a connection to be established to the point denoted by the X within a circle in which the winding of relay 41 terminates. Ground applied thereto by the code S,Y operates this relay and battery applied thereto by the code Y,Y releases this relay.

The code Y,Y is now followed by the code O,A which bears the same relation to the code CT,A as the code Y,Y bears to the code S,Y. The code O,A therefore releases the "should be" signal used in the previous test to denote the fact that relay 38 should be operated. In the present test relay 38 should not be operated since it is now connected to direct current instead of alternating current. Since relay 38 should not be operated then the watching relay 41 is released. This test proves that condenser 37 is providing the expected bar to direct current. Now upon the transmission of the test code F, J the satisfaction relay 43 will again cause the tape transmitter to start operating again.

The two following codes F,R and S,C are, as will appear more in detail hereinafter, for general release and for the operation of the satisfaction signal.

Fig. 10 is another schematic circuit diagram intended to show the method of rapidly finding an unstandard condition which is encountered. The terminations of the testing device are shown as being mounted on a terminal strip 50 and as being regularly numbered from 0 to 99. There are also a plurality of signals 51, 52, 53 and 54 which represent twenty such signals, ten for the units digit and ten for the tens digit. The display of signals 51 and 54, by way of example, would indicate the number 90 since signal number 9 of the tens digit and signal 0 of the units digit would be in operation. This would indicate termination 90.

In the example shown, the test feature which is generally that circuit enclosed in the broken line rectangle 55, will be assumed to be connected to termination 90, through the operation of primary switch 56, secondary switch 57 and tertiary switch 58. As will appear hereinafter each switch point comprises a set of permanently paired contacts of which three, designated A, B and C, in each case are shown in this schematic diagram. The A lead may be traced from termination 90 through the switches 56, 57 and 58 of the signal relay 59 of the test feature. The circuit from this relay may also be traced through the power termination switch 60 to a source of current 130 volts direct current.

The B and C leads from the primary switch 56 lead to a coordinate connecting arrangement for the termination signals 51 to 54. The same conductors may be traced from the tertiary switch 58 to the contacts of the feature connector relay 61.

If it is assumed that in the course of a test that termination 90 is connected as described and it is expected that the response will be the connection of ground to termination 90 so that signal relay 59 should operate, then the watching relay 62 will be operated as a check on this response. If the response is as expected then the chain circuit between the conductors 63 and 64 will be closed through the front contacts of auxiliary signal relay 65 and watching relay 62 and the satisfaction relay will be operated as hereinbefore explained. Under this condition the individual test feature signal 66 will operate steadily from ground the contact and armature of relay 62, contact and armature of relay 65 to the signal 66. While the other terminal of this signal is shown as being connected to battery, it will be understood that it is connected to a normally open circuit which is only closed to produce the circuit shown when the satisfaction relay reports a failure. If such a failure is reported and signal 66 operates steadily, then the circuit associated with this particular test feature need not be examined.

If on the other hand the expected ground should not appear on termination 90 then signal relay 59 and auxiliary signal relay 65 would fail to operate and the chain circuit between conductors 63 and 64 would be opened. The satisfaction relay would then fail to operate and a general failure signal would come into operation. At the same time battery would be connected to one side of the signal 66 and a connection could be traced from the other side thereof through a front contact and armature of relay 62 and an armature and back contact of relay 65 to fast interrupter 67. The individual signal 66 would then operate at a fast rate indicating (if no other feature signals were operating in like manner) that the failure is in the circuit being tested by the test feature 55. The tester would then operate the key 68, closely associated with the signal 66, whereupon battery would be connected to the B lead and ground to the C lead. Therefore battery would be extended to conductor 70 and ground to conductor 69. As will appear hereinafter an effective circuit will then be established through rectifier 71, signal 54, common conductor 72, signal 51, rectifier 73 to battery so that signals 51 and 54 would operate to indicate the fact that the test feature 55 is now associated with the termination number 90. Signal 74 would also operate at this time. Furthermore, a circuit from ground in key 68 would be connected to B conductor 75 which would result in the display of signal 76 to indicate 130 volts direct current as the power termination involved.

Conversely, if at any time the tester wishes to know what particular test feature is associated with a particular termination he may operate certain termination keys. By simultaneously operating termination keys 77 and 78 he may put ground and battery on conductors 69 and 70 respectively which in turn will extend down through the C and B conductors to operate signal 74. Thus the tester will know that the test feature 55 is the one which at the time is associated with termination 90.

Fig. 11 is another schematic circuit diagram to show in a simple maner the essential elements in the operation of the switches and the establishment of a complex electrical path therethrough. In this diagram the path which is being established is not shown, only certain control paths through the switches being illustrated.

By way of example, there are one hundred incoming terminals (as indicated in connection with Fig. 10) and forty test features. There will be correspondingly one hundred relays such as 79 and forty relays such as 80. Relay 79 is known as a termination relay and relay 80 is called a feature connector relay. By indexing the codes for relays 79 and 80 a complex electrical path may be established. During the establishment of this path the termination number relay will be automatically released so that the connection is then held under control of the feature connector relay and may be released by indexing a releasing code for this relay alone.

As in previously described schematic drawings certain relays are shown terminating in an X within a circle. This indicates that such terminations appear in an array of terminals reached by the indexing means.

The crossbar switches 81, 82, 83 and 84 are shown merely as a single pair of crossed wires with one contact. This represents the D contact of the set of contacts involved in each switch and is a convention which will be readily understood.

The complex electrical path will be established through the transmission of the codes for relays 79 and 80 which will thereupon be energized in sequence. Relay 79 locks through its resistance 85. Through its armatures 1 and 3 relay 79 causes the operation of select magnet 86 of the primary switch and select magnet 87 of the secondary switch. Select magnet 87 causes the energization of group relay 88 and this in turn closes a circuit from ground, armature and back contact of hold magnet 89 of the primary switch, front contact and armature of relay 88, armature and back contact of hold magnet 90 of the secondary switch to the front contact of group relay 91 for the later energization of relay 92. Upon the energization of the feature connector relay 80, ground is connected from armature 1 and front contact of relay 80 through armature 2 and back contact of hold magnet 93 of the tertiary switch to the winding of group relay 91 whereupon relay 92 is operated. This causes the operation of the select magnet 94 of the tertiary switch. Select magnet 94 now closes a circuit from ground, its armature and front contact, armature 2 and front contact of feature connector relay 80, normal contacts of armature 1 of hold magnet 93 to the winding thereof. Hold magnet 93 operates the tertiary switch and extends a ground to the winding of hold magnet 90 of the secondary switch. Magnet 90 opens the circuit of relay 92 and this in turn releases the select magnet 94 of the tertiary switch. Hold magnet 90 operates the secondary switch and extends a ground to the hold magnet 89 of the primary switch. This switch in turn extends battery to armature 2 of termination relay 79 which short-circuits this relay and causes its release. The release of relay 79 is followed by the release of the select magnets 86 and 87 so that now the primary, secondary and tertiary switches are held under control of armature 1 of the feature connector relay 80.

The complex electrical path established through the primary, secondary and tertiary switches may be released by the release of relay 80 which in turn may be caused by indexing a releasing connection to its terminal or by opening its battery feed conductor by indexing a general release code.

The fourth switch 84 represents the power termination switch. After relay 80 is operated then a code for some particular power termination may be sent by the indexing means to cause the operation of relay 94. This relay locks through armature 4 of relay 80 and resistance 97 to ground. Relay 95 also causes the operation of select magnet 95 which in turn completes a circuit through armature 6 of relay 80 to operate hold magnet 96 of the power termination switch 84. The hold magnet operating causes the release of relay 94 and in turn the select magnet 95.

It should be noted that the conductors leading to armatures 4 and 6 of feature connector relay 80 are common to other combinations such as relay 94 and select magnet 95. Thus as in the example previously given the hold magnet 96 may be released by a specific code which effectively leaves the power termination dangling. Thereupon some other relay like relay 94 may be indexed and operated whereupon the operations just described will be repeated and the complex electrical path will be connected to some other desired power termination.

The release of the feature connector relay 80 by opening the locking circuit of holding magnet 96 through resistance 98 effectively releases the power termination switch 84.

In order to simplify the detailed description the operation of the various features will be described separately.

*Tape transmitter*

The tape transmitter is used to translate the code combinations perforated in a tape, into electrical impulses and to simultaneously transmit these impulses over five leads to the relays of the decoders. The tape transmitter shown schematically in Fig. 13 within the broken line rectangle 100 is of the type disclosed in Patent Number 2,055,567 granted September 29, 1936, to E. F. Watson. It consists of five sensing fingers 101 to 105 which will extend a ground connection from conductor 106, in accordance with the perforations of the tape 107 to the conductors 108 to 112, respectively. The transmitter is powered by a motor 113 operating a shaft 114 through a slip clutch 115. Through an appropriate worm gearing the shaft 114 drives a shaft 116 carrying a cam 117. Upon the energization of the stop magnet 118 the cam 117 is released and the tape is allowed to advance from one code to the next.

The stop magnet 118 is energized from battery supplied over conductor 145 (companion to ground feed lead 106). The lead 145 and the lead 146 are normally closed at a distant point for certain control purposes which will be described hereinafter. Therefore battery may be traced to conductor 146 through the resistance 147, the taut tape switch 148, stop magnet 118 to ground on conductor 106. Under normal conditions, therefore, magnet 118 is energized and the shaft 116 will rotate freely allowing the rapid sequential transmission of the codes encountered. The action of the magnet 118 under certain controls will be described hereinafter.

The connection of ground to conductor 106 and battery to conductor 145 in the control circuit and the conditions under which such connections are made will be described in detail hereinafter.

The tape 107 is the indexing means. It is perforated in accordance with a prearranged plan devised by the engineer who determines the required tests to be made on the apparatus unit. This tape is individual to a particular apparatus unit and is removable and replaceable by other tapes similarly prearranged to control other series of testing operations appropriate for other particular apparatus units or devices to be tested. For purposes which will appear hereinafter the tape 107 is made into an endless loop.

The five leads 108 to 112 lead through the contacts of the transfer relays 119 and 120 to the decoders.

*Tape recording circuit*

The perforated tape is arranged in a series of two-letter codes. As each crosswise row of holes permits only thirty-two combinations it is necesasry to combine two consecutive rows of holes into one two-letter code in order to selectively reach a field of terminals of a greater number than thirty-two. By combining two rows, the number of different combinations or two-letter codes available becomes 1024.

The contact tongues of the transmitter are wired to the armatures of the transfer relays 119 and 120 as stated. The first letter of a code will reach through the back contacts of the transfer relay to the first decoder comprising generally relays 121 to 125, inclusive, and the second letter of a code will reach through the front contacts of the transfer relay to the second decoder comprising generally the remaining relays shown in Fig. 14.

By way of example, the code for the letter "S" has perforations in the first and third places so that fingers 101 and 103 will be grounded, and consequently relays 122, 124 and 125 will be operated. Through the operation of these relays the code for the letter "S" is decoded into a single electrical condition on the conductor 126. This may be traced from ground, armature 1 and back contact of relay 121, armature 1 and front contact of relay 122, armature 2 and back contact of relay 123, armature 4 and front contact of relay 124 to conductor 126.

If it is assumed that the next code is for the letter "Y", the contact fingers 1, 3 and 5 of the transmitter will be grounded and relays 127, 128 and 129 will be operated. The effect of this may be traced as a circuit from ground armature 3 of relay 127, armature 1 and back contact of relay 130, armature 1 and front contact of relay 129, winding of relay 131 to battery. Relay 131 closes a circuit from ground, back contact and armature 2 of potential transfer relay 132, armature 9 and front contact of relay 131, armature 1 and front contact of relay 127, armature 3 and back contact of relay 133, armature 5 and front contact of relay 128, front contact and armature 7 of relay 131 to the conductor 134 connected to such armature.

Thus the two-letter code S,Y will be decoded into a pair of electrical conditions placed on conductors 126 and 134. The effect of this will be described hereinafter.

To return now for a moment, it will be noted that when a ground is extended to any one of relays 121 to 125 upon the operation of such relays a ground will be connected to conductor 135 leading through the windings of relays 136 and 137 (in parallel) to the back contact of relay 138. Since this has a ground connection relays 136 and 137 will not operate as long as ground is extended to the relays 121, etc. When, however, the tape transmitter moves the tape those of relays 121 to 125 which are energized remain locked to the back contact of relay 138 and relays 136 and 137 operate.

Relay 136 causes the operation of the transfer relays 119 and 120 so that the next code will operate the second decoder. Relay 137 connects ground to the winding of relay 138 but this relay is connected to conductor 139 which performs a like function to conductor 135. Therefore relay 138 does not operate upon the operation of relay 137 nor does it operate upon the energization of relay 127, for example, but when the tape transmitter moves the tape and the original energizing circuit of relay 127 is opened, then relay 138 operates. This results in the release of relays 136 and 137 and the relays of the first decoder followed by the release of relays 119 and 120. The release of relay 136 allows the release of the relays of the second decoder.

There is then a definite interval during which conductors 126 and 134 are simultaneously grounded.

Let us assume that the first letter code instead of being for the letter "S" was for the letter "Y." The only difference this would have made would be to ground conductor 112 while it was connected through the back contact of relay 119. This would have resulted in the operation of potential transfer relay 132 so that conductor 134 instead of being connected to ground would now be connected to battery. Relay 132 locks to conductor 135 until this is released as above described.

Code S,Y is an operating code and code Y,Y is a releasing code. Both operate at the same point but the first applies a grounded impulse thereto while the second applies a battery impulse thereto. It is to be noted that the battery connected to the front contact of armature 2 of relay 132 is of higher potential than the ordinary relay operating battery. Thus the releasing impuses cause high speed release.

The conductors 126 and 134 lead into the translator, comprising a plurality of multicontact relays shown in Figs. 15 and 16. For the sake of clarity the large number of conductors leading from the contacts of relays 125 and 126 are not shown in full but are bracketed and their destination is indicated by a broken line. It will easily be seen that conductor 126 leads to relay 140 which now becomes energized. Likewise conductor 134 may be traced to a contact of multicontact relay 140 leading to conductor 141 which is known as the S,Y terminal. If the code S,Y is transmitted as described, then a grounded impulse will be delivered to conductor 141. If the code Y,Y is transmitted as described, then a battery impulse will be delivered to this same conductor 141.

It may be conveniently pointed out at this time that the field of terminals reached by the multi-contact relays of the translator of Figs. 15 and 16 are multipled to a set of terminals manually available for connections thereto by the test picks 143 and 144. Thus the conductor 141 terminates in a terminal 142. This is in the horizontal S row and the vertical Y row, representing the code S,Y. If this terminal is touched by the test pick 143 it will cause the operation of the relay which responds to the S,Y code. If it is touched by the test pick 144 it will release this relay in the same manner as by the use of the code Y,Y. Thus all operations that are accomplished automatically by the index means may also be accomplished manually by the use of the test picks 143 and 144. This has a special use which will be described hereinafter.

CONTROL CIRCUIT

*Reset key operation*

When a tape is initially inserted into the transmitter the operation of the reset key 149 is required to permit the control circuit to advance to the starting position. The reset key 149 is also operated at the end of the tape loop when the test repeating feature is not being used. Also the reset key 149 may be operated at any time the test set has timed out for trouble. The operation of the reset key 149 closes a circuit from ground through the reset relay 150, back contact and armature 2 of relay 151 to battery and results in the operation of relay 150 which locks through its front contact and armature 4. The operation of the reset relay 150 performs the following functions:

(a) It opens the circuit of the satisfaction signal consisting of lamp 152 and gong 153 at its armature 3 and back contact.

(b) It establishes a circuit from ground to conductor 106 leading to the tape transmitter through its armature 3 and front contact.

(c) It connects battery to conductor 145 leading to the tape transmitter from its front contact and armature 8 through the back contact and armature 2 of relay 154.

(d) It opens the circuit of the start relay 155 at its back contact and armature 7.

(e) It opens the operating path of the display relay 154 at its armature 2 and back contact.

(f) It closes ground from its armature 6 to the winding of relay 157, which opens the battery feed leads to all magnets and relays which may be operated through the operation of the means of Figs. 13 to 17, inclusive. This provides a general release since the operation of relay 157 will restore all operated relays and magnets to normal. It may be mentioned at this point that relay 157 will also respond to the code F,R, as indicated by its connection extending over conductor 158.

(g) It closes ground from its front contact and armature 5 to conductor 160 to cause the operation of the relay 159. It may be mentioned here also that relay 159 will respond over conductor 160 to the code S,C. Relay 159 locks to ground at the back contact and armature 1 of relay 151 and extends ground to conductor 161 to restore the test position indicator shown in Fig. 18 to normal.

(h) It opens conductor 162 leading to the W and Z relay combination consisting of relays 163 and 164.

*Start position*

The reset relay 150 locked operated keeps the stop magnet 118 of the transmitter energized over conductor 106 and the tape will continue to index until the starting position has been reached.

All tapes start with the code F,W. This code causes the tape decoding circuit to ground the F,W code point, conductor 165, which results in the operation of relay 151. This relay operated through its front contact and armature 3 connects ground to conductor 106 and through its front contact and armature connects battery to conductor 145 to continue the energization of the stop magnet 118 to advance the tape off the F,W code. Relay 151 also opens the battery feed circuits for relays 150, 159, 166, 167 and 168 which will release if operated. Relay 151 opens the ground for lighting the normal light 169.

When the tape decoding circuit advances past the F,W code relay 151 will release. Under this condition battery and ground are removed from conductors 145 and 106, respectively, and the stop magnet 118 of the transmitter is released which prevents the tape from indexing beyond the first letter of the second code on the tape. Relay 151 restores the operating battery to the control circuit relays and lights the normal lamp 169 by competing a circuit from ground armature 1 and back contact of relay 151, armature 3 and back contact of relay 167, armature 1 and back contact of relay 155, normal lamp 169 to battery. The normal lamp lighted indicates that the control circuit is in the starting position awaiting the operation of the start key.

*Start key operation*

The operation of the start key 170 when a tape is in the starting position will cause the start relay 155 to operate in a circuit from ground, the contacts of the operated start key 170, winding of start relay 155, back contact and armature 7 of relay 150, back contact and armature 2 of relay 167 to battery. Relay 155 operates and locks to ground on its front contact and armature 2. Start relay 155 operated (a) connects ground to conductor 106 at its armature 3 and front contact and battery to conductor 145 to again energize the stop magnet 118 of the tape transmitter. The battery connection to conductor 145 may be traced from battery, front contact and armature 4 of relay 155, conductor 171, thence in a chain circuit including the back contact and armature 4 of relay 172 and armature 2 and back contact of relay 173, the left-hand contact and armature or relay 174, back contact and armature 2 of relay 154 to conductor 145. The purpose of running this connetcion through the chain of relays 172 to 174 will appear hereinafter. The start relay 155 also extinguishes the normal lamp 169 by opening its circuit at the back contact and armature 1 thereof.

*Testing steps on tape*

Each tape is arranged in a number of testing steps. The codes on each step are placed on the tape in the numerical order shown below with the exception of items 6, 7 and 8 which may be placed in any order on each testing set.

1. Codes to set up or release a connection between two desired points and at the termination connection, codes for the back end of the test feature as hereinbefore described.

2. Codes to set up or release other connections and terminations for other points and features.

3. Codes to operate or release key relays.
4. Codes to operate or release signal watching relays.
5. Codes to operate or release relay indicating relays. These relays operate the "should be" indicator.
6. Codes to change the length of the timing-out interval.
7. Codes to permit skipping of other codes when optional list conditions are not ordered.
8. Codes to permit the stopping of the automatic progress of the tests when a manual operation is to be performed.
9. A test code F,J to transfer the control of the transmitter from its manual advancing path to the test relay 175 and satisfaction relay 176.

Connection and termination code

The order in which the two-letter codes are placed upon the tape determines the points to be connected and the potential that will be used on each test feature. The terminations of the device under test are connected to the test device by means of connector cables ending in an appropriate multicontact plug. Two of these are divided, coming from the odd and even relays as will appear hereinafter. The terminations of the test device are 100 in number running from 0 to 99, inclusive, and they are so connected at the terminals of the device under test that any terminal there may be readily identified by its number in regular rotation. When it is desired to connect terminal No. 1 to test feature No. 1 codes R,A and A,B are placed in that order on the tape and these codes must be immediately followed by the code of the potential which the test engineer requires on the test feature. Code I,T will connect ground, code I,U 24 volts direct current, etc. Codes R,B, A,B and I,T placed in that order will connect terminal No. 1 of the circuit being tested to test feature terminal No. 1 and connect ground to the back end of test feature No. 1. If the code arrangement on the tape had been R,B, A,D, I,U instead of R,B, A,B, I,T the terminal No. 1 would be connected to test feature 3 and 24 volts direct current would be applied to the back end of the test feature. In this manner all the connections required for each testing set are made.

Switching—primary switch

Figs. 21 to 28, inclusive, when arranged as shown in Fig. 12 show the arrangement of primary switches. These consist of an array of crossbar switches sufficient to serve one hundred terminations giving each termination appearances in five crossbar contact sets. Thus, termination No. 00 represented by conductor 180 appears in five horizontal crossbar contact sets designated 181, 182, 183, 184 and 185, respectively. Due to the fact that these crossbar switches are well known, the contacts of set 185 alone are indicated. Each of these five contact sets will carry the termination 00 into a different secondary crossbar switch.

Each set of contacts has four pairs of permanently paired contacts designated A, B, C and D. The A set alone has to do with the termination leading to the device under test. The contacts B, C and D are for signaling and supervisory purposes which have been described hereinbefore in connection with certain schematic diagrams. The leads B and C are for the purpose of identifying a termination number by means of the termination number signals and the wire D is for switching purposes described particularly in the connection with Fig. 11 hereinbefore.

The termination numbers in primary group 0 are numbered from bottom to top 00, 10, 20, 30 . . . 90, the numbers being alike except for the tens digit. The termination numbers in primary group 1 are numbered 01, 11, 21, 31 . . . 91. The termination numbers in primary group 9 are numbered 09, 19, 29, 39 . . . 99. It will be seen then that the termination numbers 00, 01, 02, 03 . . . 09 occupy the bottom positions in the ten subgroups. These termination numbers will be referred to as a tens group since they have the same tens digit. A group of termination numbers having access to the same five line links will be referred to as a units group since they have the same units digit.

Secondary switch

The secondary switches shown in Figs. 30 to 34 and 36 to 40, inclusive, consist of an array of crossbar switches providing for 50 links from the primary switches, each link appearing in eight sets of permanently paired contacts in the secondary switch and in ten sets of permanently paired contacts in the primary switches. The secondary switches consist, therefore, of five groups with each group containing 10 links on the horizontals and 8 secondary links on the verticals. The links to the primary switches are so wired that the 5 links forming a particular primary group are connected one to each of the 5 secondary groups. The links from the first primary group appear on the bottom horizontal of the 5 secondary groups. The links from the tenth primary group appear on the top horizontals of the 5 secondary groups. Thus the link to which termination No. 00 has access through the set of contacts 181 will appear in the secondary sets of contacts 186 to 193, inclusive.

Tertiary switch

The tertiary switches shown in Figs. 42 to 45 and 47 to 50, inclusive, consist of an array of crossbar switches providing for 40 links from the secondary switches and 40 outgoing connections to the test features, each incoming link from a secondary having 10 appearances in the tertiary switches. The horizontal multiple is split so that each section of multiple runs to 10 verticals. The secondary links from the secondary switches are connected to the tertiary horizontals. The tertiary switches, therefore, consist of 4 groups. The secondary links are so wired that the 8 links from a particular secondary group are connected two to each of the 4 tertiary groups. The secondary links from the first secondary subgroup appear on the two bottom horizontals of each of the 4 tertiary groups. The secondary links from the fifth secondary group appear on the two top horizontals of the 4 tertiary groups. The bundle of 4 conductors designated 194, by way of example, constitute a link having access to the link between the primary and secondary switches above described through the contact set 186. This link will be found in the tertiary switches appearing in contact sets numbered 195 to 200, inclusive, these 6 contact sets being representative of the 10 in which this link actually appears. The A lead in the vertical from contact set 195, therefore, leads to the test feature 0. This will be described more fully hereintfter. Tertiary group 0 has test features 0 to 9, group 1, 10 to 19, group 2, 20 to 29 and group 3, 30 to 39.

Establishing a connection

The general method of establishing a connection has been described fully hereinbefore. However, it is to be noted at this point that Figs. 21 and 25 contain the termination number relays of which they are 100, one for each termination. Thus relay No. 201 in Fig. 25 is the termination relay for the termination No. 00. This relay as indicated responds to the code R,A. It will be noted that in operating, this relay will cause the operation of the select magnet 202 of the primary switch which will prepare the sets of contacts 181 to 185, inclusive, for operation. Relay 201 in operating will also cause the operation of select magnet 203 of the secondary switch which will prepare contact sets 186 to 193, inclusive, for operation.

Code A,A will cause the feature connector relay 204 to operate. This will extend a connection from ground to armature 4 of front contact of relay 204, the lower armature and back contact of hold magnet 205 to the winding of group relay 206. Group relay 206 will operate and extend a connection from armature 4 of group relay 207 through the armature and back contact of hold magnet 208, conductor 209, front contact and armature 1 of group relay 206, winding of relay 210 to prepare this relay for operation. Through the operation of select magnet 203 group relay 207 is operated so that ground is now extended from the back contact of the armature of hold magnet 211 over conductor 212 to armature 0 of relay 207, thus causing the operation of relay 210. Relay 210 now operates and extends a ground in series through the right-hand armature and back contact of all the other relays of this group to the armature of relay 210 and thence over its front contact to the winding of select magnet 213 to cause this magnet to prepare the contact sets 195 to 200, inclusive, for operation.

Through the operation of select magnet 213 ground is connected to conductor 214 which is extended through armature 1 and front contact of feature connector relay 204 to the normal contacts of the upper armature of hold magnet 205. This magnet thereupon operates and holds to the front contact of armature 4 of relay 204. Hold magnet 205 causes the operation of contact set 195 whereupon ground is connected over the D lead to the hold magnet 208 of the secondary switch. This in turn causes the operation of contact set 186 so that ground is now extended over the D lead to the winding of hold magnet 211. Hold magnet 211 in turn causes the operation of the contact set 181 whereupon battery is connected to the D lead to cause the termination relay 201 to be short-circuited. Relay 201 releases in turn releasing the select magnets 202 and 203. Group relay 207 is released through the operation of hold magnet 211 whereupon relay 210 and its associated select magnet 213 are released. Through the operation of hold magnet 205 the group magnet 206 is released so that the connection is now in the following condition. Connector relay 204 is operated and hold magnets 205, 208 and 211 are operated. The other relays described in this connection are now all released. Thus, the sending of codes R,A and A,A will result in the extension of conductor 180 to conductor 215.

Figure 55:
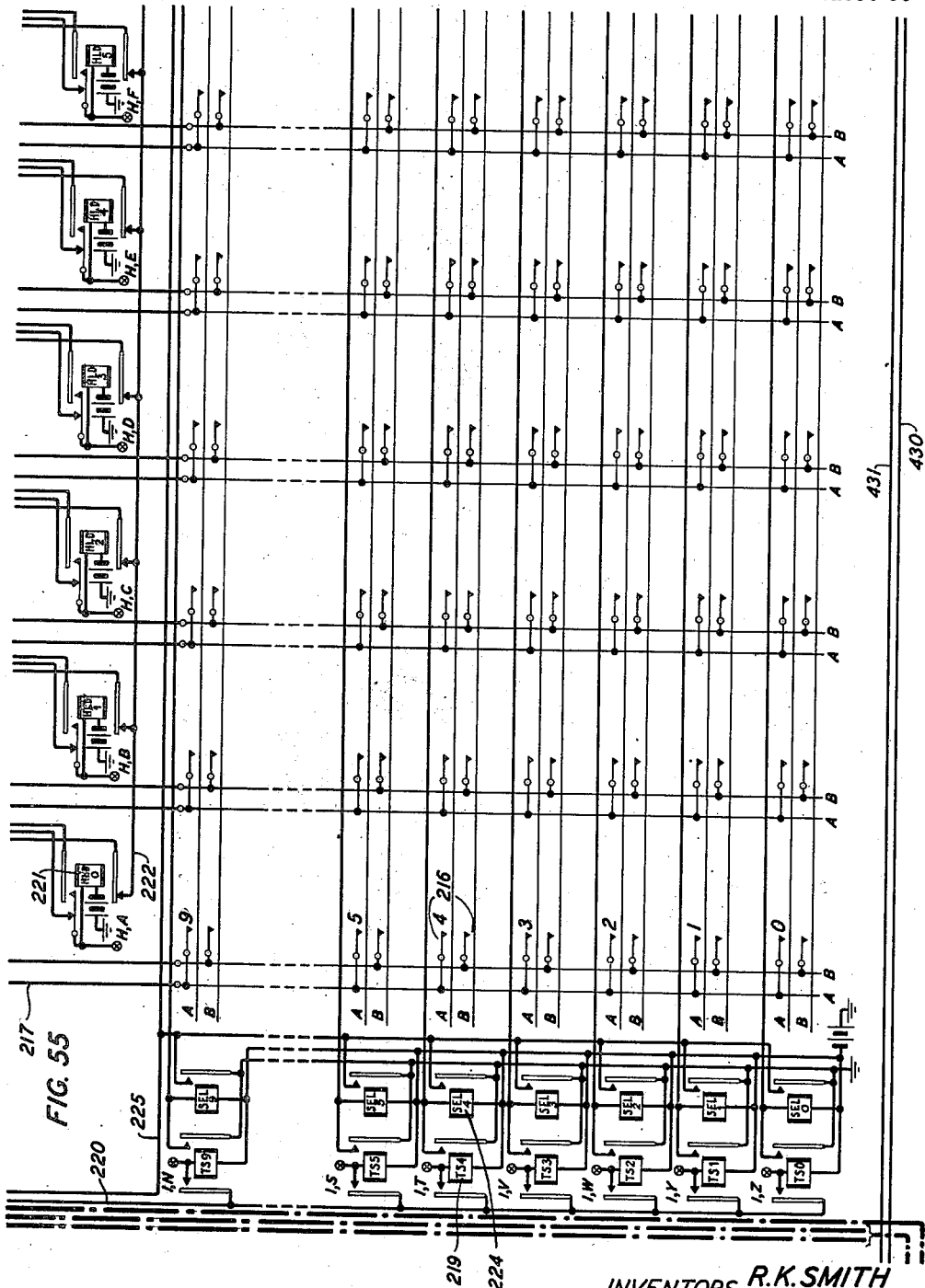
Figure 56:
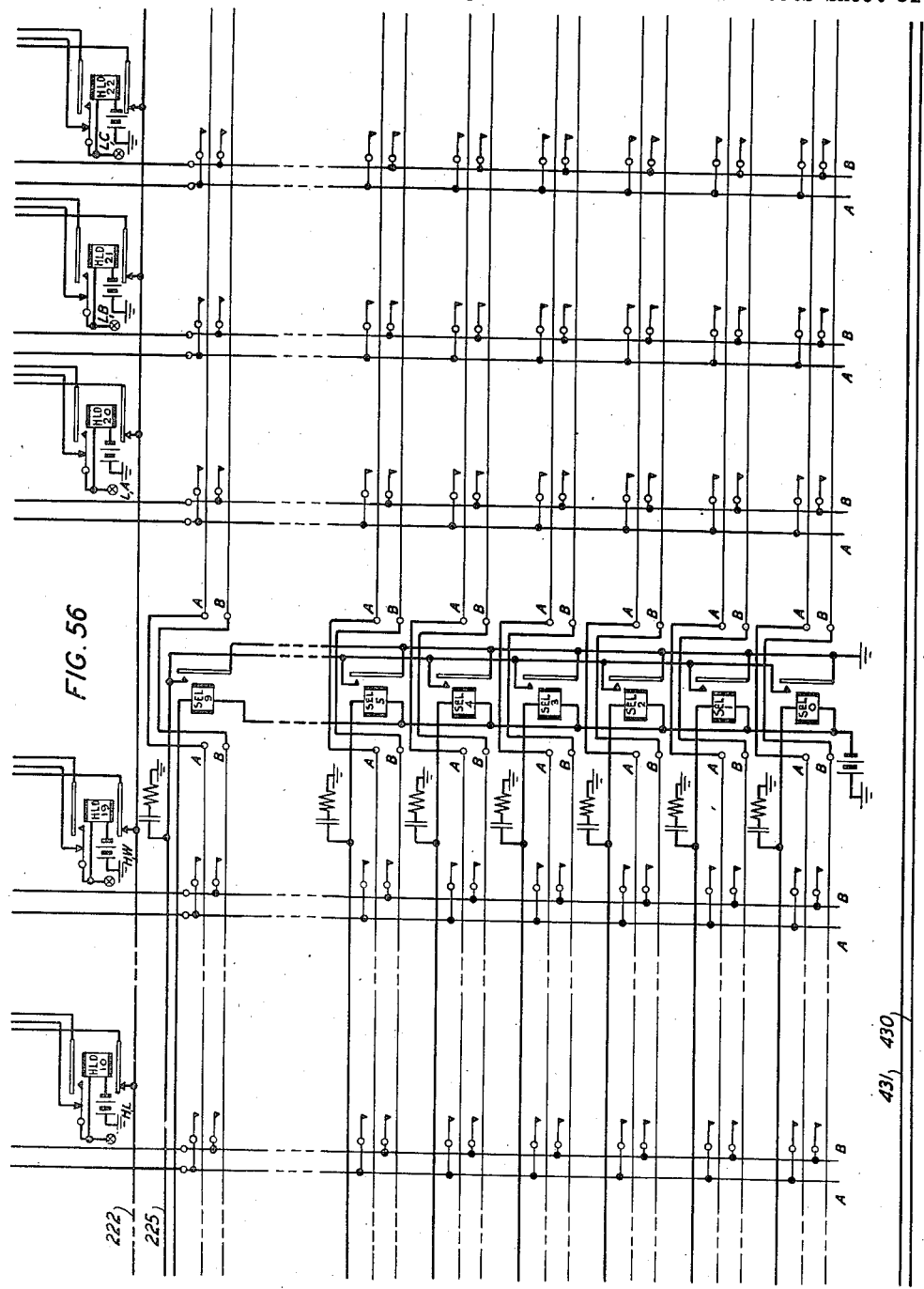
Figure 57:
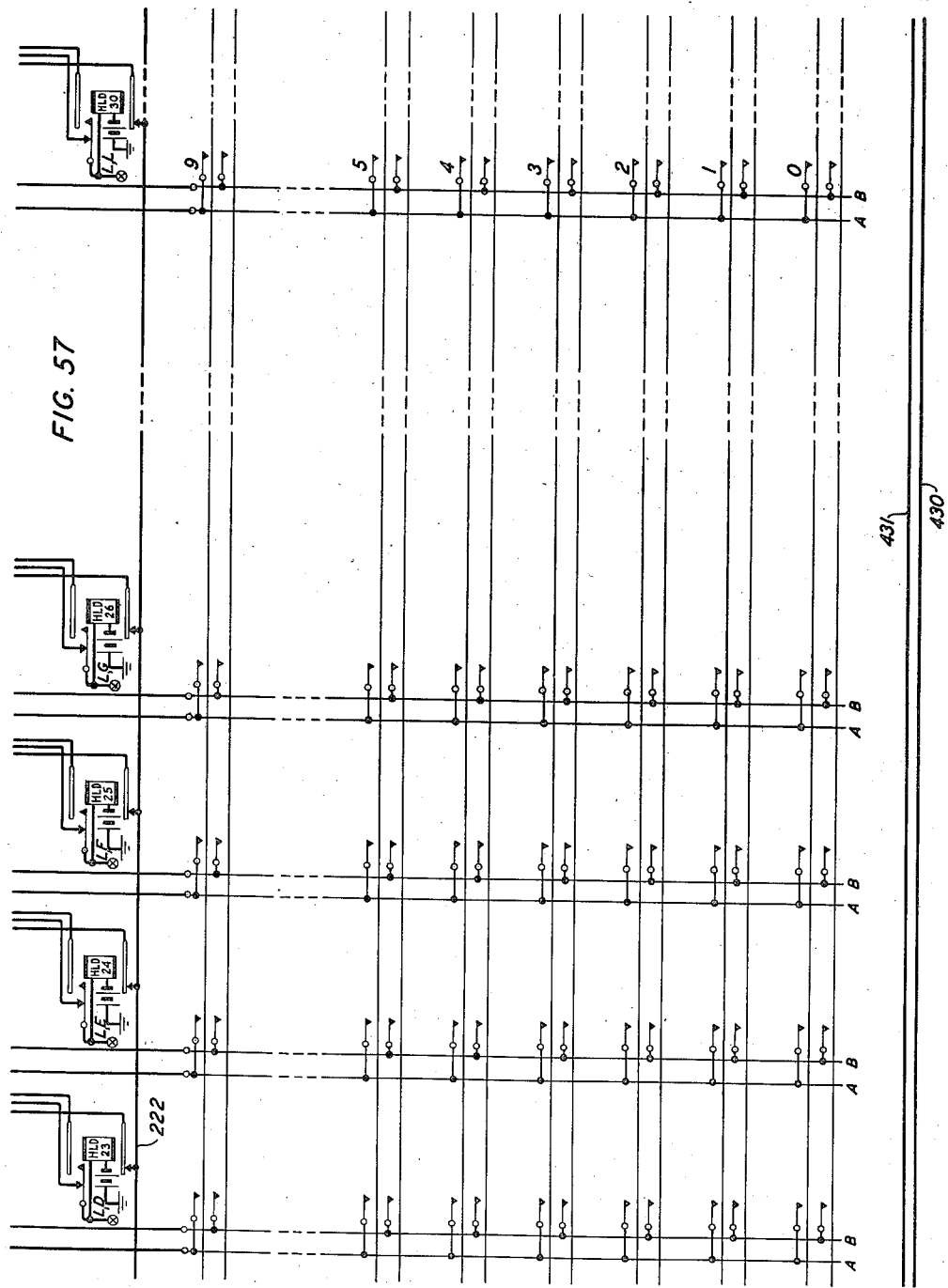
Figure 58:
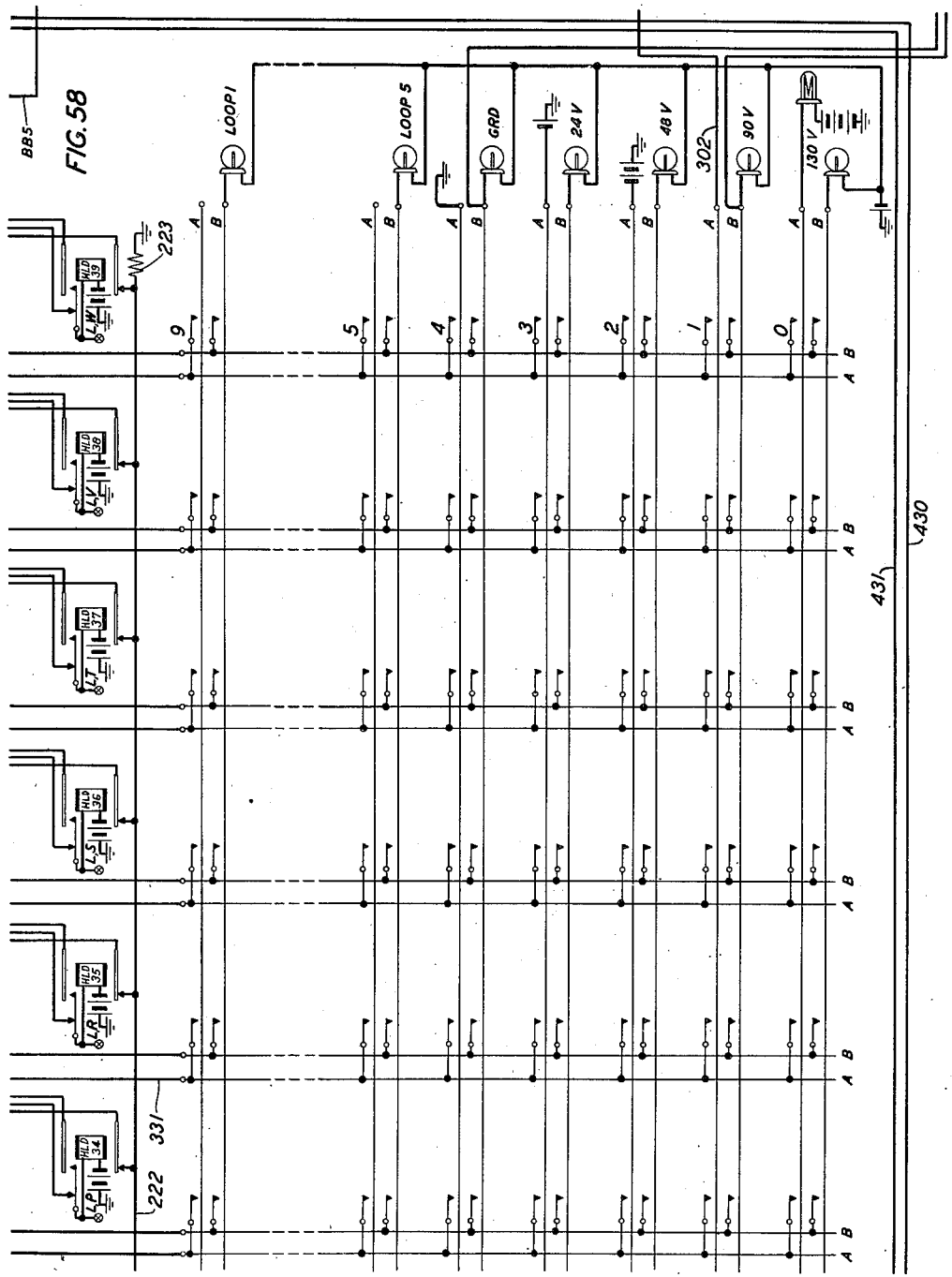
Figure 59:
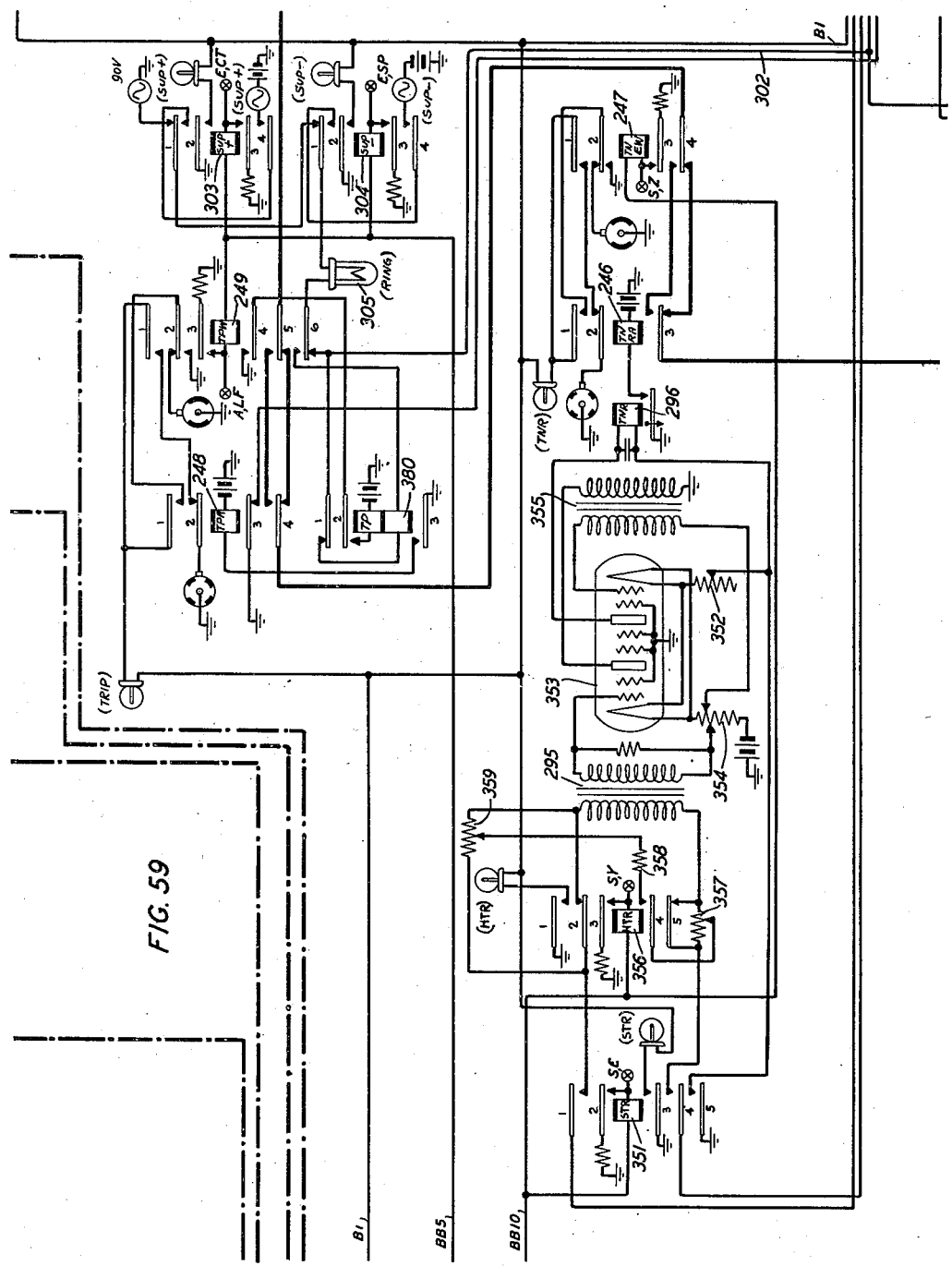
Figure 60:
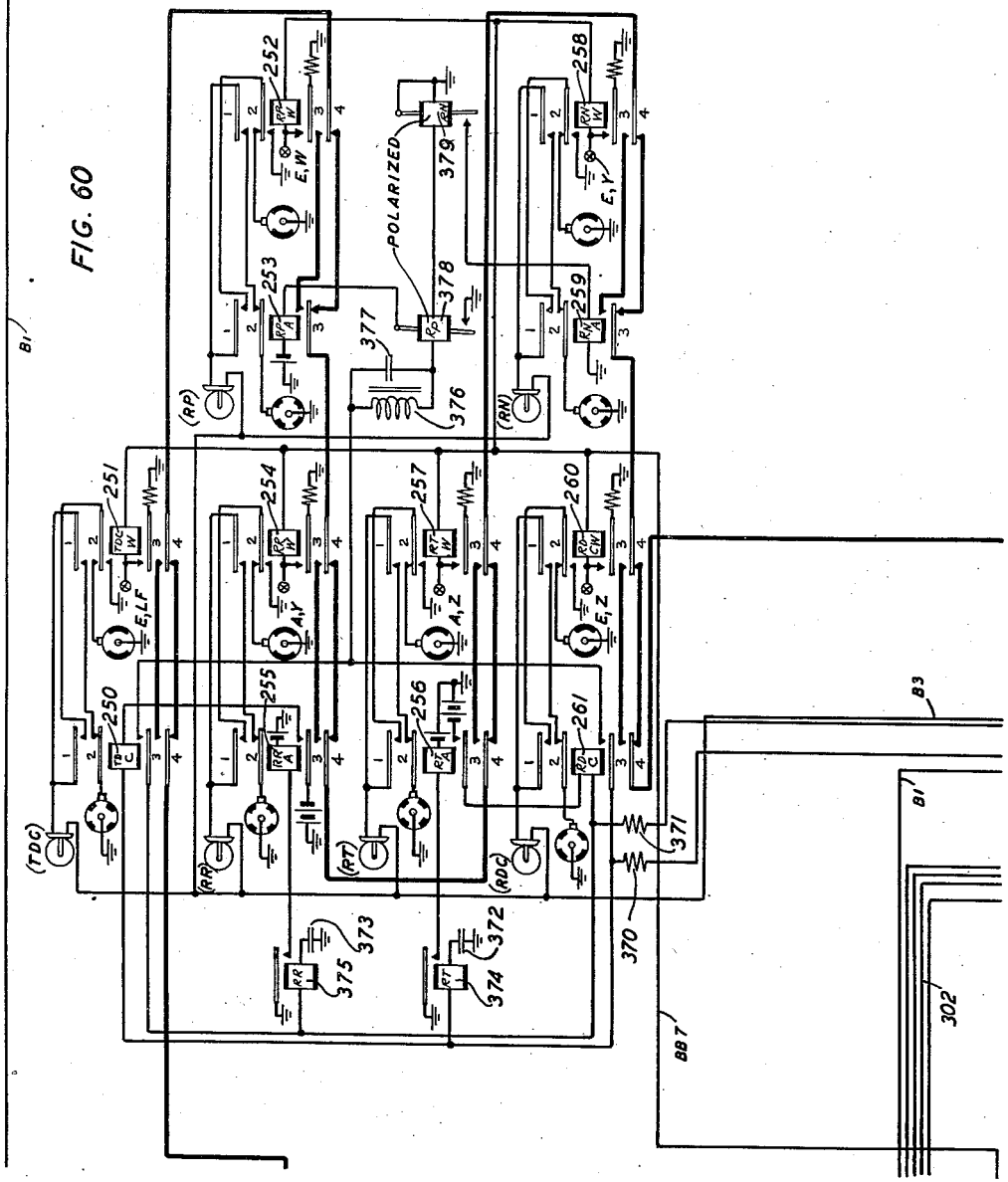
Figure 62:
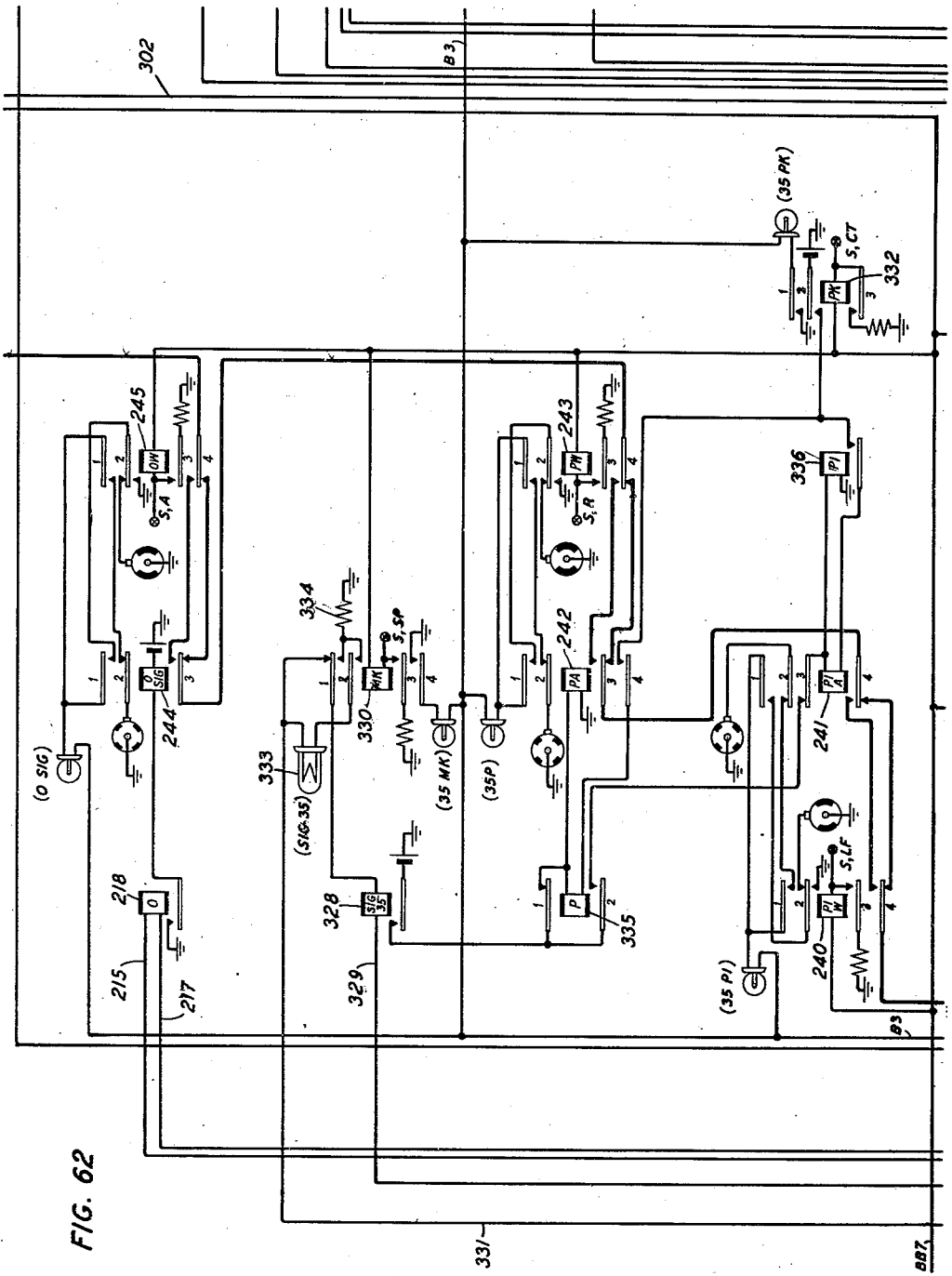

If now, by way of example, the code I,T is sent, then the contact set 216 in the terminating switch shown in Fig. 55 will be operated and ground will be connected to conductor 217. Conductors 215 and 217 may be traced to Fig. 62 where it will be found that a relay 218 will form a series connection therebetween. Hence, through the sending codes R,A, A,A and I,T, a connection will be extended from conductor 180 over conductor 215 through the winding of relay 218 to conductor 217 and thence to ground. Any other desired connection may similarly be established through the sending of proper codes.

Link selection

The automatic selection of idle primary and secondary links is accomplished by means of the group relays for the secondary switches shown in Figs. 29 and 35 and the group relays for the tertiary switches shown in Figs. 41 and 46.

The operation of any termination number relay will operate its secondary select magnet. Any secondary select magnet will operate its associated group relay for the secondary switch. The bottom group relay 207 checks for idle primary links in the first primary group and the other relays of this group perform similar functions for the other primary groups. Thus, if a connection is to be made to any termination number the group relays check for idle primary links to the primary groups in which the termination number is located. If a primary link is busy a primary hold magnet for that link will be operated and ground will be removed from the associated contact from the group relay.

The group relay extends the ground from the primary hold magnets to the secondary hold magnets to check for idle paths in the secondary links. If a secondary link is busy the off-normal springs of the hold magnet will be operated and the ground will be removed from the lead to the group relays for the tertiary switches. Thus, it is shown that ground on any of the leads to the group relays for the tertiary switches indicates that there is an available path composed of primary and secondary links to complete a connection.

The wiring between the group relays for the tertiary switches and the secondary hold magnets is arranged in the same order as the wiring of the secondary links between the secondary and the tertiary switches, that is, two leads from each secondary group are connected to every group relay. The leads from the first secondary group appear on the top terminals 1 and 2 of the group relays. The leads from the fifth secondary group appear on the bottom terminals 9 and 10 of the group relays.

One group relay is provided for each tertiary group. Thus, relay 206 is provided for the tertiary group having the leads to features 0 to 9, inclusive.

The operation of a feature connector relay such as 204 will cause the operation of a group relay such as 206 as hereinbefore described. The operation of the feature connector relay also prepares a path for operating its associated tertiary and terminating hold magnets from two leads which are prominent to all 40 feature connector relays.

The group relays connect the windings of the 10 sequence selection relays such as relay 210 to the leads from the secondary switch hold magnets. Each SS relay corresponds to one of the 10 possible paths over which the connection may be made to that tertiary group. The operation of a particular SS relay indicates that the corresponding path is idle. While more than one SS relay can operate, only one will be effective in closing ground to a tertiary select magnet. With ground connected to the right-hand armature of an SS relay the order in which the SS relays will be effective is 0, 9, 7, 5, 3, 1, 8, 6, 4 and 2. Since there are two links from each secondary group to each tertiary group this arrangement will tend to maintain one of these two paths in an idle condition except during periods of maximum load when all paths tend to become busy.

A tertiary select magnet operated closes ground to a lead which is common to all the feature connector relays. This ground will operate the normal hold magnet when its associated feature connector relay is operated. The hold magnet in operating locks to ground under control of the feature connector relay and opens its own operating path.

Terminating switches

The terminating switches consist of an array of crossbar switches which are used to connect the terminations to the back end of all test features. Conductor 217, by way of example, is the back end of test feature 0. The horizontal multiple of all these switches is connected together so that there is only one section of multiple which runs through 40 verticals. Each set of permanently paired contacts of these termination switches consists of two contacts taking care of A and B leads. The A lead is that through which the power termination is connected and the B lead is for supervisory purposes. The A leads of the 0 to 4 horizontals are connected to +130 volts direct current, 90 volts alternating current, 48 volts direct current, 24 volts direct current and ground in the order shown. Horizontals 5 to 9 are unwired except for the multiple and are used to loop back ends of test features together. The 40 verticals of the terminating switch are numbered 0 to 39 and the A leads of each vertical are wired to the back end of the test features having the same number. By this arrangement of the 40 verticals closing the 10 horizontals and having a different termination on each horizontal, it is possible to connect any combination of terminations to test features that are desired.

Establishing a power termination connection

The establishing of a power termination connection is illustrated in the following which shows the connecting of ground to the back end of test feature 0. To connect ground to test feature 0 it is necessary that code I,T be placed on the tape immediately after the A,A code, as hereinbefore described. Code I,T will operate relay 219. Relay 219 operated locks to resistance ground through its front contact and left-hand armature, conductor 220, armature 9 and front contact of relay 204, armature 2 and back contact of hold magnet 221, conductor 222, resistance 223 to ground. Relay 219 operates the associated terminating select magnet 224 which prepares the associated horizontal row of contact sets for operation. Magnet 224 through its right-hand armature and front contact closes a circuit from ground, conductor 225, armature 8 and front contact of relay 204, the normal contacts of armature 1 of hold magnet 221 through the winding of magnet 221 to battery. The hold magnet 221 operates and locks through its armature 1, the front contact and armature 7 of relay 204, resistance 226 to ground. The operation of the hold magnet 221 operates the set of contacts 216 thus connecting the conductor 217 to the ground connection provided on this horizontal. Magnet 221 in operating opens the circuit to conductor 222 and resistance 223 to ground and thus releases relay 219. Relay 219 in releasing releases the associated terminating select magnet 224 so that the connection between conductor 217 and the ground by way of the contacts 216 is held under control of the hold magnet 221. This magnet as hereinbefore described may be released by sending a specific releasing code H,A.

Test features—general

The test features are those circuits of the test set that are connected to the equipment under test to either apply a condition or to check for a response. There are 40 main test features numbered 0 to 39, some of which are classed as individual features and others as combined features are further classified as key relay features, signal relay features or combinations of both.

The test feature leads designated A are connected between the correspondingly numbered A leads of the tertiary and the terminating crossbar switch verticals. The windings of the test feature relays are connected in these test feature A leads and the test feature key relays either directly or indirectly control or impose conditions on these test feature leads.

The test feature leads are connected to the terminals of the circuit under test and the terminations are connected to the back ends of the test feature leads in the manner hereinbefore described.

Each signal relay has a companion relay called a signal watching relay and a condition indicating lamp circuit. Due to an insufficient number of contacts on the special purpose signal relays, it is necessary to have the signal relay operate directly an additional auxiliary relay which performs these functions. Fig. 7 hereinbefore described shows schematically a typical key relay, control signal relay feature and its associated lamp indicating and chain circuit wiring. The manner in which each watching relay and each key relay is operated by a ground impulse and released by a battery impulse connected to their windings has been described heretofore. Throughout the drawings relays of this nature will be found with their windings connected to an X within a circle which indicates a point appearing in the field of contacts of the multicontact relays of Figs. 15 and 16 and which may be reached by the sending of some particular two-letter code through the transmitter of Fig. 13.

Each pair of signal auxiliary relay and signal watching relay controls a point in the chain circuit. It will be noted that the chain circuit wiring is such that it is open when either of the relays of the pair are operated individually and closed only when both are operated or released.

Chain circuit

The chain circuit may be traced from battery through the contacts of each pair of signal and watching relays eventually to the winding of relay 176 in Fig. 19. As shown on the drawings, the chain circuit starts with battery in Fig. 68 at the armature of relay 228 and may then be traced in series through the armatures and contacts of relays 228 to 281, inclusive, thence ending in conductor 179 which may be picked up on Fig. 19 leading through the satisfaction relay 176 to ground. The entire number of pairs of relays employed in controlling this chain circuit is not shown but only certain representative ones in order to explain certain typical test features. These features will be explained in a different order than the order in which they are numbered so that the explanation may be more logical. The test feature 0, for instance, which is the first in order, consists merely of a sensitive relay which is connected in the A lead and which is usually used as an aid in some testing operation performed by another test feature.

Features 1, 2, 3 and 4

An elaborate feature requiring four termination connections to a device under test may be set up through the circuits here designated features 1, 2, 3 and 4. The A leads of features 1 and 2, conductors 282 and 283, respectively, may be found on Fig. 63 normally connected to the windings of repeating coil 287. The A lead 282, by way of example, may be traced to Fig. 20 where it is connected to armature 5 of manual operation feature relay 172 and connected through the back contact thereof to conductor 284 leading to Fig. 63 where it is connected to armature 2 of relay 286 which responds to the code E,R. The back contacts of this relay lead to the right-hand windings of repeating coil 287. By the operation of relay 286 the connection of conductor 284 to the winding of repeating coil 287 may be transferred to ground and the companion conductor 285 may be transferred to a source of ringing current so that ringing current may be transmitted over the A leads 282 and 283.

Figure 63:
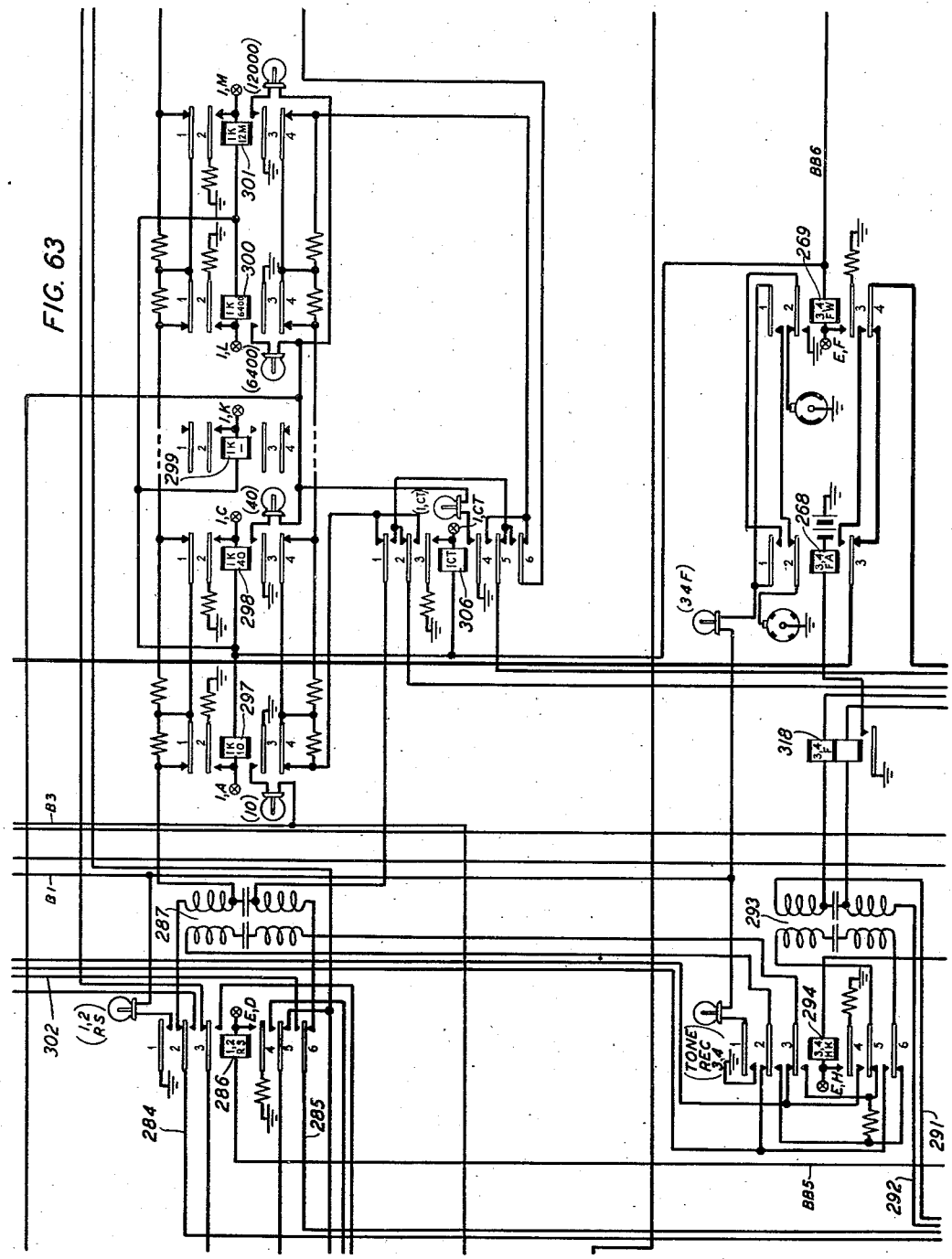
Figure 64:
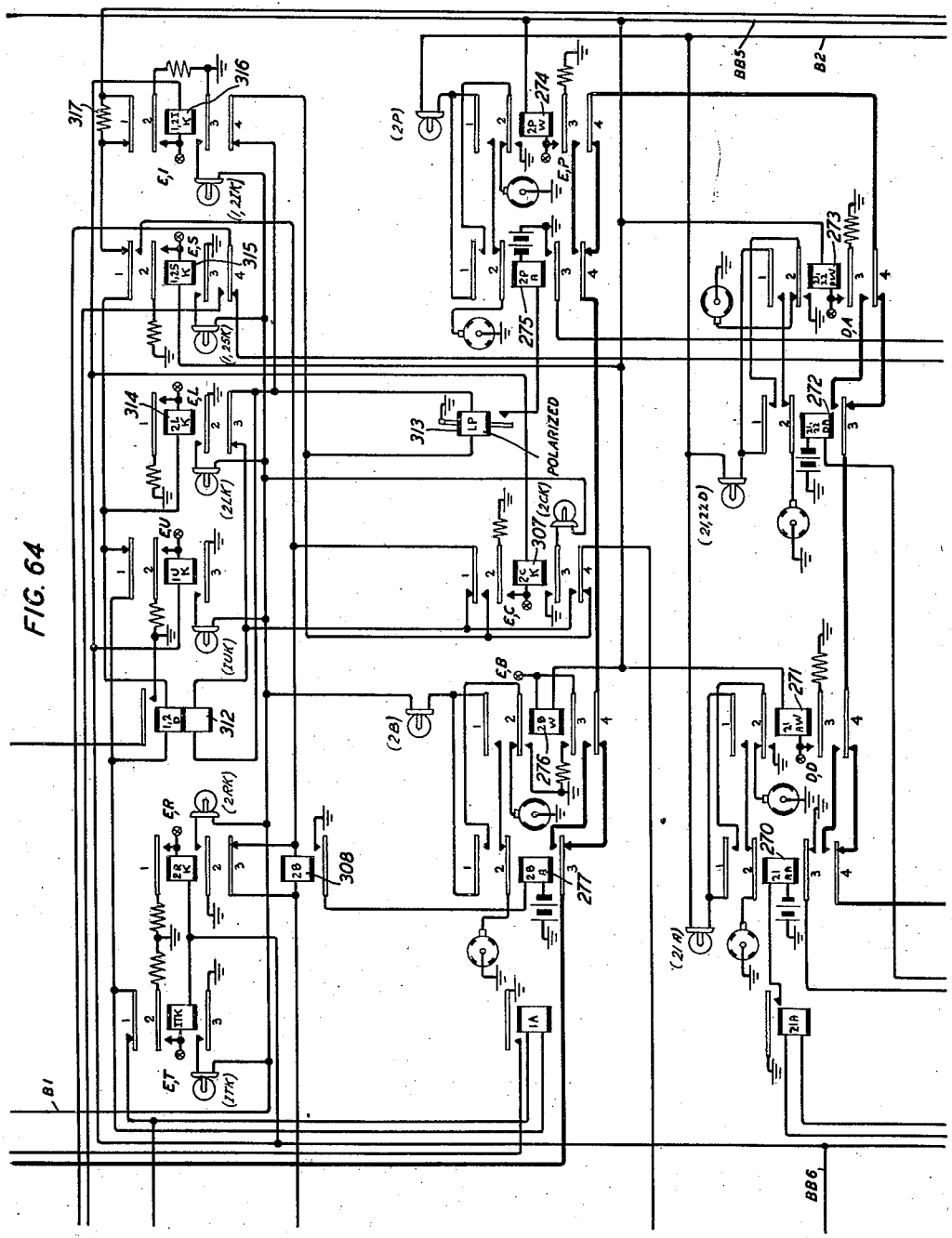
Figure 65:
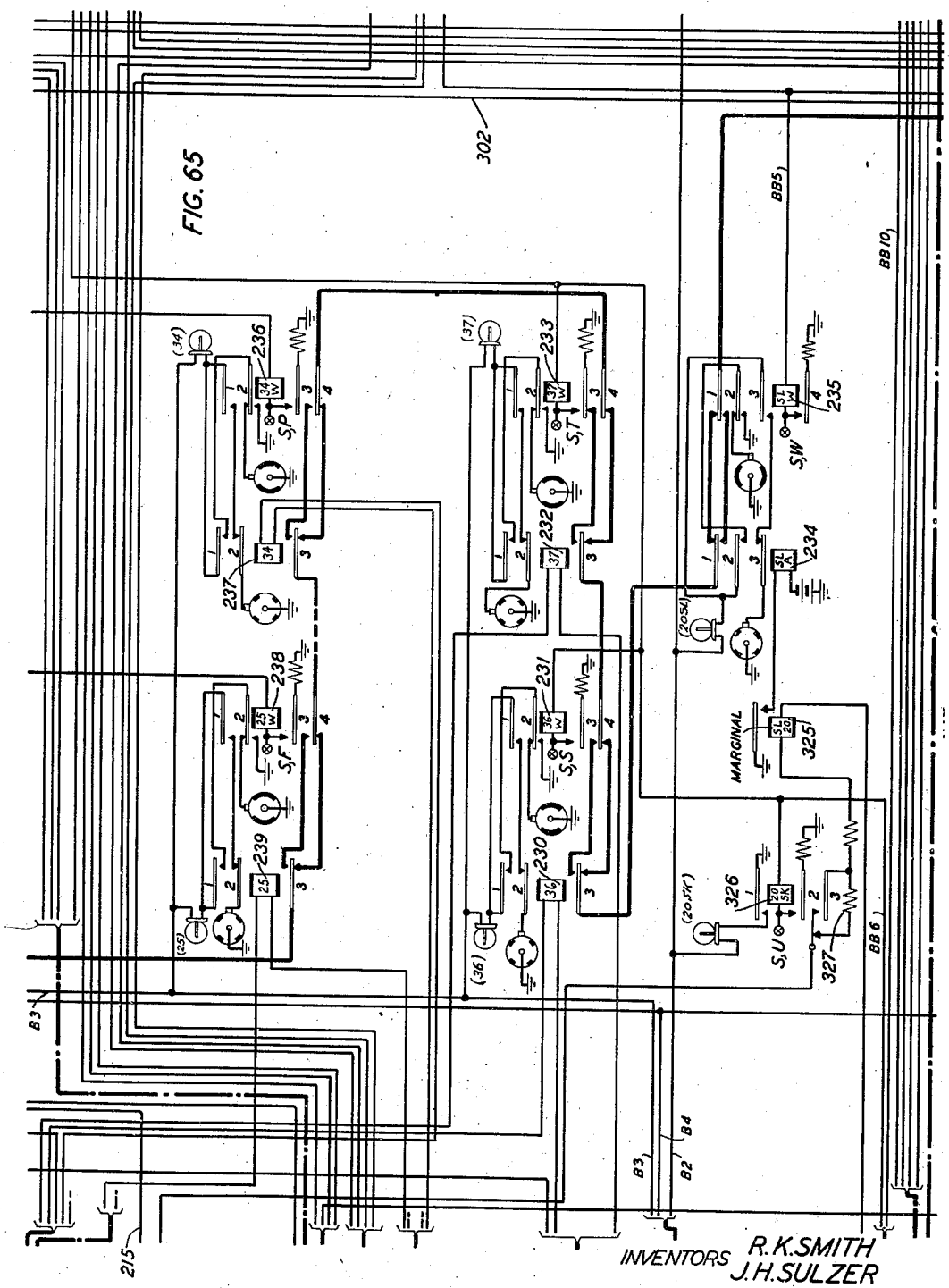
Figure 66:

In a similar manner the A leads for features 3 and 4 may extend to a tone receiving circuit so that the ringing current sent out over conductors 282 and 283 may be transmitted through some apparatus in the device under test and returned over the A leads of features 3 and 4 where they will be received and the proper reception tested by the apparatus of Figs. 63 and 64. Conductors 288 and 289 and the A leads of features 3 and 4, respectively, may be traced to Fig. 20 where they will be found to terminate in armatures 2 of relay 172 and 1 of relay 290, respectively. In the normal position of relays 172 and 290 these conductors will then extend to conductors 291 and 292, respectively, which may then be traced to Fig. 63 where they will be found connected to the right-hand winding of repeating coil 293. Through the operation of a relay 294 which will respond to the code E,H any tone coming in to the winding of repeating coil 293 may be transferred or extended to the winding of a transformer 295, Fig. 59, where it will eventually cause the operation of relay 296 to operate a signal relay 246.

There are 12 key relays here represented by the 5 relays 297 to 301, inclusive, in Fig. 63 which cut in resistances equally in the A leads of both features 1 and 2. These relays may be operated by the codes indicated in the drawings.

Relay 306 responding to code I,CT is a key relay employed to remove the part of the resistance circuit that is normally in feature 2 and transfer it to feature 22 at the same time that it closes through directly the A lead of feature 2. The A lead of feature 2 may be identified in Fig. 63 as conductor 285 and this may be traced through the lower right-hand winding of repeating coil 287 to armature 1 of relay 306 so that upon the operation of this relay this circuit is transferred from connection to the resistances at the armature 4 of relay 297 to a circuit now extending through the front contact of armature 1 of relay 306, the front contact and armature 1 of relay 306 to signal relay 308. At the same time the resistance circuit controlled by relay 297 is transferred through the front contact and armature 2 of relay 306 to a corresponding point on the repeating coil 309 of feature 22. It should be noted that the leads normally connected to relay 308 and relay 310 are interchanged by the operation of relay 306. Relay 308 normally acts as a signal relay in the resistance circuit of Fig. 2 and relay 310 normally acts as a signal relay in feature 22.

The repeating coils and associated condensers in features 1, 2, 3, 4, 21, 22, 23 and 24 are used to provide a means of connecting the alternating current tone sending and receiving circuits to the A leads without interference from direct current circuits on these A leads at the same time. Relay 307 responding to the code E,C is a key relay, spoken of as "feature 2 change key" and affords a means of transferring the lower winding of relay 312 and the winding of the polarized relay 313 from connection with the tertiary switch verticals to the terminating switch verticals. It may be noted that armature 1 of relay 307 is connected eventually through the winding of relay 308 to the A lead 283 of feature 2 and that armature 4 of relay 307 is connected eventually to the corresponding A lead of feature 2 going into the power termination switch. Therefore, upon the operation of relay 307 the normal connection which may be traced from armature 1 of relay 307 through its back contact through the lower winding of relay 312, assuming relay 314 to be operated, thence through the winding of relay 313 to the back contact and armature 4 of relay 307 will be reversed and may now be traced from armature 1 of relay 307 through its front contact, the winding of relay 313 thence through the lower winding of relay 312 to the front contact and armature 4 of relay 307.

Relay 314 short-circuits the lower winding of relay 312 so that with relay 314 in normal position relay 313 is reversed by the action of relay 307. When relay 314 is operated, however, the lower winding of relay 312 in series with the winding of relay 313 is also reversed. Relay 315 responding to the code E,S (known as "features 1, 2 simplex E") is employed to connect the A lead of feature 1 to the A lead of feature 2 at a particular point between two of the feature relays. Armature 1 of relay 315 may be eventually traced to the A lead of feature 1 while the front contact of this armature connected to the winding of relay 308 may be eventually traced to the A lead of feature 2. Relay 315 upon its operation, therefore, joins these two A leads together. At the same time relay 315 disconnects the normal A lead and the B indicating lead terminations of feature 1 and supplies feature 1 indicating B lead with the termination on feature 2 at that time. Note that in its normal position relay 315 through its armature 1 of back contact connects the A lead of feature 1 to a conductor which may be ultimately traced to the A lead of the power termination switch of feature 1. Also armature 4 of relay 315 is connected to a conductor which may be ultimately traced to the B lead of the terminating switch of feature 1 which as hereinbefore explained leads to a signal to indicate the particular power termination supplied to this feature. The front contact of armature 4 of relay 315 leads likewise to the B lead of the terminating switch of feature 2 so that upon the operation of relay 315 the power termination of feature 1 is disconnected from the A lead of feature 1 coming from the tertiary switch and in place thereof this A lead is connected to the A lead of feature 2. Through armature 4 of relay 315 the power termination indicating circuit of feature 2 is substituted for the power indication circuit of feature 1.

Relay 316 responding to the code E,I cuts in a resistance 317 in the A lead of feature 1 and the winding of polarized relay 313 into the A lead of feature 2.

Signal relay 318 connected to the right-hand windings of repeating coil 293 has two equal parallel windings, one of which is connected in the A lead of feature 3 and the other of which is connected in the A lead of feature 4. Key relay 319 responding to code D,O connects the ringing and receiving relay features to the A leads of features 21 and 22 and at the same time cuts off the normal A lead features and B lead termination indications. K relay 320 responding to code D,H disconnects the two wires of the tone sending circuits from its normal position on the windings of the repeating coil of features 21 and 22 and transfers it to features 23 and 24. At the same time, the resistance 321 is removed from its normal position on the repeating coil 322 of features 23 and 24 and it is transferred to the repeating coil 309 of features 21 and 22. Key relay 323, responding to the code D,S connects the A lead of feature 21 to the A lead of feature 22 at a point ahead of the feature relays on these A leads. At the same time, it disconnects the normal A lead and B indicating leads and terminations of feature 21 and supplies the indication B lead of feature 21 with the termination on feature 22 at that time.

Signal relay 324 has two equal parallel windings, one of which is connected in the A lead of feature 23 and the other of which is connected in the A lead of feature 24.

Signal relay 325 consists of a marginal relay and a resistance connected in the A lead of feature 20. Key relay 326 cuts out a certain proportion of the series fixed resistance 327.

Feature 35

This feature consists of a relay 328 in the A lead of feature 35. The A lead 329 may be traced to the winding of relay 328 and thence followed through the armature 1 and back contact of relay 330 to conductor 331 which will be found to be the A lead of feature 35 in the power termination switch. With the key relay responding to the code S,SP and relay 332 responding to the code S,CT normally the feature relay in operating causes the operation of the auxiliary relay 242. An associated watching relay 243 responding to the code S,R performs the functions of watching relay. When relay 330 is operated the normal test set termination on the A lead is removed and applied through a resistance lamp 333 and in addition a resistance 334 to ground is connected to the A lead between the winding of the feature relay and the resistance lamp 333.

With the key relay 332 operated a circuit is set up to permit using the feature as a two-pulse receiving circuit. The first operation of the signal relay operates the auxiliary relay 242 as described above. Under this condition there is a battery potential imposed on both ends of the winding of the pulse relay 335 keeping it unoperated. On the first release of the feature relay the battery is removed from the winding of relay 335 allowing it to operate to ground through the winding of relay 242 and to battery through the front contact and armature 2 of relay 332 and the front contact and armature 3 of relay 342. Relay 242 remains operated under this condition and both relays 335 and 242 are locked operated to battery supplied by relay 332.

The next operation of the feature relay causes the pulse relay 336 to operate through the operated contacts of relay 335. Relay 241 does not operate at this time as both ends of its winding are at battery potential. The operation of relay 335 prepares a path to the winding of relay 336 and disconnects the windings of relays 335 and 242 from the battery lead from the feature relay. The next release of the feature relay removes the battery from one side of the winding of relay 241 and permits it to operate to ground through the winding of relay 336. An associated relay 240 performs the functions of the watching relay for the second pulse circuit. Relay 241 in operating disconnects the battery from the feature relay and locks in series with the winding of relay 336 to battery at the front contact and armature 2 of relay 332. Further operation of the feature relay will have no effect on the circuit. The release of relay 332 restores the pulse counting relays to normal if the signal relay is released.

Features 25 to 34, inclusive

Each of these test features consists of a simple signal relay in series with the A leads of the feature. Thus, for instance, the A lead of feature 25 extends to the relay 239 and thence to the A lead of the terminating switch for this feature. By the same token the A lead of feature 34 extends to the winding of relay 237 and thence to the corresponding A lead of the power termination switch. The remaining features between 25 and 34 are only indicated herein.

An associated relay for each of these feature relays is provided to perform the functions of a watching relay. Thus, relay 238 is the watching relay companion to the signal relay 239 and relay 236 is the watching relay companion to the signal relay 237.

Features 36 and 37

These two features are similar in wiring to the above-noted features 25 to 34, inclusive. They differ, however, by having the signal relay of a high resistance, the purpose of which will be clearly understood by those skilled in the art. Thus, feature 36 consists of a high resistance signal relay 230 and its companion watching relay 231 and feature 37 consists of a high resistance signal relay 232 and its companion watching relay 233.

Test feature 0

This feature consists of a sensitive relay 218 in the A lead of the feature. The relay 218 constitutes a signal relay but in this case an auxiliary signal relay 244 is used with its companion watching relay 245.

Test features 5 to 19 and 38 to 39, inclusive

In these features the A lead from the tertiary switch leads is connected directly with the A lead of the terminating switch and these leads are used to simulate keys and to supply directly any of the 10 terminating conditions.

Dial circuit

In checking for false pulses the operation of the dial start key relay 337 responding to code D,CT (1) closes through the lead from ground, back contact and armature 3 of relay 270 (Fig. 64), conductor 338, back contact and armature 1 of relay 339, armature 4 and front contact of relay 337 to the winding of magnet 340 of the receiving selector represented by the four brushes and their back terminals shown in the line to the right of magnet 340, (2) removes the normal ground from the first backs of both selectors and (3) connects ground to the strapped portion of the second back of the receiving selector. Under this condition the circuit is capable of originating dial pulses in the A lead of feature 2 without registering any pulses sent on the selector shown at the top of Fig. 68 controlled by magnet 341 because the lead from magnet 341 does not get a ground at the unoperated watching relay 229. The pulses are created by the operation and release of relay 342 from a short ground pulse on the code point D,M. The stepping magnet 340 is controlled from the armature 3 and back contact of relay 270 so that upon each release of relay 270 this selector will advance one step. Relay 228 will operate through armature 5 and back contact of relay 229, wiper 343, in any advanced position thereof other than normal to ground over the front contact and armature 1 of relay 337. Relay 228 operated opens the chain circuit and closes through a slow interrupted ground from the back contact and armature 3 of relay 229, the front contact and armature 2 of relay 228, wiper 344, causing the slow flash of a particular one of the signal lamps such as 345 connected to the back contact with which wiper 344 is at the time associated indicating the number of false pulses received.

For regular dialing, the function of relay 337 is the same as described except that the watching relay 229 should be operated immediately after the relay 337 is operated. The winding of relay 228 under this condition is connected through armature 4 and front contact of relay 229 to wiper 346 instead of to wiper 343. With relay 228 operated battery through the selector magnet 341 is connected through the armature 1 and front contact of relay 342 to ground at the front contact and armature 2 of relay 229.

This latter path causes magnet 341 to step each time relay 342 operates and releases and in so doing registers one pulse sent by lighting a dial lamp through any of the advanced positions controlled by wiper 347. As long as the number of pulses sent and received as registered on the two selectors are the same, a ground from wiper 348 through multiple connections to wiper 346 and thence through the front contact and armature 4 of relay 229 will cause the operation of relay 228 closing through the chain circuit as a satisfactory condition. A steady lighted dial lamp like 345 corresponding to the number of digits dialed is obtained under this condition by a ground from wiper 347. In the event the two selectors are not on the same advanced position as a result of incorrect number of pulses being received, relay 228 will not operate through wipers 348 and 346 and a fast flashing ground through the back contact and armature 1 of relay 228, armature 1 and front contact of relay 229 and wiper 344 will be extended to the lamp wired to that particular position. Under this condition the chain circuit will be broken by the released relay 228 and a steady dial lamp controlled by relay 347 will indicate the number of pulses sent and the flashing lamp signal will indicate the number of pulses received.

The dial circuit is returned to normal position by the release of relay 337 which connects ground to the arcs controlled by wipers 349 and 350 thereby placing the magnets 341 and 340 in self-interrupting circuits resulting in the stepping of the selectors until the brushes reach a normal position where such self-interrupting circuits are opened.

Contact protection is supplied by the means of a condenser resistance circuit for each of the self-interrupting contacts of magnets 340 and 341 and the pulsing contacts of relay 342.

Relay 339 transfers the selector magnet 340 from its normal position where it is controlled by relay 270 to its alternate position where it is controlled by relay 275.

*Tone receiving*

Key relay 351 responding to the code S,E extends ground through its armature 5 and front contact to filament circuit resistance 352. Resistances 352 and 354 are adjusted so that under this condition there is sufficient potential drop across the filament terminals of tube 353 to place this tube in operation. Relay 351 in operating also cuts through the two tone leads connected to armatures 1 and 4 of relay 351 and normally connected through the back contacts of armatures 2 and 3 to the repeating coil 287 and alternately through the front contacts of armatures 6 and 5 to the repeating coil 293. Relay 351 connects these tone leads to the primary of input transformer 295. Tone is induced in the secondary of transformer 295 and amplified by the first section of the vacuum tube 353. The plate of the first section of this tube is connected to the primary of transformer 355 and the secondary of transformer 355 is connected to the grid of the second section of tube 353 which is biased for rectification. The plate of this section is connected to the winding of relay 296. Relay 296 is slow-releasing so as to make it more positive on the rectified currents. These grid return windings of the secondaries of transformers 295 and 355 are connected to taps on the filament adjusting resistances 352 and 354 and afford a means of obtaining and adjusting the grid bias on the two sections of the tube. Relay 356 responding to the code S,Y controls a pad at the input of this circuit consisting of the resistances 357, 358 and 359 to reduce the operating sensitivity of the receiving circuit by a given amount.

*Tone sending*

Key relay 360 (1) cuts through the two tone leads normally connected to the back contacts of armatures 2 and 3 of relay 320 through the normal contacts of relay 361 to the output winding terminals of the tone generator and (2) operates the power relay 362. Relay 362 applies a commercial source of 60-cycle alternating current to the input terminals of the tone generator. This generator comprises generally an input transformer 363, an output transformer 364 and a bridge connection of a network of varistors. The complete operation of this generator may be understood by reference to Patent No. 2,277,809, granted to Wrathall, March 31, 1942. This generator produces harmonics from the 60-cycle supply source and selects principally the tenth harmonic (600 cycles) for its output. Sufficient direct current is produced by the network of varistors to maintain relay 365 operated as long as there is an output voltage from the generator. In the event the power source fails or the generator fails internally, relay 365 will release and connect the signal lamp 366 to ground on the front contact of armature 4 of relay 360 lighting this lamp to indicate tone failure.

Ringing receiving circuit

This circuit is intended to be used to check for the proper reception of ringing voltages. It is capable of checking for ground with (1) 90 volts, 20 cycles alternating current, (2) 90 volts, 20 cycles alternating current with negative superimposed direct current and (3) 90 volts, 20 cycles alternating current with positive superimposed direct current. This circuit is symmetrically designed so that it will respond to any of the alternating current voltages whether applied to the tip lead or the ring lead. Simultaneously with checking for alternating current potential it will check for a ground on the opposite lead from which the alternating current is being received. The following description will be given on the assumption that the 90 volts, 20 cycles alternating current is being received on the tip lead and ground on the ring lead. The operation is the same if these potentials were applied oppositely except that a separate set of relays in an identical circuit would respond. Resistances 370 and 371 (Fig. 60) are used to reduce the voltage applied to the circuit, thus making it somewhat less sensitive. The condensers 372 and 373 in series with the windings of relays 374 and 375, respectively, form a 20-cycle series resonant circuit and also block the circuit so as to prevent the alternating current relays from operating on any direct current potentials. Relay 374 operates on the 20-cycle alternating current voltage impressed on the tip and this relay in turn operates the signal auxiliary relay 256. Relay 256 performs its normal functions associated with the watching relay 257 and in addition supplies battery to the winding of relay 261. If, as in normal ringing, there is a ground present on the ring lead, relay 261 will operate. Relay 261 in addition to performing its regular functions with its associated watching relay 260 cuts through a direct current path from the tip lead through its armature 3 and front contact to a blocking filter consisting of inductance coil 376 and condenser 377 to ground through the windings of polarized relays 378 and 379. The windings of these polarized relays are wired in such a manner that the relay 379 responds to negative direct current potential and relay 378 responds to positive direct current potentials.

In the event that superimposed ringing was being received instead of the 90 volts, 20-cycle ringing, the direct current component either plus or minus would operate with the relay 378 or 379. Relays 378 and 379 act as signal relays and operate their associated auxiliary signal relays 253 and 259, respectively.

Ringing sending circuit 90 volts, 20 cycle ringing is supplied through the normal contacts of relays 303 and 304.

The A lead of the No. 1 horizontal in the power termination switches connects to conductor 302 which is in turn connected to a source of ringing current. In order to make proper tests on various pieces of apparatus, it is sometimes necessary to use straight ringing current, sometimes ringing current superimposed on a positive direct current potential and sometimes ringing current superimposed on a negative direct current potential. Consequently, conductor 302 may be traced to Fig. 59 and thence through the back contact and armature 6 of relay 249, the current limiting resistance lamp 305 to armature 1 of relay 304. Under normal conditions the circuit may then be traced over the back contact of this armature through armature 1 of relay 303 and its back contact to a source of 90 volts alternating current which serves as a source of straight ringing current. If positive superimposed ringing is to be used, then a source of such current is connected by the operation of relay 303 responding to the code E,CT through the front contact and armature 4 of relay 303, armature 1 and front contact of this relay, through the back contact and armature 1 of relay 304 to the current limiting resistance lamp 305. In case it is desired to have minus superimposed ringing, then an appropriate source connected to armature 4 of relay 304 is extended by the operation of relay 304 responding to the code E,SP through the front contact of armature 4 of relay 304 and front contact and armature 1 of relay 304 to the current limiting resistance lamp 305. Thus, when the power termination is to be straight ringing current the code I,Y is sent. If it is to be positive superimposed ringing, then the code E,CT is followed by the code I,Y and if it is to be minus superimposed ringing current the code E,SP is followed by the code I,Y. The operation of watching relay 249 responding to the code A,LF, (1) inserts the lower winding of tripping relay 380 in series between the source of ringing supply and conductor 302 and (2) supplies a ground to armature 2 of tripping relay 380 which will be used to lock the tripping relay operated. When a low resistance ground is connected to the ringing test leads the tripping relay will be operated by the additional current through its lower winding battery through its primary winding, locks relay 380 to ground on armature 4 and front contact of relay 249. The tripping relay 380 in operating (1) cuts off the ringing supply to the conductors 302 and (2) operates the signal auxiliary relay 248 which removes the ground supply connected to its armature 3 so that this action simulates a tripping ringing condition. The tripping circuit is returned to normal by the release of the watching relay 249.

Relay indicating circuits

The upper part of Fig. 18 shows the circuits which indicate in accordance with a numbering plan the "should be" position operated or normal of the relays in the circuit being tested. This indicates as has been termed hereinbefore the "location indicator."

The numbering plan assigns numbers to each relay in the circuit under test. The numbers are assigned from top to bottom on vertically wired units and from left to right on horizontally wired units. When relay indicating lamp 1 is lighted it indicates that relay 1 of the circuit under test should be operated and when the lamp is extinguished the relay should be normal.

The relay indicating lamps are lighted by the operation of relays 381, 382 and 383, representative of 35 such relays. Relay 381 responds to the code CT,A, relay 382 responds to the code CT,B and relay 383 responds to the code SP,CT. These relays in operating lock to their associated resistance ground circuits on their lower armatures and remain operated until released by a battery impulse in the manner hereinbefore described. Each relay operates a corresponding location signal such, for instance, as the signal 384 operated by relay 381, etc.

Test code F,J—satisfaction

When the first letter of a code is the letter F the tape decoding circuit will cause the operation of multicontact relay 385 (Fig. 16). This will result in the extension of ground from conductor 386 through the 0 armature of multicontact relay 385, conductor 387 through the armature and back contact of relay 388 to the winding of advance relay 174. The operation of relay 120 (Fig. 13) in the interval between the first and second letters of a code will extend the connection from the other terminal of advance relay 174 over conductor 389 to armature 1 and front contact of relay 120, conductor 390, back contact and armature 0 of relay 157, back contact and armature 4 of relay 168, conductor 391, thence in a chain circuit in series through the back contacts and upper armatures of the 10 optional feature relays such as 392 and 394, conductor 171, armature 4 and front contact of relay 155 to battery. Advance relay 174 responds thus to the operation of relay 120 and moves its armature from its left to its right-hand contact. The function of the advance relay 174 is to transfer the control of transmitter from its normal advancing path to the test relay so that when the test relay 175 operates and a trouble condition is present, the tape will be stopped on the letter J of the F,J code and ground will be maintained on conductor 387.

When the test relay operates and a satisfactory condition is indicated by the operation of the satisfaction relay 176, a circuit will be closed from battery, armature 3 and back contact of display relay 154, front contact and armature 1 of relay 175, armature and front contact of satisfaction relay 176, armature 2 and front contact of relay 175, right-hand contact and armature of relay 174, back contact and armature 2 of relay 154, conductor 145 through a chain circuit controlled by the group relays and sequence selection relays for the tertiary switches shown in Figs. 41 and 46, back over conductor 146 through the stop magnet 118 to ground on conductor 106. The operation of stop magnet 118 causes the transmitter to move the tape off the letter J of the F,J code releasing the test relay 175 and the advance relay 174 by removing ground from the F,J and F code points, respectively. The advance relay 174 in releasing restores the control of the transmitter to its normal advancing path.

Test code F,J—trouble condition

Up to the point where the test relay 175 operates, the action of the control circuit at the testing position is the same as for a satisfactory condition above described. When the test relay 175 operates under a trouble condition which is signified by the satisfaction relay 176 remaining normal, then battery connected to armature 3 of the display relay 154 is extended over the armature and back contact of satisfaction relay 176 to the winding of relay 395.

Relay 395 operated closes ground from armature 2 and back contact of relay 396 (Fig. 20), armature 1 and back contact of relay 397, armature 1 and back contact of relay 398, armature 1 and back contact of relay 399, armature 3 and front contact of relay 395, back contact and armature 2 of relay 150 to the winding of display relay 154. Relay 154 thereupon operates and locks through its front contact and armature 6, contacts of step key 400, normal contacts of reset key 149 to ground. Relay 154 in operating also opens the circuit just described for relay 395 so that this relay now returns to normal. Relay 154 operated also performs the following functions: (a) sounds the single stroke gong 401, (b) further opens the advancing path of the transmitter, (c) operates relay 156, (d) operates relay 402 (Fig. 18) and (e) operates relay 166. Relay 156 in operating supplies battery to the various leads to the display signals such as the lamps controlled by the signal or auxiliary signal relays and their companion watching relays. As an example, a circuit may be traced from battery through armature 1 and front contact of relay 156 to signal lamp 384 so that if at this time relay 381 were operated the lamp 384 would light. The single stroke gong 401 constitutes a general failure signal and as explained hereinbefore the flashing lamp of some test feature which is now rendered operative by the operation of relay 156 constitutes a specific failure signal so as to point out the specific test feature which has discovered the trouble condition. At the same time, the location lamp such as 384 will operate to indicate the "should be" condition of the various relays in the circuit under test.

As long as the satisfaction relay 176 remains normal the operation of the step button 400 under the trouble condition will not cause the tape to advance as the battery through the back contact of relay 176 will reoperate relay 395 when the display relay 154 releases. However, if the indicated trouble has been cleared and the satisfaction relay is operated, the action of the control circuit upon the operation of the step button 400 is as follows: The locking circuit of relay 154 being opened, relay 154 releases. This closes the advancing path of the transmitter, releases relay 156 which extinguishes the indicating lamp, removes ground from the winding of relay 166 (which, however, remains locked through the normal contacts of the start key 170) and closes battery from its armature 3 and back contacts to the contacts of the test relay 175. Battery reconnected to the test relay contacts with the satisfaction relay 176 operated causes the transmitter to move the tape off the letter J of the F,J code releasing the test and advance relays and restoring the control of the transmitter to its normal advancing path.

Trouble indicating

Fig. 10 hereinbefore described shows a simplified schematic circuit of the crossbar switches and the key and lamp circuits which are used to indicate connections and terminations. Only the B and C leads of the switches and the B leads of the power termination switches are shown as only these leads are used in the indicating circuits. The functions of the A and D leads are described elsewhere.

Associated with each vertical of the tertiary and terminating switches is a feature key and lamp circuit. Each feature key and lamp circuit has the same number as the test feature which is connected to the A lead of these circuits numbered 0 to 39.

On the horizontals of the primary switches are connected the termination number key and lamp circuits. These circuits are connected so that the C leads of each tens group are connected to the same numbered tens key and lamp circuit.

The B leads of each unit group are connected together and wired to the same numbered unit key and lamp circuit. As can be seen in the schematic Fig. 10 and in the detailed drawings (Figs. 21 and 25), one side of the lamps both tens and units are connected. Connected to the B leads of each terminating switch horizontal are the lamps which indicate the terminations on the A leads of each horizontal.

In accordance with previous description, tracing the connection of the number 0 termination to the 0 test feature A lead 215, if the key 403 is operated, then the lamp 404 as well as the tens 0 lamp 405 and units 0 lamp 406 will be operated, thus indicating that the number 0 termination conductor 180 is connected to the A lead of feature 0 conductor 215. Also in accordance with previous description it may be noted that if keys 407 and 408 are operated, that lamp 404 will be lit showing that it is feature 0 which is connected to the 0 termination.

Thus, it can be seen that the depression of any feature key will indicate the termination number that is connected to it by the crossbar switches and will also indicate the termination connected to the back end of test feature. The depressing of the tens and units key corresponding to a termination number will indicate the test feature which is connected to the termination number by the crossbar switches.

Trouble time-out feature

The time required by the control circuit to time-out the advancing of the tape may be varied from an instantaneous time-out to as much as a ten-second time-out in steps of one second each when required. This is accomplished by means of relays 395 to 399, inclusive, and the selector indicated by the wiper 410. As described above, relay 395 will operate on a trouble condition. When relays 396 to 399, inclusive, are normal the action will be as described above. Each of these relays has an associated code point and when the time-out interval is to be varied the tape decoding circuit will send an impulse to the code point or code points required for the correct interval before the testing position of the tape is reached. This will cause the correct relay to operate and lock to resistance ground. With any of the relays 395 to 399 operated, the normal time-out ground is removed from armature 3 of relay 395 which prevents the display relay 156 from operating instantaneously and allows the relay 395 to perform all of its functions.

The relay 395 in operating under this condition connects ground to operate relay 402 which starts the interrupter of Fig. 18 into operation. This interrupter consists of two pairs of WZ combinations of relays, one combination consisting of the relays 411 and 412 and the other combination consisting of the relays 413 and 414. A polarized relay 415 and a neutralized relay 416 complete the circuit arrangement without going into a detailed description of this circuit which is well known. It may be sufficient to say that upon the operation of relay 402 the polarized relay operates and controls the operation of the remainder of these relays so that conductor 417 becomes a source of fast ground interruptions and conductor 418 becomes a source of slow interruptions, conductor 419 becomes a source of approximately 60 interruptions per minute.

Throughout the drawings particularly in Figs. 59 to 68 and in connection with each pair of chain circuit relays there is shown a fast interrupter and a slow interrupter. Actually, these come back to conductors 417 and 418 as a source of supply.

Sixty interruptions per minute are now connected through armature 2 and front contact of relay 395 to the magnet 420 which drives brush 410. The rotary magnet in energizing causes the off-normal springs 421 to close ground to the release magnet and advances the wiper brushes of the selector to terminal 1. If only relay 399 is operated, ground will be present on terminal 1 which is connected to the back contact of armature 1 of relay 399 and the display relay 154 will operate from this ground through armature 3 and front contact of relay 395. Relay 154 in operating opens the circuit of relay 395 so that this relay now releases. The ground to operate relay 402 is, therefore, opened and the operating circuit of the rotary magnet 420 is opened in turn. Relay 395 in releasing closes the circuit of the release magnet 421 so that the selector is returned to normal. The selector returning to normal removes ground from its release magnet by the action of the off-normal contacts 421. Other time intervals can be had by operating relays 396 to 399 either singly or in pairs to provide for the desired interval. For example, relays 399 and 398 simultaneously operated will provide for a three-second interval and relays 396 and 398 operated simultaneously will provide for a seven-second interval.

Manual operations

Manual operation relays 174, 172, 290, etc., shown on Fig. 20 are provided to permit stopping the advance of the tape so that a manual operation can be made of the equipment under test. By way of example, it may be stated that a very great number of modern relays are provided with twin contacts. It may be desired to determine whether both contacts of such a pair on a particular relay are operative. Therefore, when the test has advanced to the point where some signal relay is operated through a pair of such contacts, one of these manual operation features is employed to stop the advance of the tape so that the twin contacts of the relays may be manually tested. At this time the tester will insert a thin piece of insulation between one of the contacts of the pair to prove that the other is still maintaining the circuit intact. He will then perform the same operation on the other contact and if it is proved that both sets of contacts of the twin pair are operative, then he will start the test again on its automatic operation.

The operation of all the manual operation relays is identical with the exception of relays 172 and 290 which perform some additional functions. The code for operating any manual operation relay is placed on the tape at the point where it is desired to have the manual operation performed. As all of these circuits start with the letter F, conductor 387 will be grounded as soon as the F code is decoded and the advance relay will operate between the first and second letters of this code in the manner hereinbefore described. When the advance relay 174 is operated it will open the advancing path of the transmitter which will stop on the second letter of the manual operation code. This will cause one of the manual operation relays to operate. For instance, relay 174 which has been indexed by the code F,F, the corresponding signal 423 will light as a signal to the tester to perform the manual operation desired at this time. Relay 174 through its armature 2 and back contact will open the advancing path of the transmitter and will close battery over its front contact and armature 1 to relay 388, which now operates because of the ground placed on conductor 387. Relay 388 operated releases the advance relay 174 and this relay in releasing closes the advancing path of the transmitter but this is ineffective as the path is opened at the manual operation of relay 174. The tape will stay on this manual operation position until the corresponding manual operation key 424 is operated by the test. This results in the release of relay 174. It may be noted that since the tape has been stopped on the last letter F of the code F,F, that the ground supplied over the corresponding armature of relay 385 will be steadily applied to relay 174. Therefore, the operation of key 424 causes the release of relay 174. This relay released will close the advancing path of the transmitter through its armature 2 and back contact and the tape will move off the manual operation code.

Manual operation relays 172 and 290 beside performing the foregoing functions transfer the 8 A leads of features 1 to 4 and 21 to 24 to the 8 transmission testing jacks 425 to 426 shown in the lower right-hand corner of Fig. 20 so that certain manual transmission tests may be made, if desired.

*Optional features*

There are shown at the extreme right of Fig. 16 a plurality of relays from 392 to 394. With each there are associated a key such as key 427 associated with optional feature relay 392. The function of each optional feature relay and key is the same. Each individual optional feature relay and key is associated with a list of the unit to be tested. When a list condition is specified in the job ordering information, the associated optional feature key is in the position shown in Fig. 16. Under this condition, when the code for a particular optional feature relay is decoded by the tape decoding circuit, such relay will operate but will remain operated only while the tape decoding circuit is on the code for operating such relay. When the tape decoding circuit moves off the code for such relay the relay released.

If, however, the associated key has its contact closed the optional feature relay will lock to the resistance ground furnished through the key. Any optional feature relay being operated removes battery from conductor 391. It will be noted that of the 14 multicontact relays all except No. 13 derive their operated battery from conductor 391 and hence such relays are prevented from operating when an optional feature code has caused the operation of one of the relays such as 392. Consequently, only two-letter codes starting with the letter F may be thereafter decoded. When the release code for the operated optional feature relay reaches the transmitter, battery is sent to the optional feature relay which releases and restores the operating battery to the multicontact relays.

It may be noted that all of the optional feature relays have codes which start with the letter F. The releasing codes would start with the letter X but this would result in the selection of exactly the same point with the exception that a battery impulse is sent rather than a ground impulse. Therefore, the operation of relay 385 for sending a release impulse to an optional feature relay is possible even though the operation of such relay has removed ground from conductor 391.

Thus it can be seen that the placing of any codes between the operate and release code of any optional feature relay permits the selection or non-selection of the codes so placed to be controlled by the operation or non-operation of the optional feature key.

*End of test—code S,C*

The last code on each tape is the code S,C. Under a satisfactory cycle for the tape, the action will be described immediately hereafter. Under a cycle for the tape which has stopped one or more times for trouble, the action will be as described hereinafter.

*Complete test satisfactory—repeat key normal*

The last impulse from the tape decoding circuit is sent to the S,C code point. Under this condition, the repeat relay 166 is normal and the impulse therefor operates relays 159 and 168. Relay 169 operated locks to battery over the back contact and armature 1 of relay 151 and connects ground to conductor 161 to restore the test position indicating circuit to normal. Relay 168 operated (a) connects ground from armature 3 and back contact of relay 150 through the front contact and armature 1 of relay 168 to the satisfaction signal consisting of the lamp 152 and the bell 153, (b) locks to ground over its front contact and armature 2, (c) opens the operating path of the advance relay at its armature 4 and back contact and (d) connects ground through the repeat key 428 to operate relay 167. Relay 167 operated (a) connects battery to the normal advancing path of the transmitter, (b) removes battery from the start relay 155 which releases, (c) further opens the path for lighting the normal lamp 169 and (d) lights lamp 429 as a signal that the end of the cycle has been reached. The start relay 155 in releasing removes the ground for advancing the transmitter and the tape stops indexing.

*Repeat key operated*

The action under this condition is the same as that described above up to the point where relay 167 operated. As under this condition the repeat key 428 is operated the ground from relay 168 will instead of operating relay 167 operate relay 163. Relays 163 and 164 form the well-known WZ relay combination forming the basis of Patent 1,438,743 granted to E. H. Clark, December 12, 1922. Relay 163 is the W relay and relay 164 is the Z relay and this combination of relays acts to transfer the conductor 106 from the conductor 430 to conductor 431 leading to the same numbered conductors in Figs. 69 and 70. When conductor 430 is grounded then multicontact relay 432 is operated and signal lamp 434 is lighted. When the operation of relay 163 transfers conductor 106 to conductor 431 then multicontact relay 433 is operated and signal lamp 435 is lit. Relay 163 locks to ground on the lower pair of contacts of key 428. As under this condition the start relay 155 is not released, the tape keeps running after the last code has been sent and the operation of relay 151 releases relays 168 and 159 as the same tests are repeated on the alternate circuit. Relay 168 in releasing removes ground from about the winding of relay 164 and this now operates from the ground on the lower contact of the repeat key 428. Relay 164 operated prepares a path whereby the next closure of ground to relay 163 will shunt down this relay. Upon the removal of such ground relay 164 will also release. Relay 167 in releasing removes the restoring ground from the test position indicator in Fig. 18.

Trouble cycle

The action of the control circuit is the same at the end of a trouble cycle regardless of whether the repeat key is normal or operated. The end of a cycle on which the tape has stopped for one or more troubles will find the S,C code point cut off from relays 168 and 167 by the fact that the repeat relay 166 is locked operated under control of the start key 170 and relay 151. The ground pulse from the tape decoding circuit sent to the S,C code point under this condition will cause only relay 167 to operate. The operation of relay 167 now connects ground to the test position indicator (Fig. 18) to restore that circuit to normal. As relay 163 has not operated due to the failure of relay 168 to operate, the tape continues indexing and operates relay 151. The operation of relay 151 at this time releases only relays 167 and 166 and as the start relay 155 is still locked operated the tape is repeated on the same circuit automatically, that is, the terminations have not been shifted from one device under test to another by the alternate operation of the relays 432 and 433.

Test position indication

This circuit is shown in Fig. 18. Ground connected to the F,J code point connected to conductor 177 will operate relay 436 each time the code F,J is indexed. Relay 436 extends ground over conductor 437 and operates the magnet 438 which causes the units indicator wipers 439 and 440 to move forward one step. When the brush is moved off-normal and the off-normal springs 441 of the unit selector are actuated, battery is connected to the release magnet 442 and to relay 443 and brush 440 causes the No. 1 units signal lamp 444 to light. The release of relay 436 allows rotary magnet 438 to release to await the next closure of ground which will advance the brushes to terminals 2. The succeeding steps are the same until the brushes step to terminal 10 whereupon ground will be extended over brush 439 to the other side of the winding of relay 443 and this relay will operate in turn operating the release magnet 442 and sending the units switch to its 0 or normal position. At the same time, wiper 440 on its tenth terminal causes the operation of the tens selector magnet 445 so that the brushes 446, 447 and 448 are advanced to their No. 1 position where signal lamp 449 will be operated.

Thus, it can be seen that each impulse sent to the F,J code point by the tape decoding circuit is counted by the two selectors. The unit selector counts and registers the units digit and the tens selector counts and registers the tens digit. The test position in the tape reached is then visualized by the tens and units lamps which are lighted.

If at any time ground is connected to the lead 161 by relay 159 both the units and tens selectors are returned to normal. If the position indicating circuit is in position 9 or less the ground to operate relay 443 is supplied over brush 447 of the tens selector. If the position indicating circuit is in position 10 or more the ground to operate relay 443 is connected through the operated contact spring of magnet 445.

Display key

The display key 450 is operated when it is desired to watch the lighting of the lamps during the automatic progress of the tests. The display key operated connects ground to operate relay 156 in Fig. 19 and relay 402 in Fig. 18. Relay 156 connects battery to all of the signal lamps and the interrupter circuit for flashing certain of these lamps is started into operation at this time.

Interrupter circuits

Relay 415 is connected differentially. With the armature of relay 415 resting on its left-hand contact, ground from the armature of relay 402 is connected to the left-hand terminal of the upper winding of relay 415 to battery connected to the front contact of armature 3 of relay 416 to energize relay 415 in such a direction that it will tend to move its armature to its right-hand contact. Momentarily, this energization will be opposed by that produced by the transient current through condenser 451 and the lower winding of relay 415. When the condenser is fully charged the armature will move to its right-hand contact operating relay 416. The operation of relay 416 also reverses the direction of the currents through the upper and lower windings of relay 415, thus moving the armature of this relay back to its left-hand contact. The interaction of relays 415 and 416 is at the rate of 240 cycles per minute so that through armature 2 relay 416 will connect ground to the lead 417 at the rate of 240 impulses per minute.

Armature 1 of relay 416 operates to extend ground to the WZ relay combination consisting of relays 411 and 412 with the result that relay 411 will ground the front contact of its lower armature at the rate of 120 impulses per minute. In the same manner this ground is supplied to the WZ relay combination consisting of relays 413 and 414 so that the output of this combination means application of ground to conductors 418 and 419 at the rate of 60 impulses per minute.

Relay 402 is operated from three different sources. The operation of relay 395 starts the interrupters to time-out the trouble interval. The display key 450 and a display relay 156 operate the interrupter to provide the fast and slow flashing frequencies for the test feature indicating lamps.

Test set terminations

Fig. 69 and 70 and 71 show how the connections are made to the circuit under test. The 100 test set terminations leading from the horizontals of the primary switches in Figs. 22 to 24, inclusive, and partly in the contacts of the multicontact relays 432 and 433 and partly in the terminal connectors 452 and 453. When multicontact relay 433 is operated, then the 100 terminations together with certain power and signal means are connected to the terminals of the device 452. A cooperating block 454 extends these connections through a cable leading to a connecting device here indicated by a broken line rectangle 455. Similarly, when the multicontact relay 432 is operated then the 100 terminations of the test set are extended to the terminal device 453 so that a cooperating block 456 will extend these terminals further to a block 457 designed to make a quick connection to the terminal block of the device under test. Thus, by using two cables and two terminal blocks such as 457, two units may be simultaneously associated with the test set. With relay 432 operated, the device under test No.

458 here designated unit A will be tested. Under normal conditions if all the tests applied to this unit are satisfactory the satisfactory signal will be given and the operation of relays 432 and 433 will be shifted so that relay 433 will be operated and the terminations extended to unit B here designated 459. The signal lamps 434 and 435 indicate which of the two block terminated cables are effectively in operation at any time.

It should be noted that in addition to the block 457 by means of which terminations of the test may be extended through the standard terminal block of the device under test, a number of additional terminations are extended to a device 460 from which additional free wires ending in test clips may be used to make connections to points within the device under test inaccessible under ordinary conditions through the terminal block of such device.

What is claimed is:

1. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means.

2. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors terminating in a connecting device for temporarily extending the terminations of a device under test to said control device, a plurality of test feature terminations, electrically operated switches for variously interconnecting said extended terminations and said test feature terminations, a plurality of power leads each connected to a different power source, and electrically operated switches for variously interconnecting said power leads and said test feature terminations, said switches being selectively operated under control of said indexing means.

3. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors branching in two directions and terminating in each said direction in a connecting device for temporarily extending the terminations of a device under test to said control device, means for alternatively rendering said conductors in either direction effective, a plurality of test feature terminations, and electrically operated switches for variously interconnecting said conductors and said terminations, said switches being selectively operated under control of said indexing means.

4. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be mached by said observing means, a chain circuit jointly controlled by the said observing means and the said last means of each said testing feature, satisfaction means controlled by said chain circuit, a plurality of conductors branching in two directions and terminating in each said direction in a connecting device for temporarily extending the termination of a device under test to said control device, means for automatically and alternatively rendering said conductors in either direction effective, a plurality of test feature terminations, and electrically operated switches for variously interconnecting said conductors and said terminations, said switches being selectively operated under control of said indexing means.

5. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a satisfaction signal, means under control of said satisfaction means for operating said satisfaction signal, a plurality of conductors branching in two directions and terminating in each said direction in a connecting device for temporarily extending the terminations of a device under test to said control device, means controlled by said satisfaction signal controlling means for automatically and alternatively rendering said conductors in either direction effective, a plurality of test feature terminations, and electrically operated switches for variously interconnecting said conductors and said terminations, said switches being selectively operated under control of said indexing means.

6. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the last means of each said testing feature, satisfaction means controlled by said chain circuit, a plurality of conductors branching in two directions and terminating in each said direction in the contacts of a multicontact relay, the cooperating contacts of said relays leading each to a connecting device for temporarily extending the terminations of a device under test through said multicontact relay to said control device, means for alternatively operating said multicontact relays, a plurality of test feature terminations, and electrically operated switches for variously interconnecting said conductors and said terminations, said switches being selectively operated under control of said indexing means.

7. In a test device, an indexing means for determining the nature of a plurality of testing operations to be performed, said indexing means being removable and replaceable by other indexing means each differently arranged for determining the nature of other and different pluralities of testing operations to be performed, a plurality of testing means each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors branching in two directions and terminating in each said direction in a connecting device for temporarily extending the terminations of a device under test to said control device, means for alternatively rendering said conductors in either direction effective, signal means for indicating the said effective direction of said conductors at any given time, a plurality of test feature terminations, and electrically operated switches for variously interconnecting said conductors and said terminations, said switches being selectively operated under control of said indexing means.

8. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising a punched tape having holes punched therein in groups, each group being in accordance with a permutation code, a tape transmitter for sensing the code encountered and for sending corresponding electrical impulses, and means responsive thereto for operating the said testing feature means.

9. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising a punched tape having holes punched therein in groups each group being in accordance with a permutation code, a tape transmitter for sensing the code encountered and for sending corresponding electrical impulses, a decoding means responsive to said transmitter for translating said electrical impulses into electrical circuit conditions for operating said test feature means.

10. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising a punched tape having holes punched therein in groups serially arranged, each group being in accordance with a permutation code and each said group acting to designate a separate switching operation, and means responsive thereto for operating said test feature means.

11. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, said indexing means comprising a punched tape having holes punched therein in groups each group being in accordance with a permutation code, a tape transmitter for sensing the code encountered and for sending corresponding electrical impulses and means responsive thereto for operating said electrically operated switches and said test feature means.

12. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising a punched tape having holes punched therein in groups each group being in accordance with a permutation code, a plurality of said codes designating a separate switching action and a plurality of said separate switching actions constituting the preparation for a single test, a tape transmitter for sensing the codes encountered and for sending corresponding electrical impulses, and means responsive thereto for establishing connections to said test features and for operating said test feature means.

13. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising a tape perforated in the manner common in the printing telegraph art with letter and functional codes, each designation comprising a two letter code and each designation controlling a test feature means operation.

14. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, and a control circuit for placing said control device in operative condition, said indexing means comprising a tape perforated in the manner common in the printing telegraph art with letter and functional code groups of perforations, each operational designation comprising a two code group of perforations, the complete designation for a single test consisting of a starting code for controlling said control circuit, a plurality of codes for operating said electrically operated switches to include a device under test in a circuit with an appropriate test feature, a code to operate said means for imposing a test condition on a device under test, a code for operating said means for imposing a condition to be matched by said observing means and a code to render said satisfaction means operative.

15. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, said indexing means comprising a tape perforated in the manner common in the printing telegraph art with letter and functional code groups of perforations, a tape transmitter for sensing the codes encountered and for sending corresponding electrical impulses and means responsive thereto for sequentially operating said electrically operated switches and said test feature means.

16. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, said indexing means comprising a tape perforated in the manner common in the printing telegraph art with letter and functional code groups of perforations, a tape transmitter for sensing the codes encountered and for sending corresponding electrical impulses, a decoding means for translating said electrical impulses into given electrical conditions, a plurality of multicontact relays responsive to said decoding means and means responsive thereto for operating said electrically operated switches and said test feature means.

17. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, said indexing means comprising a tape perforated in the manner common in the printing telegraph art with letter and functional code groups of perforations, a tape transmitter for sensing the codes encountered and for sending corresponding electrical impulses, a first decoding means for translating said electrical impulses into given electrical conditions, a plurality of multicontact relays selectively responsive to said electrical conditions, a second decoding means for translating said electrical impulses into given electrical conditions, a transfer device for alternately connecting said tape transmitter to said first and said second decoding means, and means controlled by said selectively operated multicontact relays for transmitting said given electrical conditions produced by said second decoding means to and for operating said electrically operated switches and said test feature means.

18. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, a plurality of conductors for connection to the terminations of a device under test, a plurality of test feature terminations, electrically operated switches for variously interconnecting said conductors and said terminations, said switches being selectively operated under control of said indexing means, said indexing means comprising a tape perforated in the manner common in the printing telegraph art with letter and functional code groups of perforations, a tape transmitter for sensing the codes encountered and for simultaneously sending electrical impulses corresponding to the elements of the code encountered, a first decoding means for translating said electrical impulses of one code group into a single electrical condition, a plurality of multicontact relays selectively responsive to said electrical condition, a second decoding means for translating said electrical impulses of another code signal into a single electrical condition, a transfer device for alternately connecting said tape transmitter to said first and said second decoding means, means for maintaining a selectively operated one of said multicontact relays operated over a period measured by the operation of said transfer device and the establishment of said single electrical condition by said second decoder and contact means controlled by said multicontact relays for placing said last single electrical condition on a single one of the field of contacts controlled by said multicontact relays, said field of contacts being connected to the operating means of said electrically operated switches and said test feature means.

19. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means of each said testing feature for reporting the success of a group of tests simultaneously performed by a plurality of said testing features, a plurality of test terminations to be connected to points in the circuit of a device under test, switching means for interconnecting said terminations and said testing features under control of said indexing means, a signal individual to each said testing feature, a normally open circuit for said individual signals, a display means under control of said satisfaction means for closing said normally open circuit, an individual display associated with each said testing feature, a set of termination signals, means under control of said switching means and said individual display means for selectively operating said termination signals and a general failure signal controlled by said satisfaction signal.

20. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means of each said testing feature for reporting the success of a group of tests simultaneously performed by a plurality of said testing features, a plurality of test terminations to be connected to points in the circuit of a device under test, switching means for interconnecting said terminations and said testing features under control of said indexing means, a signal individual to each said testing feature, a normally open circuit for said individual signals, a display means under control of said satisfaction means for closing said normally open circuit, an individual display associated with each said testing feature, a set of termination signals, means under control of said switching means and said individual display means for selectively operating said termination signals a set of location signals corresponding to the location of various components in the device under test, said location signals being connected to said normally open circuit under control of said display means, said location signals being further under control of said indexing means.

21. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means of each said testing feature for reporting the success of a group of tests simultaneously performed by a plurality of said testing features, a plurality of test terminations to be connected to points in the circuit of a device under test, switching means for interconnecting said terminations and said testing features under control of said indexing means, a signal individual to each said testing feature, each said individual signal being controlled by said test feature means to give a plurality of different indications, a normally open circuit for said individual signals, a display means under control of said satisfaction means for closing said normally open circuit, an individual display means associated with each said testing feature, a set of termination signals, means under control of said switching means and said individual display means for selectively operating said termination signals and a general failure signal controlled by said satisfaction means, whereby upon the encounter of an unstandard condition by one of said test features, said general failure signal will be operated, said individual test feature signal associated with said test feature which has encountered the said unstandard condition will give one kind of indication, the remaining test feature signals will give other kinds of indication and said termination signals under control of said individual display means associated with said test feature which has encountered the said unstandard condition will indicate the particular terminations with which this said test feature is at the time associated.

22. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, an optional feature means and means controlled thereby for rendering effective or ineffective any given testing operation indexed by said indexing means.

23. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, an optional feature means controlled by said indexing means for rendering a given section of said indexing means ineffective, said optional feature means being normally ineffective, and manually controlled means for preparing said optional feature means for operation by said indexing means.

24. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, a plurality of optional feature means each controlled by said indexing means, each for controlling the effective response of said testing device over a different given section of said indexing means and manually operated means for selectively rendering said different optional feature means effective.

25. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, an optional feature relay responsive to said indexing means, a locking circuit for said relay, said circuit being normally open, a key for closing said circuit and means controlled by said relay for rendering a given section of said indexing means ineffective.

26. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, a manual operation means responsive to said indexing means for stopping the operation of said indexing means at any given point to permit the making of individual manual tests on a device under test and a releasing means therefor to restart said indexing means.

27. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, said indexing means being arranged to sequentially control said testing features to sequentially and automatically perform a plurality of tests on a device under test, a manual operation relay responsive to said indexing means for halting the operation thereof to permit the making of individual manual tests on a device under test and manual means for restarting the operation of said indexing means.

28. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, said indexing means being arranged to sequentially control said testing features to sequentially and automatically perform a plurality of tests, each said position on said indexing means terminating a given testing operation being designated a test position, and an indicator for indicating the number of test positions passed by said indexing means at any given time during the operation of said control device.

29. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, a trouble indicating means under control of said satisfaction means, a stepping means for advancing said indexing means, means under control of said trouble indicating means for stopping the operation of said stepping means, a step key for restarting said stepping means and means under control of said satisfaction means for rendering the operation of said step key ineffective.

30. In a test device, an indexing means for determining the nature of a plurality of testing operations to be performed, said indexing means being removable and replaceable by other indexing means each differently arranged for determining the nature of other and different pluralities of testing operations to be performed, said different indexing means being of different capacities limited only by the number of testing operations designated by each, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, a plurality of conductors for connection to the terminations of a device under test, a plurality of test feature terminations and electrically operated switches for variously interconnecting said conductors and said terminations, said switches being selectively operated under control of said indexing means, said indexing means comprising a punched tape having holes punched therein in groups each group being in accordance with a permutation code, a tape transmitter for sensing the code encountered and for sending corresponding electrical impulses and means responsive thereto for operating said electrically operated switches and said test feature means.

31. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by said observing means and the said last means of each said testing feature, satisfaction means controlled by said chain circuit, said indexing means comprising a tape perforated in the manner common in the printing telegraph art with letter and functional codes, each designation comprising a multi-letter code and each designation controlling a test feature means operation.

32. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a chain circuit jointly controlled by the said observing means and the said last means of each said testing feature, satisfaction means controlled by said chain circuit, said indexing means comprising an endless loop of tape perforated in the manner common in the printing telegraph art with letter and functional code groups of perforations, each operational designation comprising a multi-code group of perforations and each designation controlling a test feature means operation, the linear dimension of said tape being limited only by the number of operations designated.

ROBERT K. SMITH.
JOHN H. SULZER.